(12) United States Patent
Purkayastha et al.

(10) Patent No.: US 12,520,362 B2
(45) Date of Patent: Jan. 6, 2026

(54) FAST RECOVERY FROM LINK FAILURE IN DUAL-CONNECTIVITY SYSTEMS

(71) Applicants: Qualcomm Incorporated, San Diego, CA (US); Punyaslok Purkayastha, San Diego, CA (US); Gavin Bernard Horn, La Jolla, CA (US); Ozcan Ozturk, San Diego, CA (US); Peng Cheng, Beijing (CN); Arvind Vardarajan Santhanam, San Diego, CA (US)

(72) Inventors: Punyaslok Purkayastha, San Diego, CA (US); Gavin Bernard Horn, La Jolla, CA (US); Ozcan Ozturk, San Diego, CA (US); Peng Cheng, Beijing (CN); Arvind Vardarajan Santhanam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 561 days.

(21) Appl. No.: 17/287,706

(22) PCT Filed: Dec. 3, 2019

(86) PCT No.: PCT/CN2019/122565
§ 371 (c)(1),
(2) Date: Apr. 22, 2021

(87) PCT Pub. No.: WO2020/114371
PCT Pub. Date: Jun. 11, 2020

(65) Prior Publication Data
US 2021/0385897 A1 Dec. 9, 2021

(30) Foreign Application Priority Data

Dec. 3, 2018 (WO) ................ PCT/CN2018/118898
Mar. 28, 2019 (WO) ................ PCT/CN2019/080166

(51) Int. Cl.
*H04W 76/19* (2018.01)
*H04W 24/08* (2009.01)
(Continued)

(52) U.S. Cl.
CPC ........... *H04W 76/19* (2018.02); *H04W 24/08* (2013.01); *H04W 36/087* (2023.05); *H04W 76/18* (2018.02); *H04W 36/00692* (2023.05)

(58) Field of Classification Search
None
See application file for complete search history.

(56) References Cited

U.S. PATENT DOCUMENTS 10,306,695 B2   5/2019  Vajapeyam et al.
2014/0348143 A1* 11/2014  Kato ..................... H04L 5/0032
                                                      370/336
(Continued)

FOREIGN PATENT DOCUMENTS

CN   101873655 A   10/2010
CN   103703859 A    4/2014
(Continued)

OTHER PUBLICATIONS

3GPP TSG-RAN WG2 Meeting #85 R2-140923 (Year: 2014).*
(Continued)

*Primary Examiner* — Luna Weissberger
(74) *Attorney, Agent, or Firm* — Holland & Hart LLP

(57) ABSTRACT

Methods, systems, and devices for wireless communications are described. A user equipment (UE) may detect a radio link failure between the UE and a master node of a dual-connectivity configuration. The UE may transmit, to a secondary node in the dual-connectivity configuration, an indication that the radio link failure has occurred. The secondary node may receive the indication of a radio link failure and transmit the indication of the radio link failure to
(Continued)

the master node of the dual-connectivity configuration. The master node may identify a target node for the UE and perform a handover procedure of the UE from the master node to the target node.

29 Claims, 27 Drawing Sheets

(51) Int. Cl.
*H04W 36/00* (2009.01)
*H04W 36/08* (2009.01)
*H04W 76/18* (2018.01)

(56) References Cited

U.S. PATENT DOCUMENTS

| | | | |
|---|---|---|---|
| 2015/0078286 A1* | 3/2015 | Kim | H04L 5/001 370/329 |
| 2015/0133122 A1 | 5/2015 | Chen | |
| 2016/0057802 A1* | 2/2016 | Lee | H04W 76/19 370/329 |
| 2016/0242226 A1 | 8/2016 | Fushiki et al. | |
| 2019/0349822 A1* | 11/2019 | Kim | H04W 36/08 |
| 2020/0045764 A1* | 2/2020 | Kim | H04W 36/00695 |
| 2020/0059395 A1* | 2/2020 | Chen | H04W 28/082 |
| 2021/0068162 A1* | 3/2021 | Agiwal | H04L 5/0048 |
| 2021/0344405 A1* | 11/2021 | Yuan | H04W 76/19 |

FOREIGN PATENT DOCUMENTS

| | | |
|---|---|---|
| CN | 105101253 A | 11/2015 |
| CN | 105103593 A | 11/2015 |
| CN | 105960772 A | 9/2016 |
| WO | WO-2015019172 A2 | 2/2015 |
| WO | WO-2015116877 | 8/2015 |
| WO | WO-2015141406 A1 * | 9/2015 ............ H04W 16/32 |
| WO | WO-2017138978 A1 * | 8/2017 ............ H04W 36/18 |
| WO | WO-2018170885 A1 | 9/2018 |
| WO | WO-2018182231 A1 | 10/2018 |

OTHER PUBLICATIONS

3GPP TS 38.331 V15.3.0 (Sep. 2018) (Year: 2018).*
Supplementary European Search Report—EP19892788—Search Authority—The Hague—Nov. 7, 2022.
"3GPP, 3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340 V2.0.0, Dec. 31, 2017 (Dec. 31, 2017), pp. 1-51.
Ericsson: "Dual Connectivity- other procedures", 3GPP TSG-SA WG3 Meeting #91bis, S3-181850, May 25, 2018 (May 25, 2018), 3 Pages, the whole document.
Ericsson et al., "Way Forward with Control Plane Architecture Selection", 3GPP TSG-RAN WG2 #83, R2-132700, Barcelona, Spain, Aug. 19-23, 2013, pp. 1-5, section 2.5.
International Search Report and Written Opinion—PCT/CN2019/080166—ISA/EPO—Sep. 3, 2019.
International Search Report and Written Opinion—PCT/CN2018/118898—ISA/EPO—Jul. 3, 2019.
International Search Report and Written Opinion—PCT/CN2019/122565—ISA/EPO—Mar. 6, 2020.
CATT: "CG Failure Handling for MR-DC", 3GPP TSG-RAN WG2 Meeting #103bis, R2-1813841, Chengdu, China, Oct. 8-12, 2018, 3 Pages, XP051523317, Retrieved from the Internet: URL: http://www.3gpp.org/ftp/tsg%5Fran/WG2%5FRL2/TSGR2%5F103bis/Docs/R2%2D1813841%2Ezip. The Whole Document, sections 1-2.
Supplementary Partial European Search Report—EP19892788—Search Authority—Berlin—Aug. 5, 2022.

* cited by examiner

FAST RECOVERY FROM LINK FAILURE IN DUAL-CONNECTIVITY SYSTEMS

CROSS REFERENCE TO RELATED APPLICATIONS

The present application is a 371 national phase filing of International Patent Application No. PCT/CN2019/122565 by PURKAYASTHA et. al., entitled "FAST RECOVERY FROM LINK FAILURE IN DUAL-CONNECTIVITY SYSTEMS," filed Dec. 3, 2019; which claims the benefit of International Patent Application No. PCT/CN2019/080166 by PURKAYASTHA et. al., entitled "FAST RECOVERY FROM LINK FAILURE IN DUAL-CONNECTIVITY SYSTEMS," filed Mar. 28, 2019; and of International Patent Application No. PCT/CN2018/118898 by PURKAYASTHA et al. entitled "FAST RECOVERY FROM LINK FAILURE IN DUAL-CONNECTIVITY SYSTEMS," filed Dec. 3, 2018, each of which is assigned to the assignee hereof, and each of which is hereby incorporated by reference in its entirety.

BACKGROUND

The following relates generally to wireless communications, and more specifically to fast recovery from link failure in dual-connectivity systems.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Some wireless networks may be configured to operate in a dual-connectivity configuration, in which a UE maintains simultaneous connections with at least a first base station, referred to as a master node (MN), and a second base station, referred to as a secondary node (SN). In some examples, one or more of the radio links between the UE and the MN and/or between the UE and the SN may experience a radio link failure (RLF). When an RLF is detected, conventional techniques utilize a radio resource control (RRC) reestablishment procedure to establish a new radio link between the UE and the affected base station (MN and/or SN) or between the UE and a target base station (or target node). However, such conventional techniques are time-consuming, utilize considerable over-the-air resources, and do not leverage the dual-connectivity configuration to reduce the impact associated with an RLF event.

SUMMARY

The described techniques relate to improved methods, systems, devices, and apparatuses that support fast recovery from link failure in dual-connectivity systems. Generally, the described techniques provide for a fast recovery procedure that utilizes a secondary cell group (SCG) link to trigger a handover instead of using conventional radio link failure (RLF) recovery procedures, such as a radio resource control (RRC) reestablishment procedure. Generally, the handover procedure provides for fast recovery from the RLF with less interruption of data traffic than such conventional RLF recovery procedures. For example, a user equipment (UE) may be connected to a master node (MN) and a secondary node (SN) by wireless radio links in a dual-connectivity configuration. The UE may detect or otherwise determine that an RLF has occurred between the UE and the MN. In response, the UE may transmit or otherwise provide an indication of the RLF to the SN in the dual-connectivity configuration. The SN may receive the indication of the RLF between the UE and the MN and transmit, forward, or otherwise provide an indication of a RLF to the MN (e.g., via a wireless transmission between the SN and the MN and/or between a backhaul link between the SN and MN). In some aspects, the indication of the RLF may be carried or otherwise conveyed in a measurement report. The MN may receive the indication of the RLF from the SN and identify a target node for the UE, e.g., based at least in part on the measurement report. Accordingly, the MN may initiate or otherwise perform a handover procedure of the UE from the MN to the target node.

A method for wireless communication at a UE is described. The method may include detecting a radio link failure between the UE and a master node of a dual-connectivity configuration, determining a type of the radio link failure or a layer at which the radio link failure has occurred, selecting a recovery procedure for attempting to recover a link with the master node or a target node based on the type of the radio link failure or the layer at which the radio link failure has occurred, and performing the selected recovery procedure.

An apparatus for wireless communication at a UE is described. The apparatus may include a processor, memory in electronic communication with the processor, and instructions stored in the memory. The instructions may be executable by the processor to cause the apparatus to detect a radio link failure between the UE and a master node of a dual-connectivity configuration, determine a type of the radio link failure or a layer at which the radio link failure has occurred, select a recovery procedure for attempting to recover a link with the master node or a target node based on the type of the radio link failure or the layer at which the radio link failure has occurred, and perform the selected recovery procedure.

Another apparatus for wireless communication at a UE is described. The apparatus may include means for detecting a radio link failure between the UE and a master node of a dual-connectivity configuration, determining a type of the radio link failure or a layer at which the radio link failure has occurred, selecting a recovery procedure for attempting to recover a link with the master node or a target node based on the type of the radio link failure or the layer at which the radio link failure has occurred, and performing the selected recovery procedure.

A non-transitory computer-readable medium storing code for wireless communication at a UE is described. The code may include instructions executable by a processor to detect a radio link failure between the UE and a master node of a dual-connectivity configuration, determine a type of the radio link failure or a layer at which the radio link failure has occurred, select a recovery procedure for attempting to recover a link with the master node or a target node based on the type of the radio link failure or the layer at which the radio link failure has occurred, and perform the selected recovery procedure.

In some examples of the method, apparatuses, and non-transitory computer-readable medium described herein, determining the type of the radio link failure or the layer at which the radio link failure may have occurred may include operations, features, means, or instructions for determining that the radio link failure may have occurred at a radio resource control layer based on failing to comply with a provided radio configuration in a radio resource control message; or, and determining that the radio link failure may be an integrity check failure based on receiving an integrity check failure indication from a packet data convergence protocol layer.

In some examples of the method, apparatuses, and non-transitory computer-readable medium described herein, performing the selected recovery procedure may include operations, features, means, or instructions for transmitting, to a secondary node in a dual-connectivity configuration, a radio resource control reestablishment request for reestablishing a connection with the master node, receiving, from the secondary node or the master node, a radio resource control reestablishment message based on the transmitting, and performing a reestablishment procedure based on receiving the radio resource control reestablishment message.

In some examples of the method, apparatuses, and non-transitory computer-readable medium described herein, transmitting the radio resource control reestablishment request may include operations, features, means, or instructions for transmitting the radio resource control reestablishment request over a split signaling radio bearer or a signaling radio bearer established between the UE and the secondary node only. In some examples of the method, apparatuses, and non-transitory computer-readable medium described herein, the radio resource control reestablishment request includes a physical cell identifier of the master node, a cell radio network temporary identifier assigned by the master node, an indication of a cause of the reestablishment procedure, or a combination thereof. In some examples of the method, apparatuses, and non-transitory computer-readable medium described herein, the cause of the reestablishment procedure includes an integrity protection (IP) failure with a master cell group or a reconfiguration failure with the master cell group.

In some examples of the method, apparatuses, and non-transitory computer-readable medium described herein, performing the selected recovery procedure may include operations, features, means, or instructions for transmitting a first random-access message to the master node, receiving a second random-access message from the master node in response to the first random-access message, the second random-access message providing a grant for uplink resources for the UE to transmit a radio resource control reestablishment request, transmitting the radio resource control reestablishment request on the uplink resources, receiving, from the master node, a radio resource control reestablishment message based on the transmitting, and performing a reestablishment procedure based on receiving the radio resource control reestablishment message.

In some examples of the method, apparatuses, and non-transitory computer-readable medium described herein, transmitting the radio resource control reestablishment request may include operations, features, means, or instructions for transmitting the radio resource control reestablishment request message over a signaling radio bearer. In some examples of the method, apparatuses, and non-transitory computer-readable medium described herein, the radio resource control reestablishment request includes a physical cell identifier of the master node, a cell radio network temporary identifier assigned by the master node, an indication of a cause of the reestablishment procedure, or a combination thereof. In some examples of the method, apparatuses, and non-transitory computer-readable medium described herein, the cause of the reestablishment procedure includes an integrity protection (IP) failure with a master cell group or a reconfiguration failure with the master cell group.

In some examples of the method, apparatuses, and non-transitory computer-readable medium described herein, determining the type of the radio link failure or the layer at which the radio link failure may have occurred may include operations, features, means, or instructions for determining that the radio link failure may have occurred at a physical layer, media access control layer, or radio link control layer; or, and determining that the radio link failure may be a handover failure. In some examples of the method, apparatuses, and non-transitory computer-readable medium described herein, performing the selected recovery procedure may include operations, features, means, or instructions for transmitting, to a secondary node in a dual-connectivity configuration, an indication that the radio link failure may have occurred, and monitoring for a response from the secondary node based on the transmitting.

Some examples of the method, apparatuses, and non-transitory computer-readable medium described herein may further include operations, features, means, or instructions for receiving a radio resource control reconfiguration message indicating that the UE may be to perform a handover procedure from the master node to the target node, and initiating the handover procedure from the master node to the target node based on the radio resource control reconfiguration message. Some examples of the method, apparatuses, and non-transitory computer-readable medium described herein may further include operations, features, means, or instructions for receiving a radio resource control release message indicating that the UE may be to release a radio resource control connection with the master node, releasing the radio resource control connection with the master node based on the radio resource control release message, and performing a radio resource control reestablishment procedure based on the releasing. Some examples of the method, apparatuses, and non-transitory computer-readable medium described herein may further include operations, features, means, or instructions for failing to receive the response before a recovery timer expires, and performing a radio resource control reestablishment procedure based on the failing.

A method for wireless communication at a UE is described. The method may include detecting a radio link failure between the UE and a master node of a dual-connectivity configuration, transmitting, to a secondary node in the dual connectivity configuration, an indication that the radio link failure has occurred, starting a recovery timer upon transmitting the indication that the radio link failure has occurred, and monitoring for a response from the secondary node for at most a duration of the recovery timer.

An apparatus for wireless communication at a UE is described. The apparatus may include a processor, memory in electronic communication with the processor, and instructions stored in the memory. The instructions may be executable by the processor to cause the apparatus to detect a radio link failure between the UE and a master node of a dual-connectivity configuration, transmit, to a secondary node in the dual connectivity configuration, an indication that the radio link failure has occurred, start a recovery timer upon transmitting the indication that the radio link failure has occurred, and monitor for a response from the secondary node for at most a duration of the recovery timer.

Another apparatus for wireless communication at a UE is described. The apparatus may include means for detecting a radio link failure between the UE and a master node of a dual-connectivity configuration, transmitting, to a secondary node in the dual connectivity configuration, an indication that the radio link failure has occurred, starting a recovery timer upon transmitting the indication that the radio link failure has occurred, and monitoring for a response from the secondary node for at most a duration of the recovery timer.

A non-transitory computer-readable medium storing code for wireless communication at a UE is described. The code may include instructions executable by a processor to detect a radio link failure between the UE and a master node of a dual-connectivity configuration, transmit, to a secondary node in the dual connectivity configuration, an indication that the radio link failure has occurred, start a recovery timer upon transmitting the indication that the radio link failure has occurred, and monitor for a response from the secondary node for at most a duration of the recovery timer.

Some examples of the method, apparatuses, and non-transitory computer-readable medium described herein may further include operations, features, means, or instructions for receiving a radio resource control reconfiguration message indicating that the UE may be to perform a handover procedure from the master node to a target node, and initiating the handover procedure from the master node to the target node based on the radio resource control reconfiguration message. Some examples of the method, apparatuses, and non-transitory computer-readable medium described herein may further include operations, features, means, or instructions for receiving a radio resource control release message indicating that the UE may be to release a radio resource control connection with the master node, releasing the radio resource control connection with the master node based on the radio resource control release message, and performing a radio resource control reestablishment procedure based on the releasing. Some examples of the method, apparatuses, and non-transitory computer-readable medium described herein may further include operations, features, means, or instructions for failing to receive the response before the recovery timer expires, and performing a radio resource control re-establishment procedure based on the failing.

A method for wireless communication at a UE is described. The method may include receiving a radio resource control connection reconfiguration message from a master node of a dual-connectivity configuration, the radio resource control connection reconfiguration message indicating that the UE is to handover from a secondary node of the dual-connectivity configuration to a target secondary node, performing a handover from the secondary node of the dual-connectivity configuration to the target secondary node, detecting a radio link failure between the UE and the master node of the dual-connectivity configuration, and delaying transmission of an indication that the radio link failure has occurred to the target secondary node until after the handover to the target secondary node.

An apparatus for wireless communication at a UE is described. The apparatus may include a processor, memory in electronic communication with the processor, and instructions stored in the memory. The instructions may be executable by the processor to cause the apparatus to receive a radio resource control connection reconfiguration message from a master node of a dual-connectivity configuration, the radio resource control connection reconfiguration message indicating that the UE is to handover from a secondary node of the dual-connectivity configuration to a target secondary node, perform a handover from the secondary node of the dual-connectivity configuration to the target secondary node, detect a radio link failure between the UE and the master node of the dual-connectivity configuration, and delay transmission of an indication that the radio link failure has occurred to the target secondary node until after the handover to the target secondary node.

Another apparatus for wireless communication at a UE is described. The apparatus may include means for receiving a radio resource control connection reconfiguration message from a master node of a dual-connectivity configuration, the radio resource control connection reconfiguration message indicating that the UE is to handover from a secondary node of the dual-connectivity configuration to a target secondary node, performing a handover from the secondary node of the dual-connectivity configuration to the target secondary node, detecting a radio link failure between the UE and the master node of the dual-connectivity configuration, and delaying transmission of an indication that the radio link failure has occurred to the target secondary node until after the handover to the target secondary node.

A non-transitory computer-readable medium storing code for wireless communication at a UE is described. The code may include instructions executable by a processor to receive a radio resource control connection reconfiguration message from a master node of a dual-connectivity configuration, the radio resource control connection reconfiguration message indicating that the UE is to handover from a secondary node of the dual-connectivity configuration to a target secondary node, perform a handover from the secondary node of the dual-connectivity configuration to the target secondary node, detect a radio link failure between the UE and the master node of the dual-connectivity configuration, and delay transmission of an indication that the radio link failure has occurred to the target secondary node until after the handover to the target secondary node.

Some examples of the method, apparatuses, and non-transitory computer-readable medium described herein may further include operations, features, means, or instructions for performing a random-access procedure to gain access to the target secondary node after the handover to the target secondary node. Some examples of the method, apparatuses, and non-transitory computer-readable medium described herein may further include operations, features, means, or instructions for transmitting, to the target secondary node, the indication that the radio link failure may have occurred after successfully completing the random-access procedure. Some examples of the method, apparatuses, and non-transitory computer-readable medium described herein may further include operations, features, means, or instructions for determining that the random-access procedure may have failed based on a random-access timer expiring before completion of the random-access procedure, releasing the master node and the target secondary node, and performing a radio resource control reestablishment procedure based on the releasing. In some examples of the method, apparatuses, and non-transitory computer-readable medium described herein, delaying transmission may include operations, features, means, or instructions for delaying triggering a recovery procedure until after the handover to the target secondary node.

A method for wireless communication at a UE is described. The method may include receiving a radio resource control connection configuration message from a master node of a dual-connectivity configuration, the radio resource control configuration message indicating that the UE is to add a secondary node to the dual-connectivity configuration according to a secondary node addition procedure, performing radio configuration of the secondary node according to the secondary node addition procedure, detecting a radio link failure between the UE and the master node of the dual-connectivity configuration, and delaying transmission of an indication that the radio link failure has occurred to the secondary node until after successfully completing a random-access procedure to gain access to the secondary node added according to the secondary node addition procedure.

An apparatus for wireless communication at a UE is described. The apparatus may include a processor, memory in electronic communication with the processor, and instructions stored in the memory. The instructions may be executable by the processor to cause the apparatus to receive a radio resource control connection configuration message from a master node of a dual-connectivity configuration, the radio resource control configuration message indicating that the UE is to add a secondary node to the dual-connectivity configuration according to a secondary node addition procedure, perform radio configuration of the secondary node according to the secondary node addition procedure, detect a radio link failure between the UE and the master node of the dual-connectivity configuration, and delay transmission of an indication that the radio link failure has occurred to the secondary node until after successfully completing a random-access procedure to gain access to the secondary node added according to the secondary node addition procedure.

Another apparatus for wireless communication at a UE is described. The apparatus may include means for receiving a radio resource control connection configuration message from a master node of a dual-connectivity configuration, the radio resource control configuration message indicating that the UE is to add a secondary node to the dual-connectivity configuration according to a secondary node addition procedure, performing radio configuration of the secondary node according to the secondary node addition procedure, detecting a radio link failure between the UE and the master node of the dual-connectivity configuration, and delaying transmission of an indication that the radio link failure has occurred to the secondary node until after successfully completing a random-access procedure to gain access to the secondary node added according to the secondary node addition procedure.

A non-transitory computer-readable medium storing code for wireless communication at a UE is described. The code may include instructions executable by a processor to receive a radio resource control connection configuration message from a master node of a dual-connectivity configuration, the radio resource control configuration message indicating that the UE is to add a secondary node to the dual-connectivity configuration according to a secondary node addition procedure, perform radio configuration of the secondary node according to the secondary node addition procedure, detect a radio link failure between the UE and the master node of the dual-connectivity configuration, and delay transmission of an indication that the radio link failure has occurred to the secondary node until after successfully completing a random-access procedure to gain access to the secondary node added according to the secondary node addition procedure.

Some examples of the method, apparatuses, and non-transitory computer-readable medium described herein may further include operations, features, means, or instructions for performing the random-access procedure to gain access to the secondary node. Some examples of the method, apparatuses, and non-transitory computer-readable medium described herein may further include operations, features, means, or instructions for transmitting, to the secondary node, the indication that the radio link failure may have occurred after successfully completing the random-access procedure. Some examples of the method, apparatuses, and non-transitory computer-readable medium described herein may further include operations, features, means, or instructions for determining that the random-access procedure may have failed based on a random-access timer expiring before completion of the random-access procedure, releasing the master node and the secondary node, and performing a radio resource control reestablishment procedure based on the releasing. In some examples of the method, apparatuses, and non-transitory computer-readable medium described herein, delaying transmission may include operations, features, means, or instructions for delaying triggering a recovery procedure until after successfully completing the random-access procedure to gain access to the secondary node.

DETAILED DESCRIPTION

Figure 1:
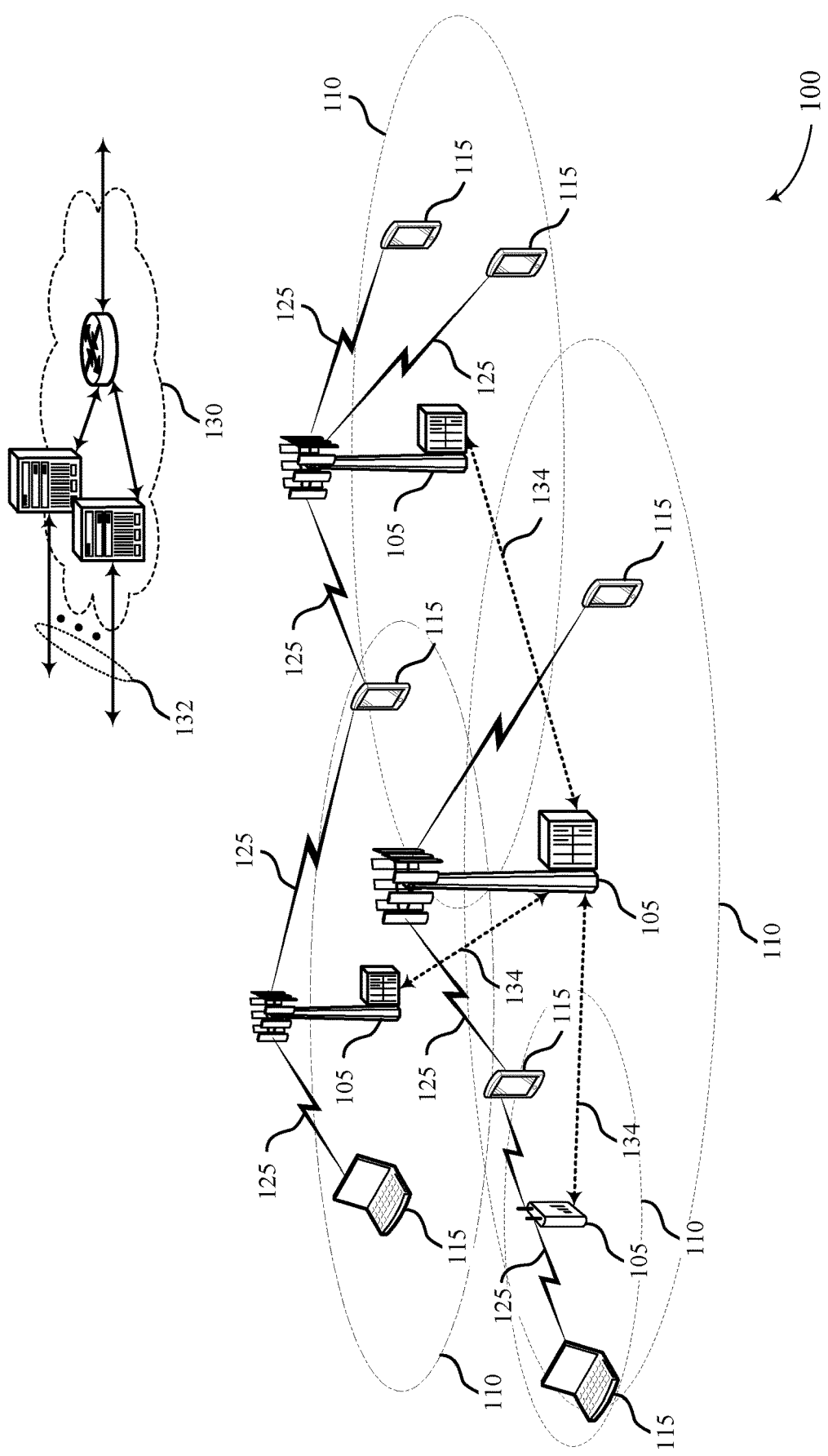
FIG. 1 illustrates an example of a wireless communications system that supports fast recovery from link failure in dual-connectivity systems in accordance with aspects of the present disclosure.

Some wireless networks may be configured to operate in a dual-connectivity (DC) configuration. For example, the wireless network may be configured to operate in an evolved universal terrestrial radio access network (E-UTRAN) new radio (NR), which may be referred to as EN-DC, as 5G EN-DC, and/or as a 5G NR dual-connectivity configuration or system. Broadly, the dual-connectivity configuration supports the UE being connected to two base stations (or nodes) at the same time. In some example, one base station (e.g., a master node (MN)) may be a 5G or NR base station and a second base station (e.g., a secondary node (SN)) may be an LTE base station. In other examples, the MN may be an LTE base station and the SN may be a 5G or NR base station. In even further examples, both the MN and SN may be 5G or NR base stations, or they may both be LTE base stations. The dual-connectivity configuration may be supported when inter-connectivity has been established between the MN and SN base stations, via one or more backhaul links, core network functions, and the like. In some examples, MN may also be referred to as a master cell group (MCG) and the SN may be referred to as a secondary cell group (SCG). Some examples of dual-connectivity may include the UE being simultaneously connected to the LTE and 5G NR base stations and/or the UE utilizing the LTE base station for control plane information and the 5G NR base station for user plane traffic. In some aspects, the dual-connectivity configuration may support direct and/or split radio bearers, a MCG signaling radio bearer (SRB) between the UE and the MN, and/or a SCG SRB between the UE and the SN. Broadly, the dual-connectivity configuration leverages benefits of both LTE and 5G functionalities and capabilities simultaneously to improve overall system performance In some aspects, the UE communicates with the MN and/or the SN over one or more wireless links or radio links, which may also be referred to as MCG link and SCG link. Broadly, the radio links may be sub-6 GHz and/or millimeter wave (mmW) radio links. In some examples, one or more of the radio links between the UE and the MN and/or the UE and the SN may experience a radio link failure (RLF). Generally, the RLF may occur due to obstruction, link degradation, and the like, such that the radio link becomes unavailable and/or fails to satisfy a performance threshold for continued use. Generally, the UE may perform channel measurements to monitor link performance and identify an RLF based on the channel measurements. When an RLF is detected, conventional techniques typically utilize a radio resource control (RRC) reestablishment procedure and/or may rely on a RLF recovery procedure to establish a radio link between the UE and the affected base station (MN and/or SN) and/or between the UE and a target base station (or target node). However, such conventional techniques are time-consuming, involve considerable signaling exchange, and do not leverage the dual-connectivity configuration to reduce the impact associated with an RLF event.

Aspects of the disclosure are initially described in the context of a wireless communications system. Generally, the described techniques provide for a fast RLF recovery procedure that utilizes a SCG link to trigger a handover instead of using conventional RLF recovery procedures, such as a RRC reestablishment procedure. Generally, the handover procedure provides for fast recovery from the RLF with less interruption of data traffic than such conventional RLF recovery procedures. For example, a UE may typically be connected to a MN and a SN by wireless radio links in a dual-connectivity configuration. The UE may detect or otherwise determine that an RLF has occurred between the UE and the MN. In response, the UE may transmit or otherwise provide an indication of the RLF to the SN in the dual-connectivity configuration. The SN may receive the indication of the RLF between the UE in the MN and transmit, forward, or otherwise provide an indication of the RLF to the MN (e.g., via a wireless transmission between the SN and the MN and/or between a backhaul link between the SN and MN). In some aspects, the indication of the RLF may carry or otherwise convey the measurement report. The MN may receive the indication of the RLF from the SN and identify a target node for the UE, e.g., based at least in part on the measurement report. Accordingly, the MN may initiate or otherwise perform a handover procedure of the UE from the MN to the target node.

Aspects of the disclosure are further illustrated by and described with reference to apparatus diagrams, system diagrams, and flowcharts that relate to fast recovery from link failure in dual-connectivity systems.

FIG. 1 illustrates an example of a wireless communications system 100 that supports fast recovery from link failure in dual-connectivity systems in accordance with aspects of the present disclosure. The wireless communications system 100 includes base stations 105, UEs 115, and a core network 130. In some examples, the wireless communications system 100 may be an LTE network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, the UE 115 may detect a RLF between the UE 115 and a MN (e.g., a base station 105 configured or otherwise operating as an MN) of a dual-connectivity configuration. The UE 115 may transmit, to a SN (e.g., a base station 105 configured or otherwise operating as an SN) in the dual-connectivity configuration, an indication that the RLF has occurred. The UE 115 may perform, based at least in part on the RLF indication, a handover procedure from the MN to a target node.

In some aspects, a base station 105 may (when configured or otherwise operating as an SN) receive, from a UE 115, an indication of a RLF for a radio link between the UE 115 and a MN of a dual-connectivity configuration. The base station 105 may transmit an indication of the RLF to the MN of the dual-connectivity configuration.

In some aspects, a base station 105 may (when configured or otherwise operating as an MN) receive, from a SN of a dual-connectivity configuration, an indication of a RLF from a UE 115, the RLF being for a radio link between the UE 115 and the MN. The base station 105 may identify, based at least in part on the RLF, a target node for the UE 115. The base station 105 may perform a handover procedure of the UE 115 from the MN to the target node.

Figure 2:
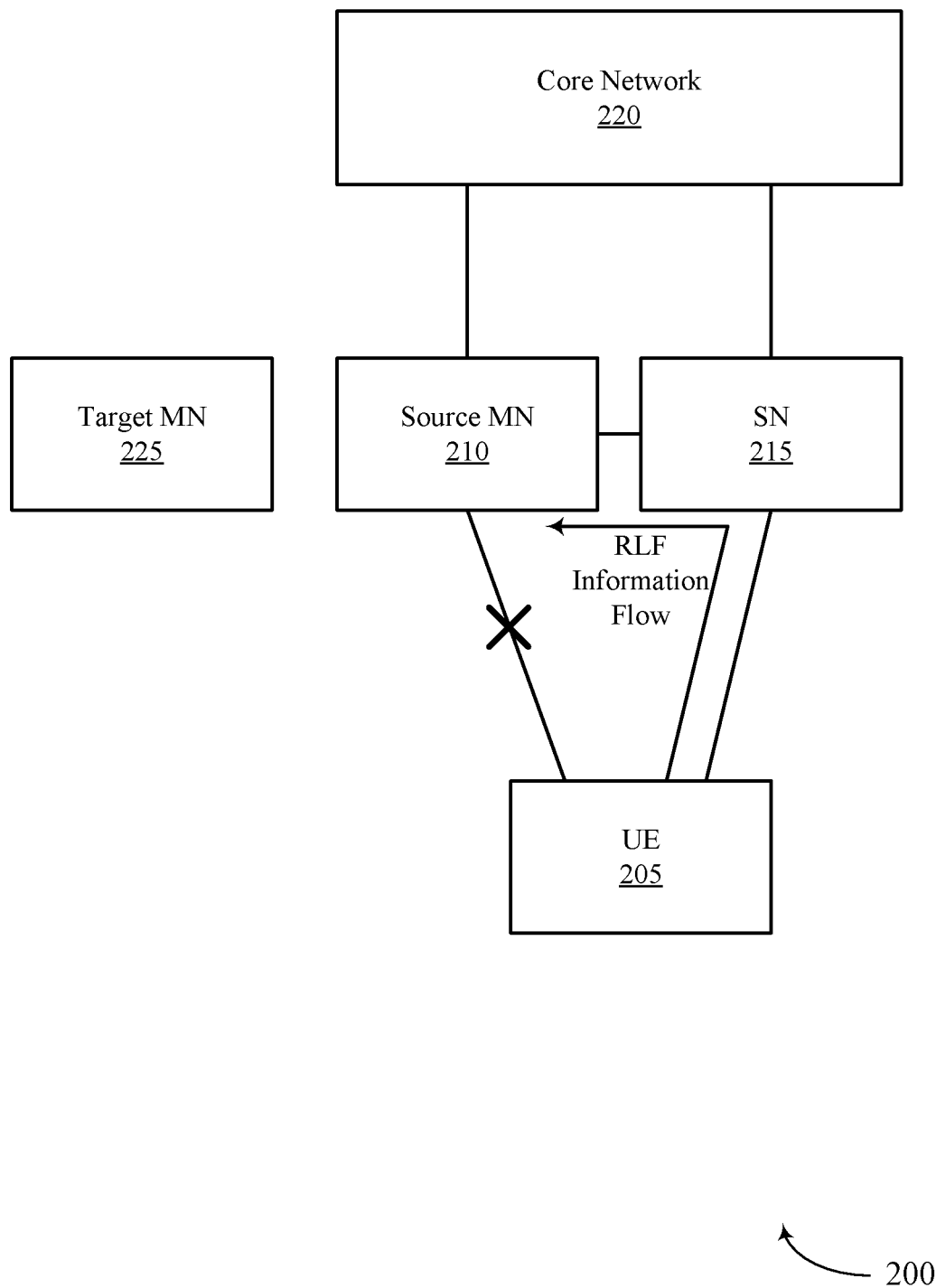
FIG. 2 illustrates an example of a wireless communications system that supports fast recovery from link failure in dual-connectivity systems in accordance with aspects of the present disclosure.

FIG. 2 illustrates an example of a wireless communications system 200 that supports fast recovery from link failure in dual-connectivity systems in accordance with aspects of the present disclosure. In some examples, wireless communications system 200 may implement aspects of wireless communication system 100.

Generally, wireless communication system 200 may include a UE 205 that is connected to a source MN 210 and SN 215 in a dual-connectivity configuration. Generally, the dual-connectivity configuration may include a network configured according to a 5G EN-DC or 5G NR dual-connectivity configuration. In some examples, the source MN 210 may be associated with a 5G or NR radio access technology (RAT) and the SN 215 may be associated with an LTE RAT. In other examples, both of the source MN 210 and the SN 215 may be associated with a 5G or NR RAT. In other examples, both of the source MN 210 and the SN 215 may be associated with an LTE RAT. Generally, the described techniques may be applied to all multi-RAT dual-connectivity (MR-DC) configurations, which may also include NR-NR DC. Generally, UE 205 may connect to the source MN 210 and/or the SN 215 via one or more wireless radio links, such as an MCG link for source MN 210 and an SCG link for SN 215.

In some aspects, source MN 210 may be connected to SN 215 in order to exchange information via a wireless link and/or a wired link, such as a backhaul link (e.g., an X2/Xn protocol connection). Source MN 210 and/or SN 215 may also be connected to a core network 220 via backhaul connection(s). Target MN 225 may generally refer to another base station which may be located proximate to UE 205, and may therefore serve as a suitable candidate to be a new MN for UE 205 in the event that source MN 210 becomes unavailable.

In some aspects, UE 205 may generally experience an RLF for a radio link between UE 205 and source MN 210 and/or between UE 205 and SN 215. For example, UE 205 may perform various channel measurements over the respective wireless links and, based on the channel measurements, determine that the radio link is suddenly unavailable and/or is experiencing performance degradation to the point that the radio link no longer supports wireless communications. In some aspects, UE 205 may also, during and/or based on the channel measurements, identify target MN 225 (e.g., a target node that is a suitable candidate for UE 205 to establish a connection with).

Conventionally, RLF events are handled via an RRC connection reestablishment procedure. For example, UE 205 may detect an RLF between UE 205 and source MN 210 and perform a cell reselection procedure in response to the RLF. UE 205 would then perform a random access channel (RACH) procedure on the selected cell (e.g., target MN 225). UE 205 may then transmit an RRC connection reestablishment request to target MN 225, with target MN 225 responding with an RRC connection reestablishment response message being transmitted to UE 205. UE 205 may then resume MCG SRB1 and generate new keys to use for communicating with target MN 225. UE 205 would then transmit an RRC connection reestablishment complete message to target MN 225. UE 205 and target MN 225 would then need to perform an RRC connection reconfiguration procedure to establish an MCG configuration with UE 205. The data flow may then resume for MCG bearers (e.g., from a S-GW/user-plane function (UPF) of core network 220). UE 205 and SN 215 would then need to perform an SN addition request procedure to once again add SN 215 and establish an SCG configuration with UE 205. Data flow can then resume for the SCG bearers.

However, such RLF recovery procedures using the RRC connection reestablishment consume considerable resources while incurring extended delays in interruptions for wireless communications. For example, the RRC connection reestablishment procedure may involve a two-step procedure to first establish the MCG configuration including data bearers and then the SCG configuration at the UE 205. In the event the RRC connection reestablishment fails because UE 205 happens to select a cell that is not prepared, UE 205 invokes procedures to establish a new RRC connection that incurs additional signaling delays related to access stratum (AS) security establishment that must be completed before UE 205 can be provided radio configuration. Accordingly, upon detection of the MCG link failure (e.g., the RLF between UE 205 and source MN 210), UE 205 performs a cell selection procedure, which further contributes to the delay.

However, aspects of the described techniques provide a fast recovery procedure in the event of an MCG link failure (e.g., an RLF occurs between UE 205 and source MN 210 and/or between UE 205 and SN 215). Although some aspects of the described techniques generally focus on the RLF being in MCG link failure, it is to be understood that the described techniques are not limited to an MCG link failure, but can also be utilized in the event of an SCG link failure between UE 205 and SN 215, e.g., UE 205 may utilize the MCG link to initiate a handover procedure with a target node as a new SN.

Broadly, the described techniques may include UE 205 detecting an MCG link failure (e.g., an RLF) between UE 205 and source MN 210. UE 205 may leverage its connection with SN 215 to resolve the MCG link failure using, for example, a handover procedure of UE 205 from source MN 210 to target MN 225. For example, UE 205 may transmit or otherwise provide an indication to SN 215 of the RLF. In some aspects, this may include UE 205 transmitting or otherwise providing an RRC MCG failure notification message via SN 215 to source MN 210. This indication may be provided, for example, via a split SRB1 bearer and/or an SRB3 bearer between UE 205 and SN 215. The SN 215 may transmit or otherwise provide the indication of the RLF to source MN 210 (e.g., over a backhaul link). Upon receiving the MCG failure notification message (e.g., the indication of the RLF), source MN 210 may initiate an inter-MN handover procedure to handover UE 205 to a target node (such as target MN 225). Accordingly, source MN 210 and/or UE 205 may perform a handover procedure of UE 205 to target MN 225.

In some aspects, UE 205 may utilize a split bearer (e.g., a split SRB1) to provide the indication of the RLF to SN 215. For example, source MN 210 may pre-configure UE 205 to provide RLF indication information to SN 215. In some aspects, UE 205 may additionally indicate a cause for the RLF, e.g., an RLF detection on a MCG, a handover failure, and the like. Accordingly, UE 205 may use an SCG SRB to carry or convey the indication of the RLF to SN 215.

In some aspects, UE 205 may determine that target MN 225 is unavailable for a handover procedure. For example, UE 205 may perform various channel measurements to monitor performance of the radio links between UE 205 and source MN 210 and/or SN 215. UE 205 may also monitor for, during such channel measurements, candidate nodes that are suitable for establishing connections with. If network determines that a target node is unavailable, UE 205 may be handed over from source MN 210 to SN 215 when an MCG RLF is detected, with the SN 215 becoming the new MN for UE 205. In that sense, SN 215 would become a new MN for UE 205. In some aspects, this may include configuring SN 215 as a single-connectivity configuration, or configuring SN 215 as a dual-connectivity configuration where UE 205 may connect to a new SN (not shown) to continue to operate in a dual-connectivity configuration.

In some aspects, an RLF may also occur for the radio link between UE 205 and SN 215 (e.g., an SCG RLF). If the RLF is detected before UE 205 is able to transmit the indication of the MCG RLF, UE 205 may perform an RRC reestablishment procedure with source MN 210 and/or SN 215. In some aspects, UE 205 may perform an RRC connection establishment procedure with target MN 225 in the event an MCG RLF and an SCG RLF is detected. If the SCG RLF is detected after UE 205 transmits the indication of the MCG RLF, UE 205 may attempt to perform an RRC connection reestablishment procedure with source MN 210 and/or SN 215. Again, in some aspects UE 205 may perform an RRC connection establishment procedure with target MN 225 in the event that an MCG RLF and an SCG RLF is detected.

In some aspects, the MCG RLF may be detected while UE 205 is involved in a handover procedure from SN 215 to a new SN (not shown). In this event, UE 205 may transmit the indication of the MCG RLF to SN 215 and/or the new SN, e.g., depending upon which phase of the SN handover procedure has been completed.

In some aspects, SN 215 may forward the indication of the RLF (e.g., the indication of the MCG RLF) to source MN 210 using a variety of mechanisms. In some aspects, the approach adopted by SN 215 may be dependent upon the mechanism by which UE 205 provides the indication of the RLF to SN 215. For example, when UE 205 utilizes an SRB1 to provide the indication of the RLF, SN 215 may decode the message conveyed over the SRB1 to determine that the MCG RLF is being indicated. In this context, SN 215 may generate a new message (e.g., a second message) for transmitting the indication of the RLF to source MN 210. In another example, UE 205 may utilize an SRB3 for providing the indication of the MCG RLF to SN 215. In this context, SN 215 may encapsulate the indication for forwarding to source MN 2 110, e.g., according to an Xn and/or X2 protocol.

Source MN 210 generally receives the indication of the MCG RLF from SN 215 and performs a handover of UE 205 to target MN 225. In some aspects, source MN 210 may identify the target node (e.g., target MN 225) based on the indication of the RLF. For example, source MN 210 may identify the target node based on measurement report(s) conveyed in the indication, and select the target node (e.g., select target MN 225) based on the measurement report(s). In some aspects, source MN 210 may identify the target node based on whether or not the target node (e.g., target MN 225) operates utilizing the same RAT or a different RAT, the same radio frequency spectrum band or a different radio frequency spectrum band, and the like, as source MN 210. Accordingly, source MN 210 may select a target node that supports continued operation in a dual-connectivity configuration, when available.

In some aspects, the target node (e.g., target MN 225) may be associated with the same base station as source MN 210. For example, the base station may have a central unit (CU) that manages one or more distributed units (DUs). Source MN 210 may be a first DU of the base station and target MN 225 may be a second DU of the base station. In this context, the CU may manage one or aspects of performing a handover of UE 205 from the first DU (e.g., source MN 210) to the second DU (e.g., target MN 225) of the base station. In other aspects, target MN 225 (e.g., the target node) may be a separate entity with respect to source MN 210 and/or SN 215.

Accordingly, aspects of the described techniques provide a mechanism where UE 205 recovers from an MCG RLF (and/or an SCG RLF) by performing a handover procedure rather than the conventional RRC-based and/or RLF recovery-based techniques. The described fast RLF recovery procedure improves the recovery time and minimizes downtime for wireless communications.

In some aspects, handling of additional scenarios and error cases may also be addressed. For example, in one case where the target MN 225 is connected to a different RAT than the source MN (e.g., change from EN-DC to NR-DC, or source MN 210 is an eNB and target MN 225 is a gNB), an inter-system handover procedure may be invoked. In the situation where an inter-MN handover procedure to the target MN 225 fails because of MCG failure, UE 205 may transmit or otherwise provide an MCG failure information message to the SNs to trigger the described fast recovery procedure. If there is an SCG link failure (e.g., if UE 205 detects SCG RLF) after SN 215 reports MCG failure, then UE 205 may perform an RRC reestablishment procedure. If UE 205 detects simultaneous failure of SCG and MCG links, then UE 205 may initiate an RRC reestablishment procedure. If source MN 210 fails during SN change (e.g., during an SN handover procedure), UE 205 may transmit or otherwise provide an MCG RLF report to the target SN if the related signaling is complete, e.g., target SN receives the reconfiguration complete message. If UE 205 does not succeed in sending reconfiguration complete message to the target SN and MCG RLF occurs, UE 205 may perform a reestablishment procedure.

Figure 3A:
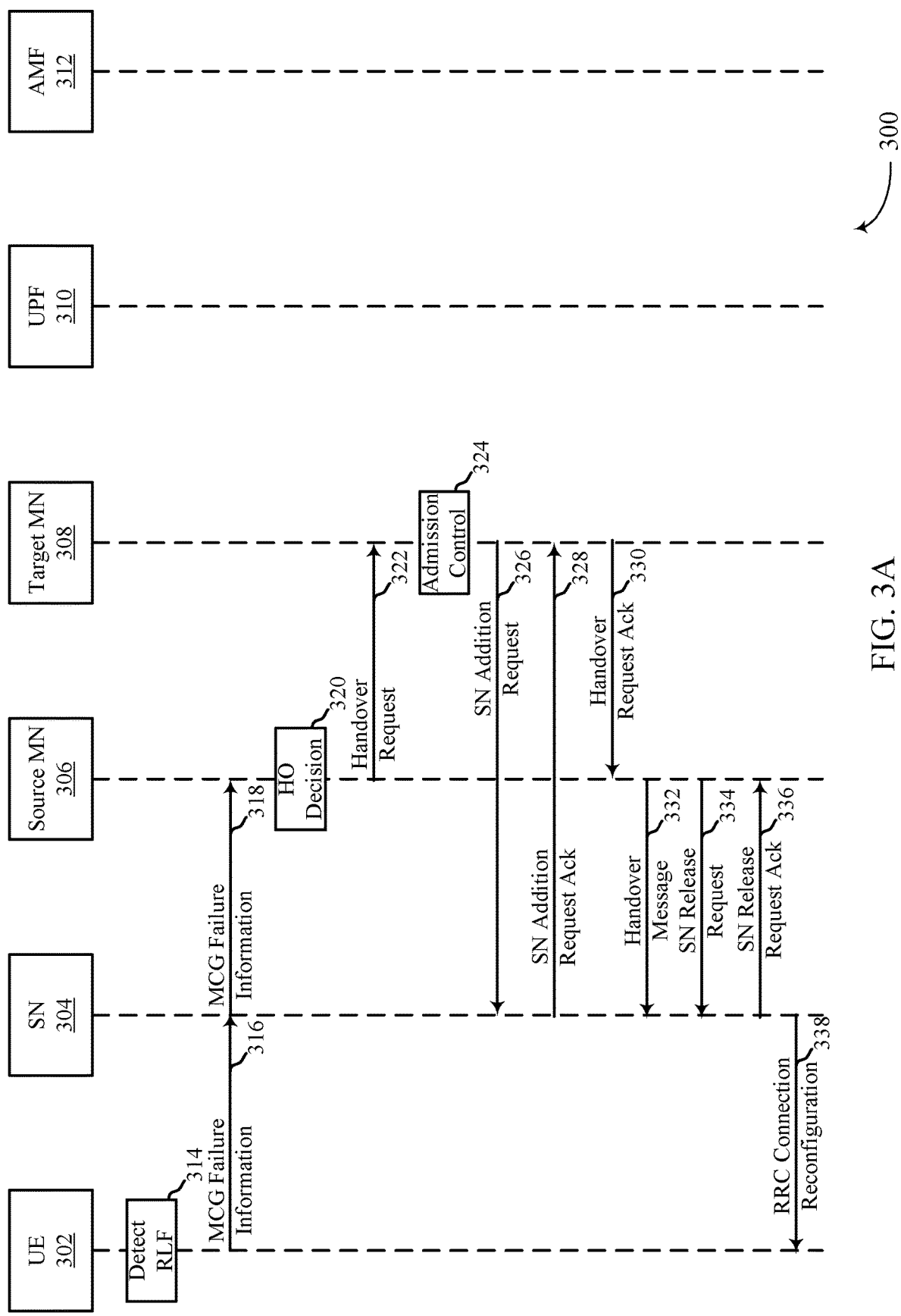
FIGS. 3A and 3B illustrate an example of a process flow that supports fast recovery from link failure in dual-connectivity systems in accordance with aspects of the present disclosure.
Figure 3B:
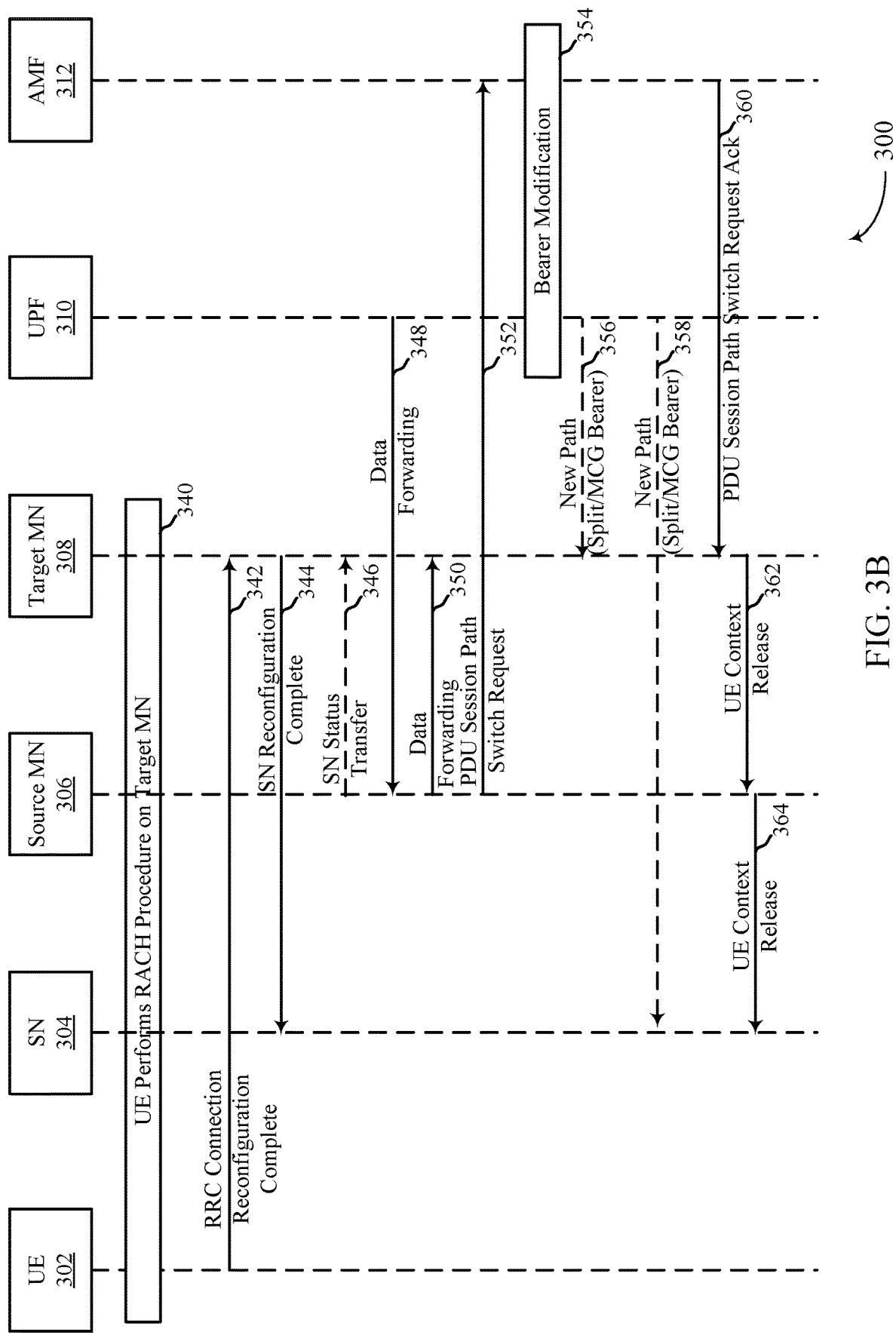

FIGS. 3A and 3B illustrate an example of a process flow 300 that supports fast recovery from link failure in dual-connectivity systems in accordance with aspects of the present disclosure. FIG. 3B is a continuation of FIG. 3A. In some examples, process flow 300 may implement aspects of wireless communication systems 100 and/or 200. Aspects of process 300 may be implement a by UE 302, an SN 304, a source MN 306, a target MN 308, the UPF 310, and/or an access and mobility management function (AMF) 312, which may be examples of the corresponding devices described herein. In some aspects, the UPF 310 and/or AMF 312 may be one or more functions operating within a core network. Aspects of process 300 may be implemented or otherwise triggered when UE 302 detects failure of the MCG link. In some aspects, UE 302 may identify or otherwise determine that target MN 308 is available, e.g., based on one or more channel measurements performed by UE 302.

At 314, UE 302 may detect an RLF. In some aspects, the RLF may refer to an MCG failure or an MCG RLF for a radio link between UE 302 and source MN 306. In some aspects, the RLF may be detected based on one or more channel measurements performed by UE 302.

At 316, UE 302 may transmit or otherwise provide an indication of the RLF to SN 304. In some aspects, the indication of the RLF may be carried or conveyed in an MCG failure information or notification message. In some aspects, UE 302 may carry or convey an indication of a measurement report and/or an MCG link failure cause to SN 304.

In some aspects, UE 302 may transmit or otherwise provide the indication of the RLF using a bearer carrying or conveying an RRC MCG failure information or notification message. This may include the message being transmitted over a split SRB1 and/or an SRB3. When a split SRB1 has been established, UE 302 may use this bearer for providing the indication of the RLF. In some aspects, source MN 306 may have indicated or otherwise configured UE 302 (e.g., through previous RRC signaling) that for split SRB1, UE 302 may utilize the SN path in the case of MCG link failure. If SRB3 has been configured, UE 302 may use this bearer as an alternative. If SRB3 is used, SN 304 may encapsulate the message in an X2/Xn message (e.g., new container or message) and then transmit this to source MN 306.

In some aspects, the indication of the RLF (e.g., the MCG failure information message) may carry or convey a measurement report and/or an MCG link failure cause. Examples of the MCG link failure cause may include, but are not limited to, an RLF detection on the MCG link and/or a handover failure (e.g., expiration of a T304 timer).

At 318, SN 304 may transmit or otherwise provide an indication of the RLF to source MN 306. At 320, source MN 306 may make a handover decision. In some aspects, source MN 306 may determine or otherwise decide to perform the handover based on the measurement report. Accordingly, source MN 306 may determine to initiate an inter-MN handover procedure of UE 302.

At 322, source MN may 306 transmit a handover request message to target MN 308. In some aspects, the handover request message may carry or convey UE configuration information for UE 302, e.g., radio configuration information, quality of service (QoS) requirements, bearer configuration information, and the like. In some aspects, the handover request message may carry or convey an indication of UE 302 context in the source MN 306 and/or SN 304, SN ID (e.g., an identifier for SN 304), a target cell ID (e.g., an identifier for target MN 308), and/or an SN UE Xn application protocol (XnAP) ID.

At 324, target MN 308 may perform admission control for the handover. In some aspects, admission control may be performed by the target MN 308, e.g., utilizing the QoS and/or bearer information carried or conveyed in the handover request message.

At 326, target MN 308 may transmit or otherwise provide an SN addition request message to SN 304. In some aspects, this may include target MN 308 requesting SN 304 to provide SCG configuration information using the SN addition request message. The SN addition request message may carry or convey the SN UE XnAP ID as a reference to the UE context with SN 304 that was established by the source MN 306.

At 328, SN 304 may transmit or otherwise provide an indication of an SN addition request acknowledgment to target MN 308. At 330, target MN 308 may transmit or otherwise provide an indication of a handover request acknowledgment message to source MN 306. In some aspects, the handover request acknowledgment message may include a container, or otherwise be included in a container, along with an RRC handover message to be sent to UE 302. In some aspects, this may include target MN 308 configuring the handover request acknowledge message to carry or convey the handover command message (e.g., RRCConnectionReconfiguration) to be transmitted by SN 304 to UE 302.

At 332, source MN 306 may transmit or others provide a handover message to SN 304. In some aspects, the handover message may include a container, or be in a container, along with an RRC message to be sent to the UE 302.

At 334, source MN 306 may transmit or otherwise provide an indication of an SN release request to SN 304. In some aspects, this may include the SN release request message carrying or conveying an indication that SN 304 shall not release the UE context associated with the target MN 308. At 336, SN 304 may transmit or otherwise provide an indication of an SN release request acknowledgment message to source MN 306.

At 338, SN 304 may transmit or otherwise provide an indication of an RRCConnectionReconfiguration message to UE 302. In some aspects, the RRCConnectionReconfiguration message may carry or convey an indication of UE MCG and SCG configuration for subsequent communications with target MN 308 and SN 304. In some aspects, the RRCConnectionReconfiguration message may carry or convey an indication of information for UE 302 to use for generating new security keys.

At 340, UE 302 may perform a RACH procedure on target MN 308. In some aspects, this may include UE 302 obtaining synchronization and access information from the target MN 308.

At 342, UE 302 may transmit or otherwise provide an indication of an RRCConnectionReconfiguration complete message to target MN 308. In some aspects, the RRCConnectionReconfiguration complete message may carry or convey an indication of a successful handover to target MN 308.

At 344, target MN 308 may transmit or otherwise provide an indication of an SN reconfiguration complete message to SN 304. In some aspects, this may include target MN 308 indicating success of MCG configuration set up to SN 304 using the SN reconfiguration complete message.

At 346, source MN 306 may optionally transmit or otherwise provide an indication of an SN status transfer message to target MN 308. In some aspects, for bearers using radio link control (RLC) acknowledgment mode (AM), source MN 306 may provide a PDCP SN status information using the SN status transfer message.

At 348, UPF 310 may transmit or otherwise perform data forwarding to source MN 306. At 350, source MN 306 a transmit or otherwise perform data forwarding to target MN 308. In some aspects, this may include data transmitted to the source MN 306 being transmitted or otherwise provided to the target MN 308.

At 352, source MN 306 may transmit or otherwise provide an indication of a PDU session path switch request to AMF 312. At 354, UPF 310 and AMF 312 may perform bearer modifications, e.g., modify bearer(s) based at least in part on the MCG RLF and subsequent handover. At 356, UPF 310 may optionally transmit or otherwise provide an indication of a new path (e.g., a split bearer and/or MCG bearer) to target MN 308. At 358, UPF 310 may optionally transmit or otherwise provide an indication of a new path (e.g., a split bearer and/or MCG bearer) to SN 304. At 360, AMF 312 may transmit or otherwise provide an indication of the PDU session path switch request acknowledgment to target MN 308. In some aspects, this may include a PDU session path switch procedure being carried out in order to switch the data path towards the target MN 308.

At 362, target MN 308 may transmit or otherwise provide an indication of a UE context release message to source MN 306. In some aspects, this may include target MN 308 initiating the UE context release procedure towards source MN 306.

At 364, source MN 306 may transmit or otherwise provide an indication of the UE context release message to SN 304. In some aspects, upon reception of the UE context release message from source MN 306, SN 304 may release control plane related resources associated with the UE context towards the source MN 306. In some aspects, the functions performed at 320-364 may be considered an inter-MN handover procedure.

Figure 4:
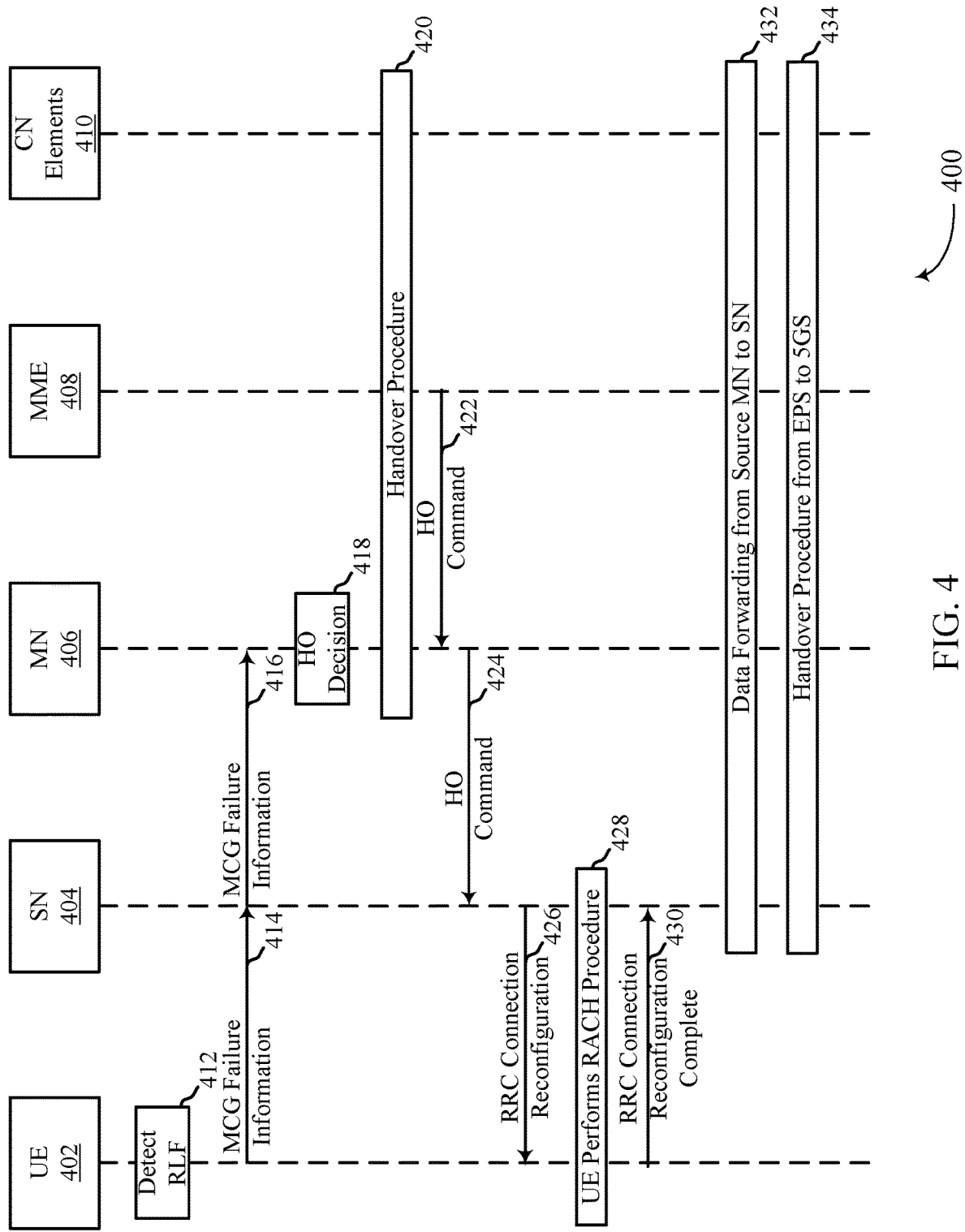
FIG. 4 illustrates an example of a process flow that supports fast recovery from link failure in dual-connectivity systems in accordance with aspects of the present disclosure.

FIG. 4 illustrates an example of a process flow 400 that supports fast recovery from link failure in dual-connectivity systems in accordance with aspects of the present disclosure. In some examples, process flow 400 may implement aspects of wireless communication systems 100 and/or 200. Aspects of process 400 may be implement a by UE 402, an SN 404, an MN 406, a mobility management entity (MME) 408, and/or core network (CN) elements 410, which may be examples of the corresponding devices described herein. Aspects of process 400 may be implemented or otherwise triggered when UE 402 detects failure of the MCG link. In some aspects, process 400 illustrates an example case where SN 404 may configure a single connection to itself when an MCG RLF occurs.

In some aspects, the measurement report provided by UE 402 may indicate that there is no available target node (e.g., no target MN) for MN 406 to perform a handover of UE 402 to. However, SN 404 may be able to configure a single connection to itself if SN 404 supports a control plane interface to the core network (e.g., NG-C/S1-C to AMF/MME), with all of the control plane interface functionalities. Accordingly, the RLF fast recovery procedure in this context may include UE 402 transmitting the MCG failure information message (e.g., RLF indication) to MN 406 via SN 404 over a split SRB1 or SRB3. MN 406 processes the MCG failure information message and determines that there is no available target MNs, and decides whether or not to handover UE 402 to SN 404. Alternatively, SN 404 may process the MCG failure information message from UE 402 and forward a request for handover to MN 406. If MN 406 decides to perform a handover procedure, it may initiate an X2/Xn handover or inter-system handover to SN 404. The type of handover to be performed may depend on the case or configuration. For example, an inter-system handover from MN 406 to SN 404 may be performed for E-UTRA-NR dual connectivity (EN-DC), NR-E-UTRA dual connectivity (NE-DC), and NG-RAN-E-UTRA dual connectivity (NGEN-DC) cases or configurations whereas an X2/Xn handover from MN 406 to SN 404 may be performed for NR-DC and LTE-DC changed from EN-DC to the case where an LTE eNB has user plane and control plane connections to the 5G core network. Process 400 generally illustrates a call flow for the EN-DC case.

At 412, UE 402 may detect an RLF. In some aspects, the RLF may refer to an MCG failure or an MCG RLF for a radio link between UE 402 and MN 406. In some aspects, the RLF may be detected based on one or more channel measurements performed by UE 402.

At 414, UE 402 may transmit or otherwise provide an indication of the RLF to SN 404. In some aspects, the indication of the RLF may be carried or conveyed in an MCG failure information or notification message. In some aspects, UE 402 may carry or convey an indication of a measurement report and/or an MCG link failure cause to SN 404.

In some aspects, UE 402 may transmit or otherwise provide the indication of the RLF using a bearer carrying or conveying an RRC MCG failure information or notification message. This may include the message being transmitted over a split SRB1 and/or an SRB3. When a split SRB1 has been established, UE 302 may use this bearer for providing the indication of the RLF. In some aspects, MN 306 may have indicated or otherwise configured UE 402 (e.g., through previous RRC signaling) that for split SRB1, UE 402 may utilize the SN path in the case of MCG link failure. If SRB3 has been configured, UE 402 may use this bearer as an alternative. If SRB3 is used, SN 404 may encapsulate the message in an X2/Xn message (e.g., new container or message) and then transmit this to MN 406. In some aspects, the indication of the RLF (e.g., the MCG failure information message) may carry or convey a measurement report and/or an MCG link failure cause.

At 416, SN 404 may transmit or otherwise provide an indication of the RLF to MN 406. At 418, MN 406 may make a handover decision. In some aspects, MN 406 may determine or otherwise decide to perform the handover based on the measurement report. In this example, the measure report may indicate that there are no target MNs (or target nodes) available to perform a handover procedure. Accordingly, MN 406 may determine to handover UE 402 to SN 404.

At 420, MN 406, MME 408, and core network elements 410 may perform a handover procedure. In some aspects, a handover procedure may be from an evolved packet system (EPS) to a 5G system (5GS).

At 422, MME 408 may transmit a handover command message to MN 406. In some aspects, the handover command message may be container, or be included in a container, to be sent to UE 402 as an SN RRC message.

At 424, MN 406 may transmit or otherwise provide a handover command message to SN 404. Again, in some aspects the handover command message may be container, or be included in a container, to be sent to UE 402 as an RRC message.

At 426, SN 404 may transmit or otherwise provide an indication of an RRCConnectionReconfiguration message to UE 402. In some aspects, this may carry or convey configuration information to be used by UE 402 for communications with SN 404 upon handover.

428, UE 402 may perform a RACH procedure with SN 404. In some aspects, this may include UE 402 obtaining and synchronization and/or other configuration information from SN 404.

At 430, UE 402 may transmit or otherwise provide an indication of an RRCConnectionReconfiguration complete message to SN 404. At 432, data forwarding from a source MN (e.g., MN 406) to SN 404 may be performed by SN 404, MN 406, MME 408, and/or CN elements 410. At 434, handover procedures may be completed by SN 404, MN 406, MME 408, and/or CN elements 410. In some aspects, the handover procedures may be from EPS to 5GS.

Figure 5:
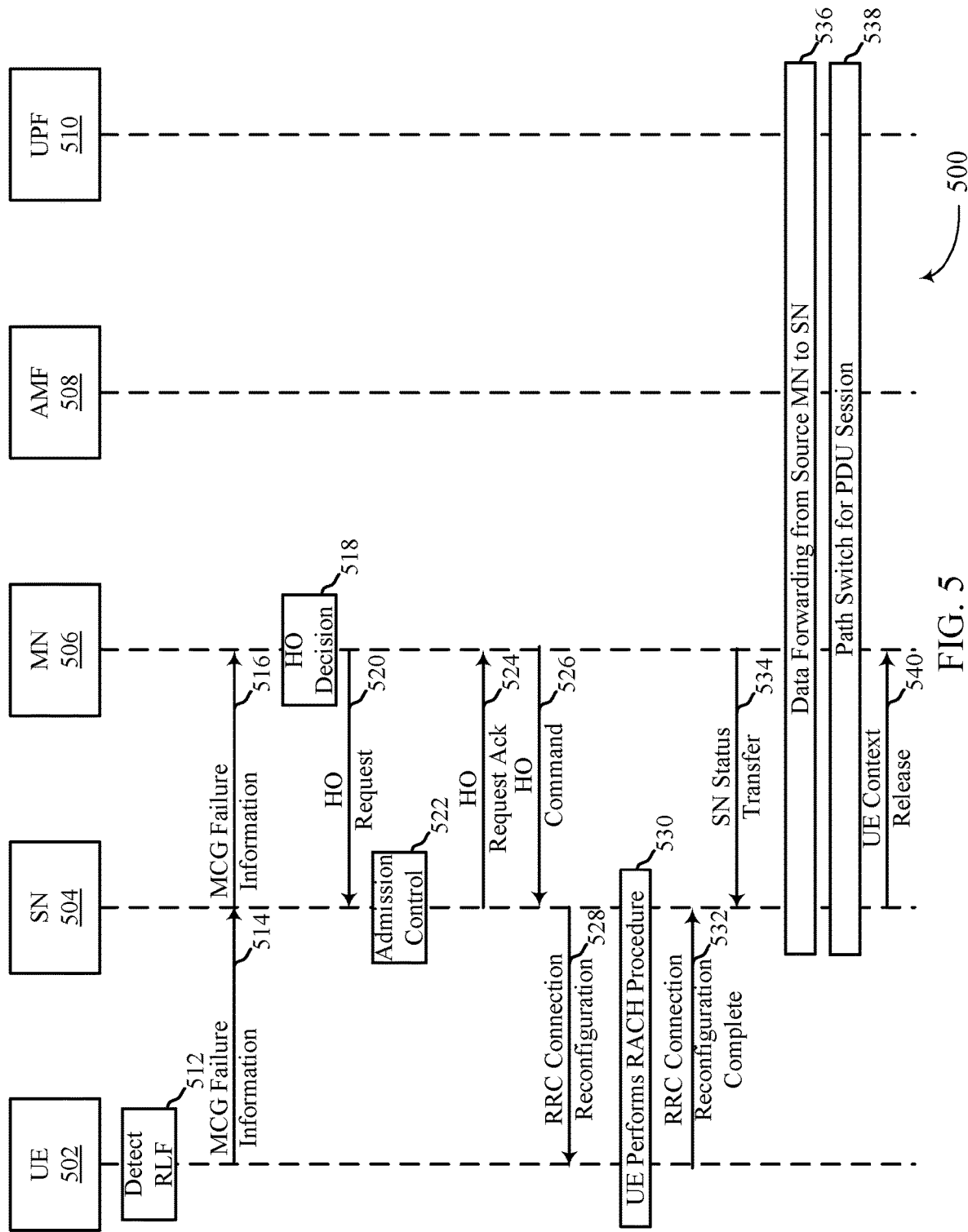
FIG. 5 illustrates an example of a process flow that supports fast recovery from link failure in dual-connectivity systems in accordance with aspects of the present disclosure.

FIG. 5 illustrates an example of a process flow 500 that supports fast recovery from link failure in dual-connectivity systems in accordance with aspects of the present disclosure. In some examples, process flow 500 may implement aspects of wireless communication systems 100 and/or 200. Aspects of process 500 may be implement a by UE 502, an SN 504, an MN 506, an AMF 508, and/or a UPF 510, which may be examples of the corresponding devices described herein. Aspects of process 500 may be implemented or otherwise triggered when UE 502 detects failure of the MCG link. In some aspects, process 500 illustrates an example case where SN 504 may configure a single connection to itself when an MCG RLF occurs.

In some aspects, the measurement report provided by UE 502 may indicate that there is no available target node (e.g., no target MN) for MN 506 to perform a handover of UE 502 to. However, SN 504 may be able to configure a single connection to itself if SN 504 supports a control plane interface to the core network (e.g., NG-C/S1-C to AMF/MME), with all of the control plane interface functionalities. Accordingly, the RLF fast recovery procedure in this context may include UE 502 transmitting the MCG failure information message to MN 506 via SN 504 over a split SRB1 or SRB3. MN 506 processes the MCG failure information message determines that there is no available target MNs, and decides whether or not to handover UE 502 to SN 504. Alternatively, SN 504 may process the MCG failure information message from UE 502 and forward a request for handover to MN 506. If MN 506 decides to perform a handover procedure, it may initiate an X2/Xn handover or inter-system handover to SN 504. The type of handover to be performed may depend on the case or configuration. For example, an inter-system handover from MN 506 to SN 504 may be performed for EN-DC, NE-DC, and NGEN-DC cases or configurations whereas an X2/Xn handover from MN 506 to SN 504 may be performed for NR-DC and LTE-DC change from NE-DC to the case where an LTE eNB has user plane and control plane connections to the 5G core network. Process 500 generally illustrates a call flow for the NR-DC case.

At 512, UE 502 may detect an RLF. In some aspects, the RLF may refer to an MCG failure or an MCG RLF for a radio link between UE 502 and MN 506. In some aspects, the RLF may be detected based on one or more channel measurements performed by UE 502.

At 514, UE 502 may transmit or otherwise provide an indication of the RLF to SN 504. In some aspects, the indication of the RLF may be carried or conveyed in an MCG failure information or notification message. In some aspects, UE 502 may carry or convey an indication of a measurement report and/or an MCG link failure cause to SN 504.

In some aspects, UE 502 may transmit or otherwise provide the indication of the RLF using a bearer carrying or conveying an RRC MCG failure information or notification message. This may include the message being transmitted over a split SRB1 and/or an SRB3.

At 516, SN 504 may transmit or otherwise provide an indication of the RLF to MN 506. At 518, MN 506 may make a handover decision. In some aspects, MN 506 may determine or otherwise decide to perform the handover based on the measurement report. In this example, the measure report may indicate that there are no target MNs (or target nodes) available to perform a handover procedure. Accordingly, MN 506 may determine to handover UE 502 to SN 504, where SN 504 transitions to a single-connectivity configuration.

At 520, MN 506 may transmit or provide an indication of a handover request message to SN 504. At 522, SN 504 may perform admission control procedures for the handover of UE 502. At 524, SN 504 may transmit or otherwise provide an indication of a handover request acknowledgment message to MN 506.

At 526, MN 506 may transmit or otherwise provide a handover command message to SN 504. In some aspects, the handover command message may be container, or may include a container, to be sent to UE 502 as an RRC message.

At 528, SN 504 may transmit or otherwise provide an indication of an RRCConnectionReconfiguration message to UE 502. In some aspects, this may carry or convey configuration information to be used by UE 502 for communications with SN 504 upon handover.

At 530, UE 502 may perform a RACH procedure with SN 504. In some aspects, this may include UE 502 obtaining synchronization and/or other configuration information from SN 504. At 532, UE 502 may transmit or otherwise provide an indication of an RRCConnectionReconfiguration complete message to SN 504. At 534, MN 506 may transmit or otherwise provide an indication of an SN transfer status message to SN 504.

At 536, data forwarding from a source MN (e.g., MN 506) to SN 504 may be performed by SN 504, MN 506, AMF 508, and/or UPF 510. At 538, path switch for the PDU session may be completed by SN 504, MN 506, AMF 508, and/or UPF 510. At 540, SN 504 may transmit or otherwise provide an indication of the UE context release message to MN 506.

Figure 6A:
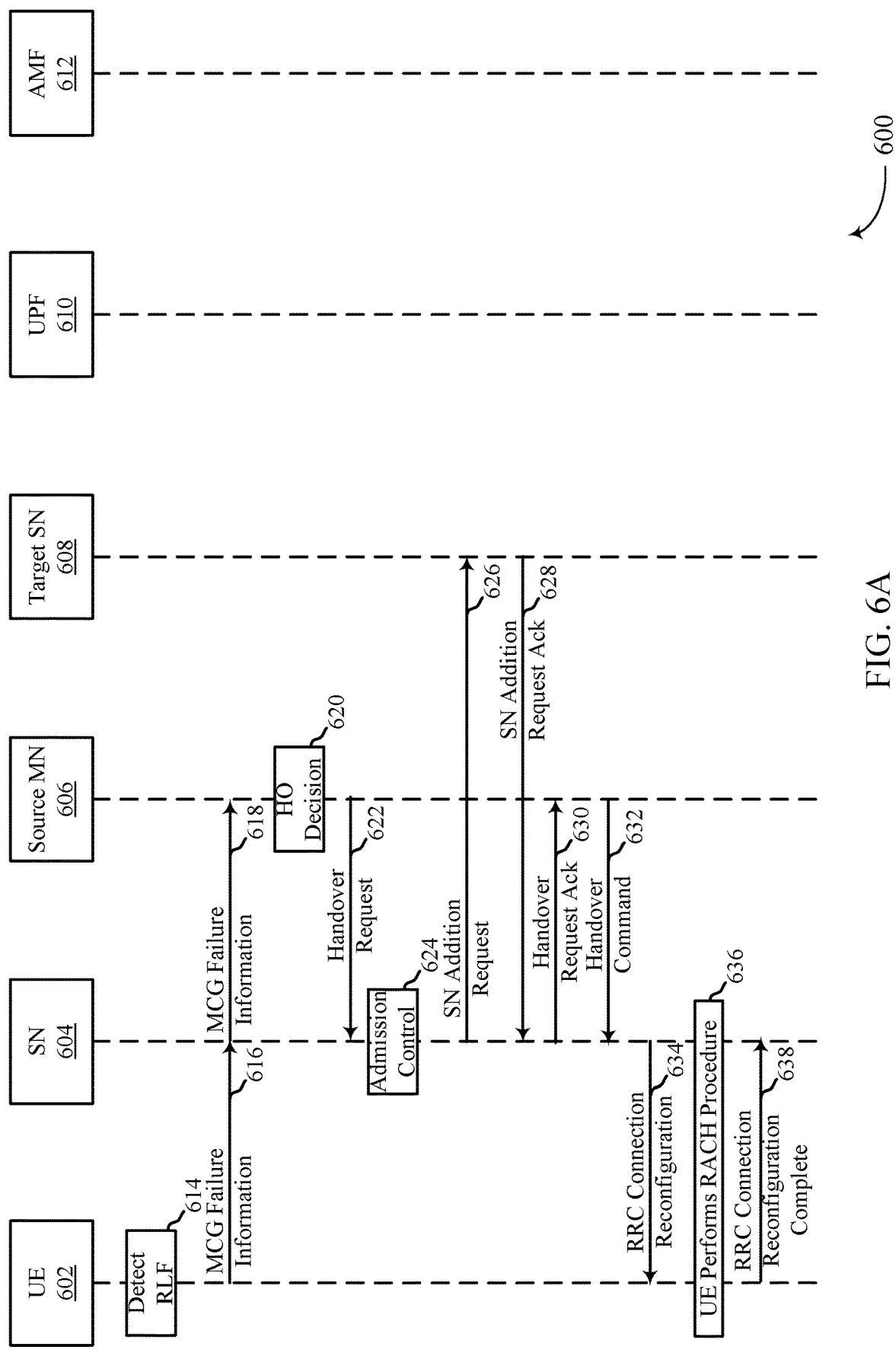
FIGS. 6A and 6B illustrate an example of a process flow that supports fast recovery from link failure in dual-connectivity systems in accordance with aspects of the present disclosure.
Figure 6B:
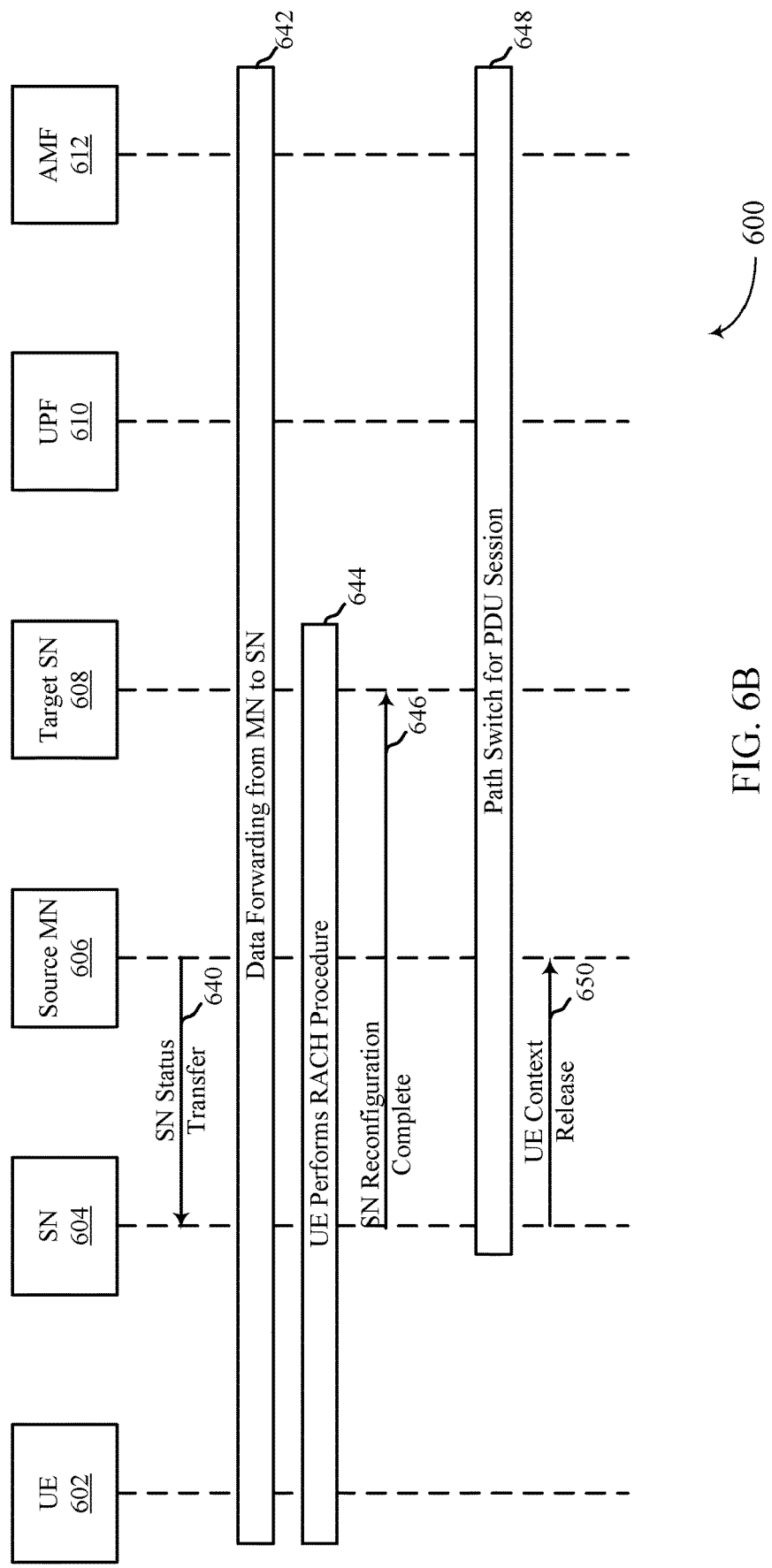

FIGS. 6A and 6B illustrate an example of a process flow 600 that supports fast recovery from link failure in dual-connectivity systems in accordance with aspects of the present disclosure. FIG. 6B is generally a continuation of FIG. 6A. In some examples, process flow 600 may implement aspects of wireless communication systems 100 and/or 200. Aspects of process 600 may be implement a by UE 602, an SN 604, an MN 606, a target SN 608, a UPF 610, and/or an AMF 612, which may be examples of the corresponding devices described herein. Aspects of process 600 may be implemented or otherwise triggered when UE 602 detects failure of the MCG link. In some aspects, process 600 illustrates an example case where a DC configuration can be configured with SN 604 becoming a new MN and a new node (e.g., target SN 608) added as a new SN for UE 602.

In some aspects, the measurement report provided by UE 602 may indicate that there is no available target node (e.g., no target MN) for source MN 606 to perform a handover of UE 602 to. However, SN 604 may be able to be configured as a new MN for UE 602 if SN 604 supports the control plane interface to the core network (e.g., NG-C/S1-C to AMF/MME), with all of the control plane interface functionalities. Accordingly, the RLF fast recovery procedure in this context may include UE 602 performing a handover procedure from source MN 606 to SN 604, with SN 604 becoming a new MN for UE 602 and target SN 608 being added as a new SN for UE 602. The type of handover to be performed may depend on the case or configuration. For example, an inter-system handover from MN 606 to SN 604 may be performed for EN-DC to NE-DC or NR-DC and/or for NE-DC to EN-DC or LTE-DC change cases or configurations whereas an X2/Xn handover from MN 606 to SN 604 may be performed for NR-DC to NE-DC or ND-DC change, for NGEN-DC to NE-DC or NR-DC change, and/or for NE-DC to NGEN-DC change cases or configurations. Process 600 generally illustrates a call flow for the case where DC (e.g., dual-connectivity) can be configured with SN 604 becoming a new MN and a new node (e.g., target node 608)

being added as a new SN for UE 602. It is to be understood that call flows for the other cases or configurations are similar.

At 614, UE 602 may detect an RLF. In some aspects, the RLF may refer to an MCG failure or an MCG RLF for a radio link between UE 602 and MN 606. In some aspects, the RLF may be detected based on one or more channel measurements performed by UE 602.

At 616, UE 602 may transmit or otherwise provide an indication of the RLF to SN 604. In some aspects, the indication of the RLF may be carried or conveyed in an MCG failure information or notification message. In some aspects, UE 602 may carry or convey an indication of a measurement report and/or an MCG link failure cause to SN 604.

In some aspects, UE 602 may transmit or otherwise provide the indication of the RLF using a bearer carrying or conveying an RRC MCG failure information or notification message. This may include the message being transmitted over a split SRB1 and/or an SRB3.

At 618, SN 604 may transmit or otherwise provide an indication of the RLF to source MN 606. At 620, source MN 606 may make a handover decision. In some aspects, source MN 606 may determine or otherwise decide to perform the handover based on the measurement report. In this example, the measurement report may indicate that there are no target MNs (or target nodes) available to perform a handover procedure. Accordingly, MN 606 may determine to handover UE 602 to SN 604, with SN 604 becoming the new MN for UE 602 after the handover. In some aspects, the measurement report may identify target SN 608 (e.g., the target node in this context) as being available as a new SN for UE 602.

At 622, source MN 606 may transmit or provide an indication of a handover request message to SN 604. At 624, SN 604 may perform admission control procedures for the handover of UE 602. At 626, SN 604 may transmit or otherwise provide an indication of an SN addition request message to target SN 608. At 628, target SN 608 may transmit or otherwise provide an indication of an SN addition request acknowledgment message to SN 604.

At 630, SN 604 may transmit or otherwise provide a handover request acknowledgment message to source MN 606. At 632, source MN 606 may transmit or otherwise provide an indication of a handover command message to SN 604. In some aspects, the handover command message may be container, or may include a container, to be sent to UE 602 as an RRC message.

At 634, SN 604 may transmit or otherwise provide an indication of an RRCConnectionReconfiguration message to UE 602. In some aspects, this may carry or convey configuration information to be used by UE 602 for communications with SN 604 upon handover.

At 636, UE 602 may perform a RACH procedure with SN 604. In some aspects, this may include UE 602 obtaining synchronization and/or other configuration information from SN 604.

At 638, UE 602 may transmit or otherwise provide an indication of an RRCConnectionReconfiguration complete message to SN 604. At 640, source MN 606 may transmit or otherwise provide an indication of an SN transfer status message to SN 604.

At 642, data forwarding from a MN (e.g., source MN 606) to SN 604 may be performed by SN 604, source MN 606, target SN 608, UPF 610, and/or AMF 612. At 644, UE 602 may perform a RACH procedure with target SN 608. In some aspects, this may include UE 602 obtaining synchronization and/or other configuration information for performing wireless communications with target SN 608 after the handover procedure. At 646, SN 604 may transmit or otherwise provide an indication of an SN reconfiguration complete message to target SN 608.

At 648, path switch for the PDU session may be completed by SN 604, source MN 606, target SN 608, UPF 610, and/or AMF 612. At 650, SN 604 may transmit or otherwise provide an indication of the UE context release message to source MN 606.

Figure 7A:
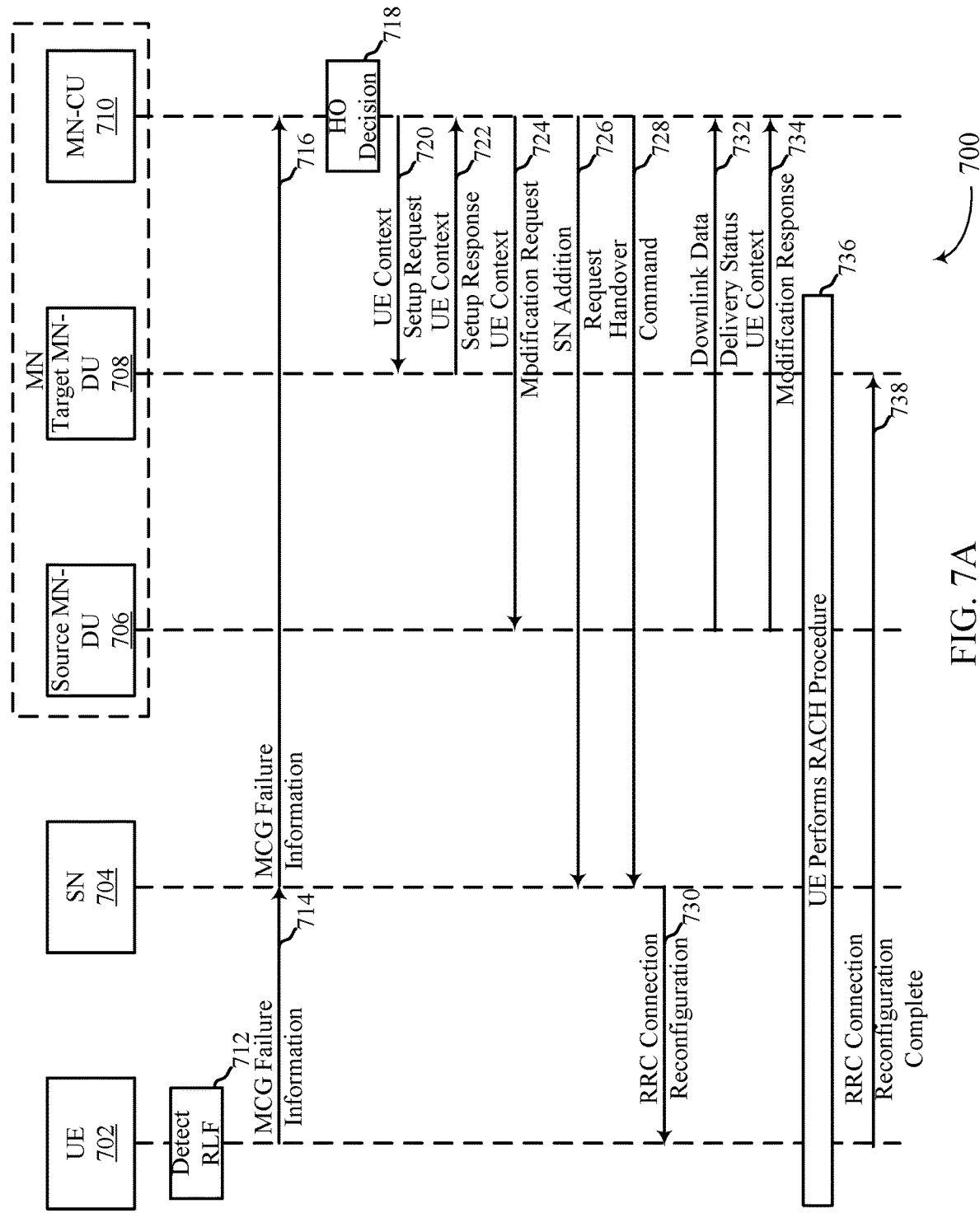
FIGS. 7A and 7B illustrate an example of a process flow that supports fast recovery from link failure in dual-connectivity systems in accordance with aspects of the present disclosure.
Figure 7B:
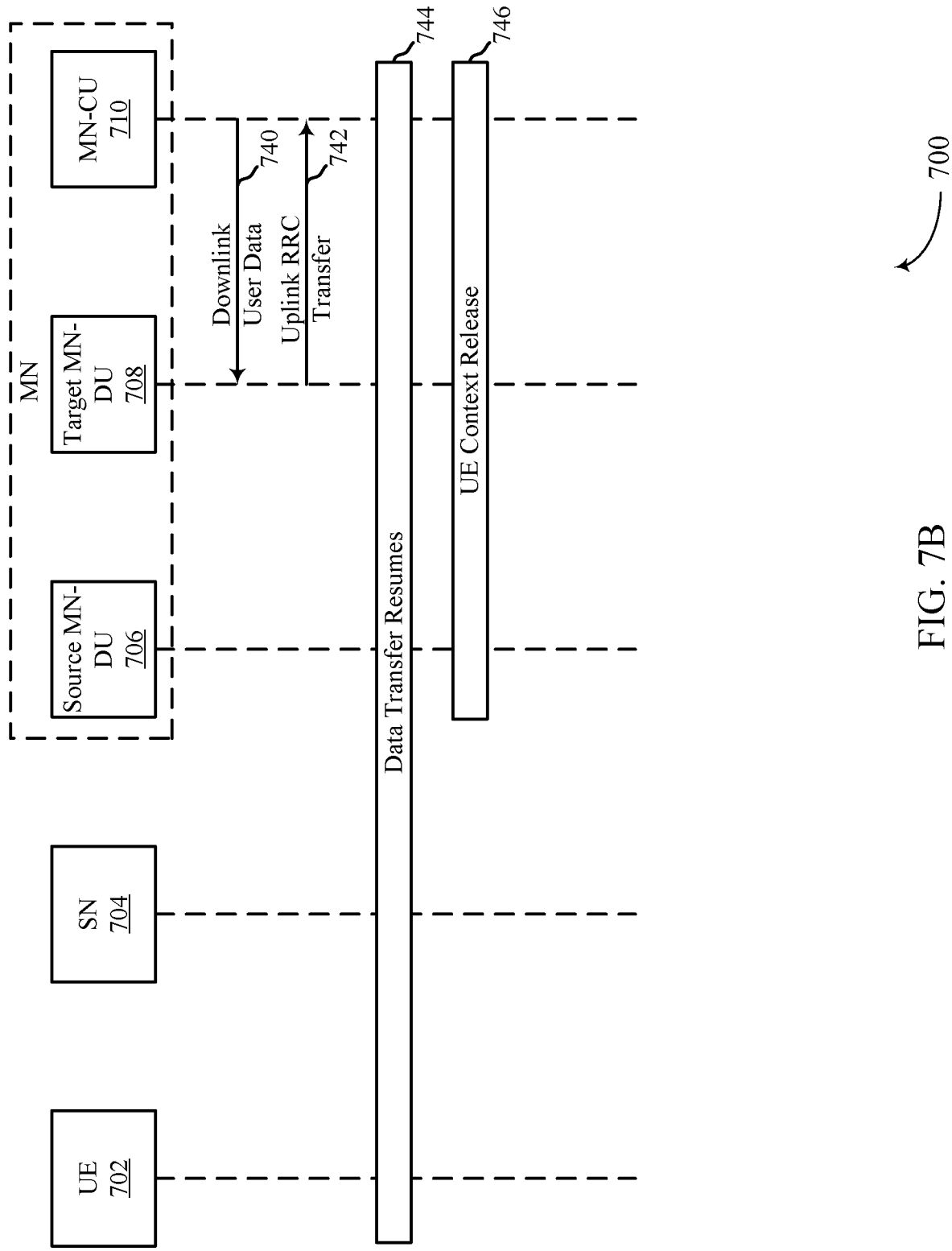

FIGS. 7A and 7B illustrate an example of a process flow 700 that supports fast recovery from link failure in dual-connectivity systems in accordance with aspects of the present disclosure. FIG. 7B is generally a continuation of FIG. 7A. In some examples, process flow 700 may implement aspects of wireless communication systems 100 and/or 200. Aspects of process 700 may be implement by UE 702, an SN 704, a source MN-DU 706, a target MN-DU 708, and/or an MN-CU 710, which may be examples of the corresponding devices described herein. Generally, the source MN-DU 706, target MN-DU 708 and/or the MN-CU 710 may be associated with a base station, such as a gNB or MN. Aspects of process 700 may be implemented or otherwise triggered when UE 702 detects failure of the MCG link. In some aspects, process 700 illustrates an example case for a RAN architecture involving a split gNB, e.g., the source MN-DU 706, target MN-DU 708, and MN-CU 710.

Broadly, process 700 illustrates an example where UE 702 experiences an RLF on the link to a serving gNB-DU (e.g., source MN-DU 706). Based on the measure report received in the MCG failure information message, MN-CU 710 may determine that UE 702 should be handed over to another GNB-DU (e.g., to target MN-DU 708). Process 700 illustrates an example call flow for a NR-DC case, with other cases having similar call flows.

At 712, UE 702 may detect an RLF. In some aspects, the RLF may refer to an MCG failure or an MCG RLF for a radio link between UE 702 and source MN-DU 706. In some aspects, the RLF may be detected based on one or more channel measurements performed by UE 702.

At 714, UE 702 may transmit or otherwise provide an indication of the RLF to SN 704. In some aspects, the indication of the RLF may be carried or conveyed in an MCG failure information or notification message. In some aspects, UE 702 may carry or convey an indication of a measurement report and/or an MCG link failure cause to MN-CU 710.

In some aspects, UE 702 may transmit or otherwise provide the indication of the RLF using a bearer carrying or conveying an RRC MCG failure information or notification message. This may include the message being transmitted over a split SRB1 and/or an SRB3.

At 716, SN 704 may transmit or otherwise provide an indication of the RLF to source MN-CU 710. At 718, MN-CU 710 may make a handover decision based on the indication of the RLF, e.g., based on the measurement report, RLF cause, and the like.

At 720, MN-CU 710 may transmit or otherwise provide a UE context setup request message to target MN-DU 708. At 722, target MN-DU 708 may transmit or otherwise provide an indication of the UE context setup response message to MN-CU 710. At 724, MN-CU 710 may transmit or otherwise provide an indication of a UE context modification request message to source MN-DU 706. At 726, MN-CU 710 may transmit or otherwise provide an indication of an SN addition request message to SN 704. The 728, MN-CU 710 may transmit or otherwise provide an indication of a handover command message to SN 704. Again, the handover command message may be a container, or may include a container, including an indication of an RRC message for UE 702. The 730, SN 704 may transmit or otherwise provides an indication of an RRCConnectionReconfiguration message to UE 702.

At 732, source MN-DU 706 may transmit or otherwise provide an indication of the downlink data delivery status message to MN-CU 710. At 734, source MN-DU 706 may transmit or otherwise provide an indication of a UE context modification response message to MN-CU 710.

At 736, UE 702 may perform a RACH procedure with target MN-DU 708. In some aspects, this may include UE 702 obtaining synchronization and/or other configuration information for performing wireless communications with target MN-DU 708 after the handover procedure.

At 738, UE 702 may transmit or otherwise provide an indication of a RRCConnectionReconfiguration complete message to target MN-DU 708. At 740, MN-CU 710 may transmit or otherwise provide an indication of downlink user data to target MN-DU 708. At 742, target MN-DU 708 may transmit or otherwise provide an uplink RRC transfer message to MN-CU 710. At 744, a data transfer may resume for wireless communications between UE 702 and target MN-DU 708 and/or between UE 702 and SN 704. At 746, UE context release may be performed between source MN-DU 706, target MN-DU 708, and/or MN-CU 710.

Figure 8A:
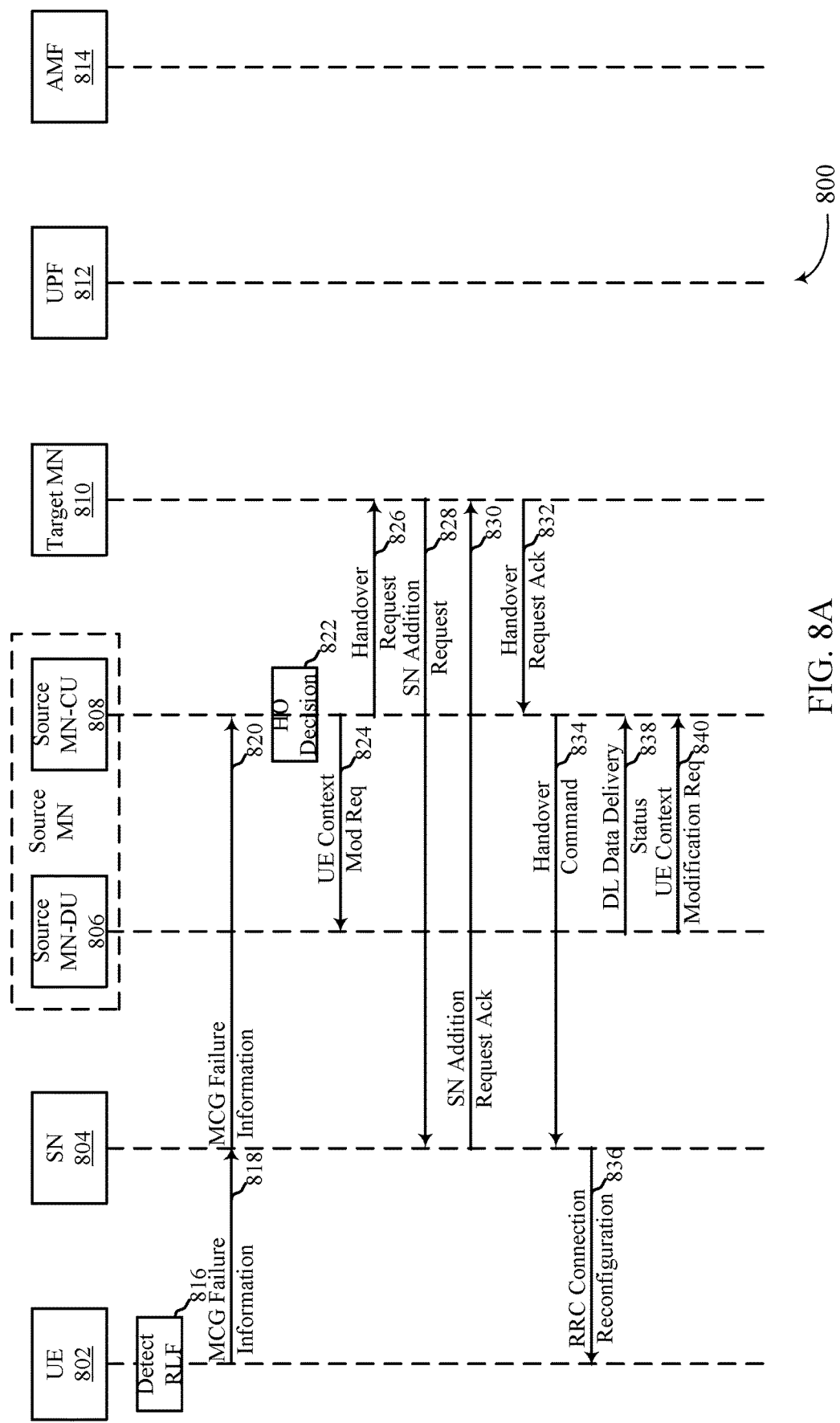
FIGS. 8A and 8B illustrate an example of a process flow that supports fast recovery from link failure in dual-connectivity systems in accordance with aspects of the present disclosure.
Figure 8B:
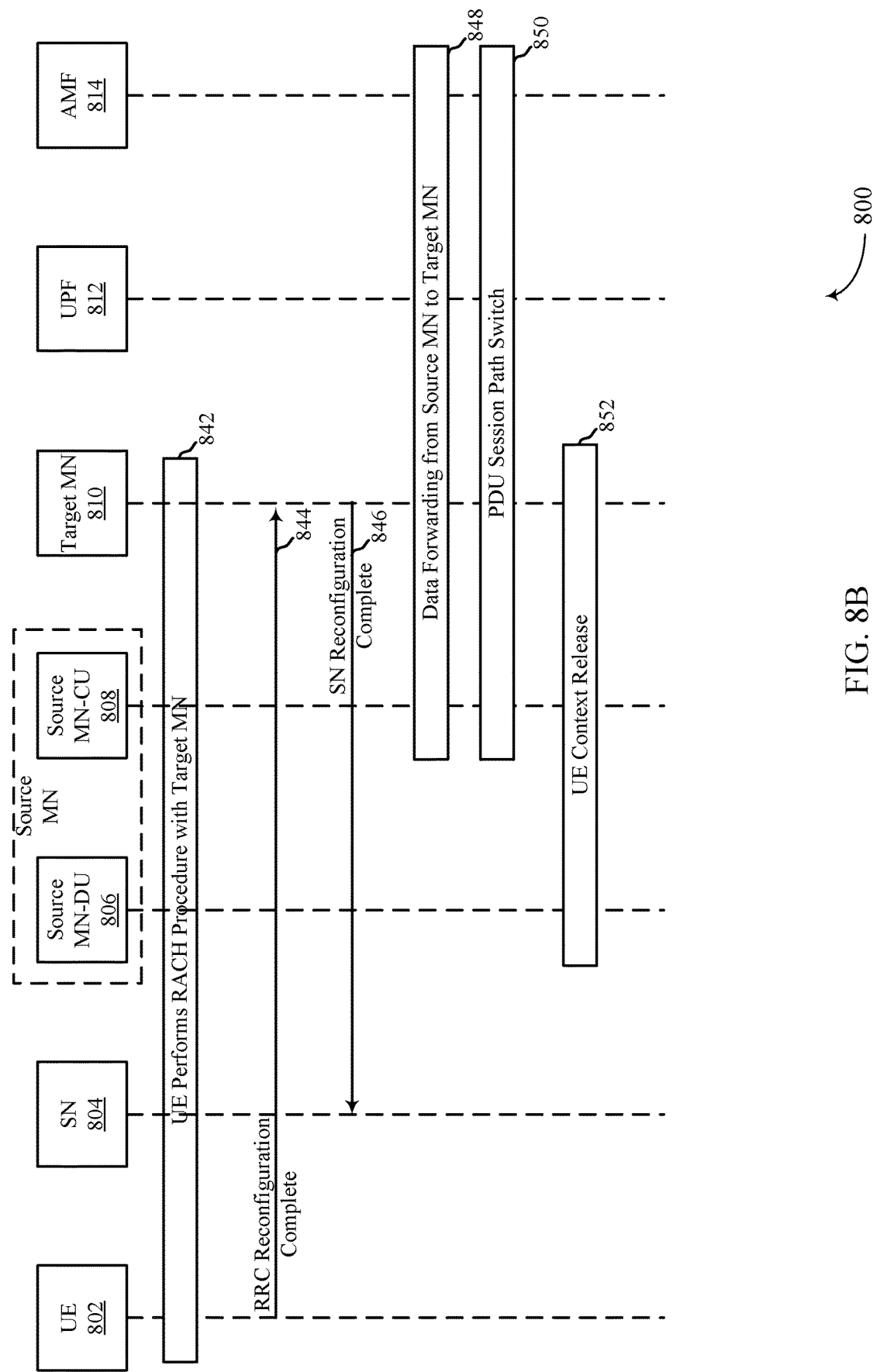

FIGS. 8A and 8B illustrate an example of a process flow 800 that supports fast recovery from link failure in dual-connectivity systems in accordance with aspects of the present disclosure. In some examples, process flow 800 may implement aspects of wireless communication systems 100 and/or 200. Aspects of process 800 may be implemented by a UE 802, an SN 804, a source MN-DU 806, a source MN-CU 808, a target MN 810, a UPF 812, and/or an AMF 814, which may be examples of the corresponding devices described herein. Generally, the source MN-DU 806 and/or the source MN-CU 808 may be associated with a base station, such as a gNB or source MN. Aspects of process 800 may be implemented or otherwise triggered when UE 802 detects failure of the MCG link. In some aspects, process 800 illustrates an example case where for a RAN architecture involves a split gNB.

Broadly, process 800 illustrates an example where UE 802 experiences an RLF on the link to a serving gNB-DU (e.g., source MN-DU 806). Based on the measurement report received in the MCG failure information message, source MN-CU 808 may determine that UE 802 should be handed over to a target node (e.g., to target MN 810).

At 816, UE 802 may detect an RLF. In some aspects, the RLF may refer to an MCG failure or an MCG RLF for a radio link between UE 802 and source MN-DU 806. In some aspects, the RLF may be detected based on one or more channel measurements performed by UE 802.

At 818, UE 802 may transmit or otherwise provide an indication of the RLF to SN 804. In some aspects, the indication of the RLF may be carried or conveyed in an MCG failure information or notification message. In some aspects, UE 802 may carry or convey an indication of a measurement report and/or an MCG link failure cause to source MN-CU 808.

In some aspects, UE 802 may transmit or otherwise provide the indication of the RLF using a bearer carrying or conveying an RRC MCG failure information or notification message. This may include the message being transmitted over a split SRB1 and/or an SRB3.

At 820, SN 804 may transmit or otherwise provide an indication of the RLF to source MN-CU 808. At 822, source MN-CU 808 may make a handover decision based on the indication of the RLF, e.g., based at least in part on the measurement report and/or RLF cause.

At 824, source MN-CU 808 may transmit or otherwise provide a UE context modification request message to source MN-DU 806. At 826, source MN-CU 808 may transmit or otherwise provide an indication of a handover request message to target MN 810.

At 828, target MN 810 may transmit or otherwise provide an indication of an SN addition request message to SN 804. At 830, SN 804 may respond by transmitting or otherwise providing an indication of an SN addition request acknowledgment message to target MN 804. At 832, target MN 810 may transmit or otherwise provide an indication of a handover request message to source MN-CU 808. At 832, source MN-CU 808 may transmit or otherwise provide an indication of a handover command message to SN 804. Again, the handover command message may be a container, or carry a container, conveying an indication of an RRC message for UE 802. At 834, source MN-CU 808 may transmit or otherwise provide an indication of a handover command message to SN 804. Again, the handover command message may be a container, or carry a container, including an indication of an RRC message for UE 802. At 836, SN 804 may transmit or otherwise provides an indication of an RRCConnectionReconfiguration message to UE 802.

At 838, source MN-DU 806 may transmit or otherwise provide an indication of the downlink data delivery status message to source MN-CU 808. At 840, source MN-DU 806 may transmit or otherwise provide an indication of a UE context modification request message to source MN-CU 808.

At 842, UE 802 may perform a RACH procedure with target MN 810. In some aspects, this may include UE 802 obtaining synchronization and/or other configuration information for performing wireless communications with target MN 810 after the handover procedure.

At 844, UE 802 may transmit or otherwise provide an indication of a RRCConnectionReconfiguration complete message to target MN 810. At 846, target MN 810 may transmit or otherwise provide an indication of SN reconfiguration complete message to SN 804. At 848, data forwarding may be performed from source MN-CU 808 to target MN 810. In some aspects, data forwarding may be accomplished by source MN-CU 808, target MN 810, UPF 812, and/or the AMF 814. At 850, the PDU path session switch may be performed by source MN-CU 808, target MN 810, UPF 812, and/or AMF 814. At 852, UE context release may be performed between source MN-DU 806, source MN-CU 808, and/or target MN 810.

Figure 9:
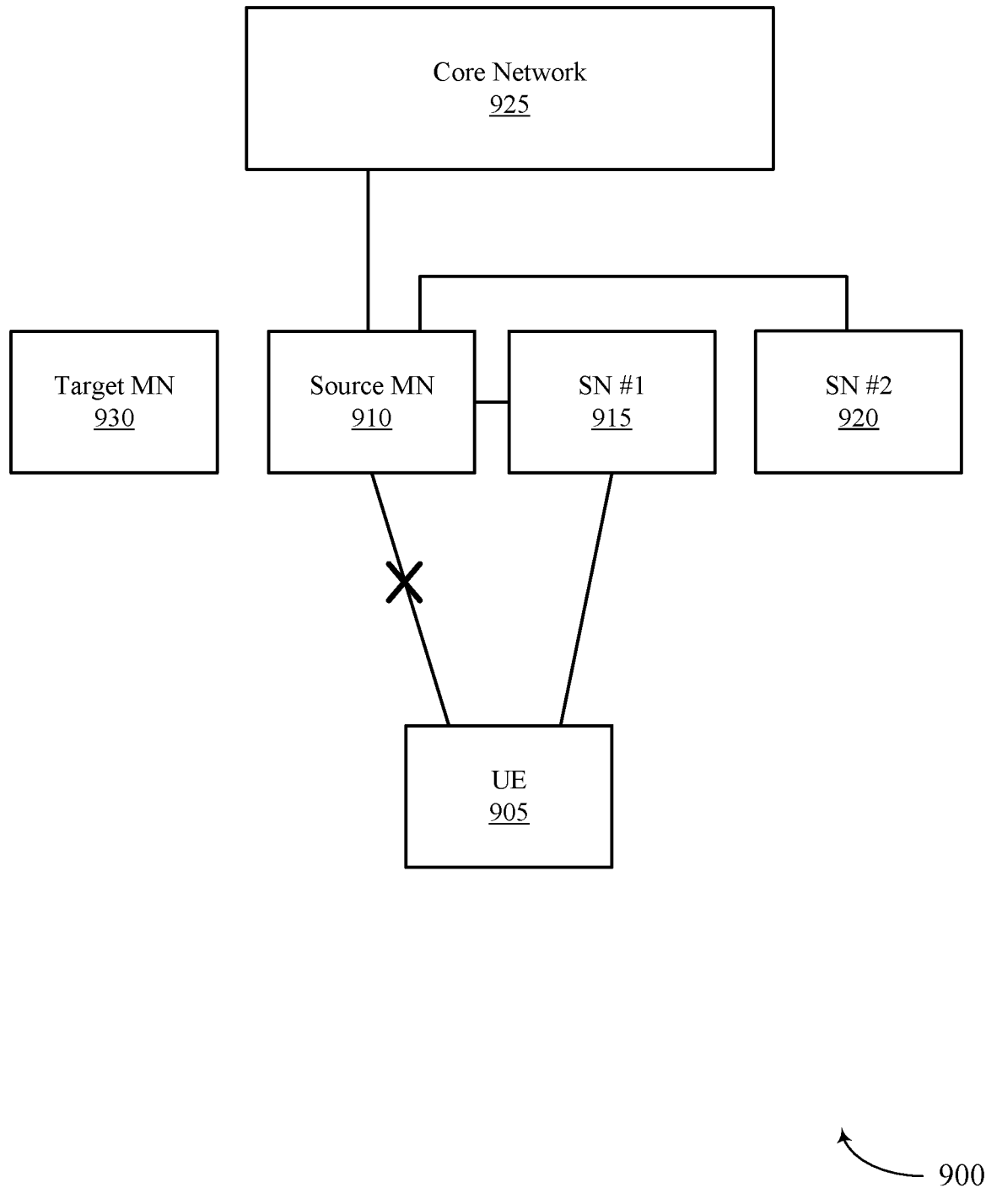
FIG. 9 illustrates an example of a wireless communications system that supports fast recovery from link failure in dual-connectivity systems in accordance with aspects of the present disclosure.

FIG. 9 illustrates an example of a wireless communications system 900 that supports fast recovery from link failure in dual-connectivity systems in accordance with aspects of the present disclosure. In some examples, wireless communications system 900 may implement aspects of wireless communication systems 100 and/or 200 and/or processes 300, 400, 500, 600, 700, and/or 800. Aspects of wireless communication system 900 may be performed by a UE 905, a source MN 910, a first SN 915, a second SN 920, a core network 925, and/or a target MN 930, which may be examples of corresponding devices described herein. Generally, wireless communication 900 illustrates an example DC with one MN and two or more SNs. In some aspects, the first SN 915 and/or the second SN 920 may be configured for communications with source MN 910 via one or more backhaul links, such as an X2/Xn protocol link.

As discussed, UE 905 may detect or otherwise determine that an RLF (e.g., an MCG RLF) has occurred for a radio link between UE 905 and source MN 910. In some aspects, UE 905 may perform one or more channel measurements to detect or otherwise determine that the RLF has occurred. In some aspects, UE 905 may identify target MN 930 during one or more of the channel measurements and determine that target MN 930 would be a suitable candidate for establishing a radio link with.

Upon detecting the RLF, UE 905 may generally transmit or otherwise provide an indication of the RLF to an SN (e.g., the first SN 915), for forwarding to the source MN 910. As discussed, the SN may generally transmit the indication by encapsulating it according to an X2/Xn protocol and/or by generating its own message for transmission of the RLF indication to source MN 910. Upon receiving the indication of the RLF, source MN 910 would make a handover decision to perform a handover procedure of UE 905 to target MN 930.

Broadly, wireless communication system 900 illustrates multiple options for UE 905 to transmit the indication of the RLF (e.g., the failure report message) to source MN 910.

In the situation where there is at least one SN through which a split SRB1 is configured, UE 905 may transmit the indication of the RLF to each of the SNs with the configured SIB1 (e.g., to both the first SN 915 and the second SN 920). In some aspects, this may improve reliability, but at the cost of increased signaling. In another example, UE 905 may transmit the indication of the RLF to the strongest SN (e.g., the SN having the most reliable and/or capable radio link). In some aspects, this may improve signaling efficiency, but at the cost of reliability.

In the situation where there is no split SRB1 configured, but there is at least one SN with SRB3 configured, the UE 905 may transmit the indication of the RLF to each of the SNs with the configured SRB3 (e.g., to both of the first SN 915 and the second SN 920). Again, this may improve reliability, but at the cost of increased signaling. In another example, UE 905 may transmit the indication of the RLF to the strongest SN. Also, this may improve signaling efficiency, but at the cost of reliability.

Using aspects of the techniques described herein, a UE may be able to recover a connection for a dual-connectivity configuration with a master node or a target node. In some cases, however, the UE may have to wait a long period of time before receiving an RRC message from a master node to recover the connection for the dual-connectivity configuration. Further, in some instances, the UE may even fail to receive the RRC message after waiting for a long time. As described herein, a UE may support efficient techniques for limiting the amount of time a UE may wait for an RRC message from a base station. In particular, the UE may use a recovery timer to limit the amount of time the UE may wait for an RRC message from a base station in a recovery procedure. In some aspects, once the UE detects an RLF with a master node and transmits an indication of the RLF to a secondary node (e.g., to be forwarded to the master node), the UE may start the recovery timer to track the network response to the RLF indication.

If the UE receives a response from the network before the timer expires, the UE may stop the timer and proceed with operations based on the response from the network. For example, if the UE receives an RRC reconfiguration message indicating that the UE is to perform a handover to a suitable target master node (e.g., the network directs the UE to perform a handover to a suitable target master node), the UE may stop the recovery timer and perform a handover procedure to the target master node (e.g., as described with reference to FIG. 10). Alternatively, if the UE receives an RRC release message indicating that the UE is to release an RRC connection with the master node (e.g., the network directs the UE to release the RRC connection), the UE may stop the recovery timer, release the RRC connection with the master node, and perform an RRC reestablishment procedure to reestablish a dual-connectivity configuration. If, however, the UE fails to receive a response from the network before the timer expires (e.g., if the timer expires before the UE receives a response from the network), the UE may release a connection with the MCG and SCG and perform an RRC reestablishment procedure to reestablish a dual-connectivity configuration.

Figure 10:
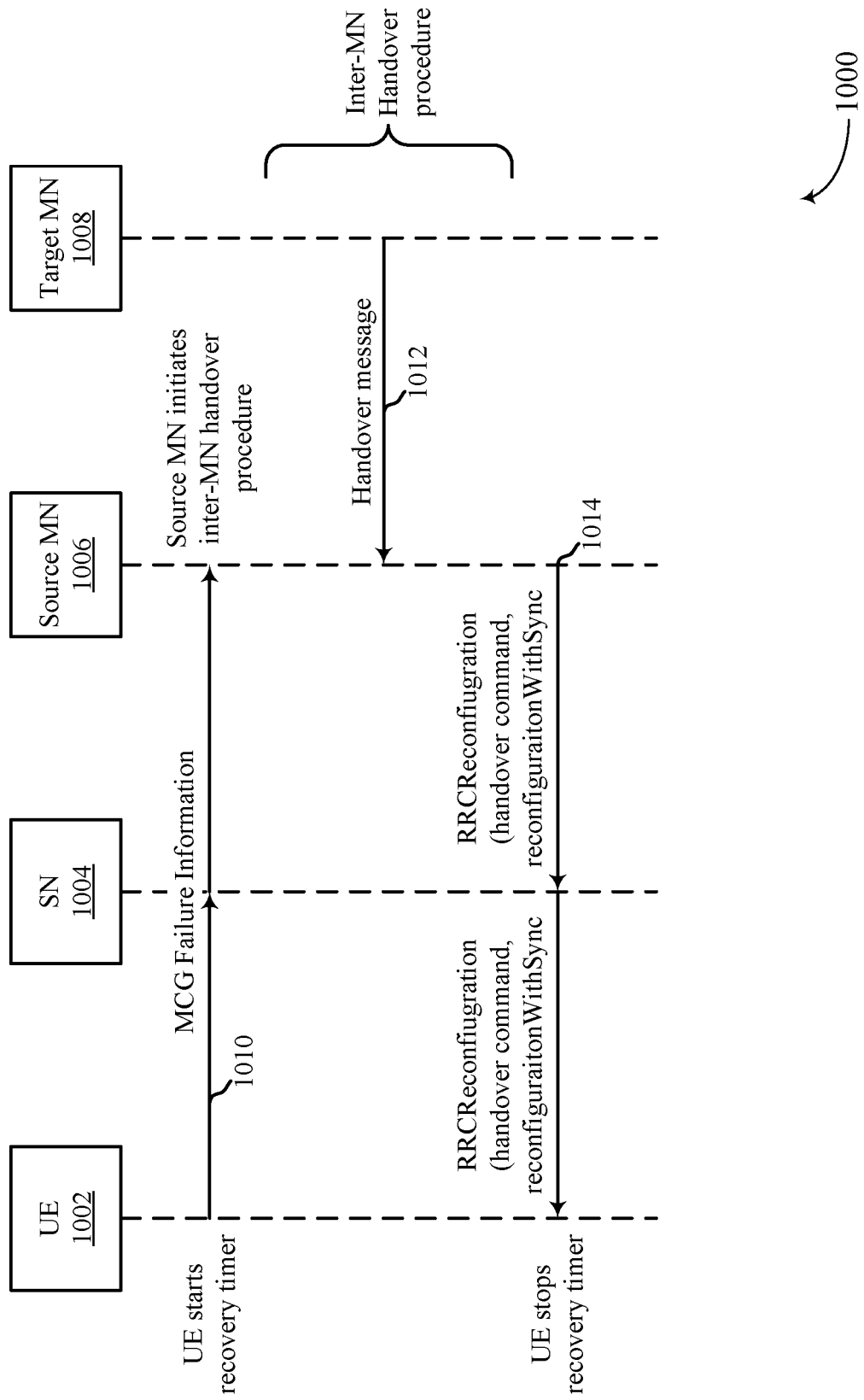
FIG. 10 illustrates an example of a process flow that supports fast recovery from link failure in dual-connectivity systems in accordance with aspects of the present disclosure.

FIG. 10 illustrates an example of a process flow 1000 that supports fast recovery from link failure in dual-connectivity systems in accordance with aspects of the present disclosure. In some examples, process flow 1000 may implement aspects of wireless communication systems 100 and/or 200. Aspects of process flow 1000 may be implemented by a UE 1002, an SN 1004, a source MN 1006, and a target MN 1008, which may be examples of the corresponding devices described herein. Generally, the SN, the source MN and the target MN may each be associated with a base station, such as a gNB (e.g., an SgNB or MgNB). Aspects of process flow 1000 may be implemented or otherwise triggered when UE 1002 detects failure of the MCG link.

At 1010, after detecting an RLF with source MN 1006, UE 1002 may transmit MCG failure information to SN 1004, and SN 1004 may forward the MCG failure information to source MN 1006. Source MN 1006 may then initiate an inter-MN handover procedure to a target-MN 1008. As part of the inter-MN handover procedure, at 1012, target SN 1008 may transmit a handover message to source MN 1006. At 1014, source MN 1006 may then transmit an RRC reconfiguration message (e.g., including a handover command, a reconfigureWithSync indication, etc.) to SN 1004, and SN 1004 may forward the RRC reconfiguration message to UE 1002. Since, in the example of FIG. 10, UE 1002 may receive the RRC reconfiguration message before the recovery timer expires, UE 1002 may stop the recovery timer. UE 1002 may then start a handover timer (e.g., a T304 timer) and initiate a handover to target MN 1008. In some cases, if the handover procedure fails (e.g., if the handover timer expires), UE 1002 may initiate an RRC reestablishment procedure to reestablish a dual-connectivity configuration.

In some cases, a UE may use the techniques described with reference to FIG. 10 to establish a connection with a target master node (e.g., switch to the target master node). In other cases, however, a UE may experience RLF even though the quality of a link with a master node may be above a threshold (e.g., the link quality may be sufficiently high to support communications between the UE and the master node). In such cases, it may be appropriate for the UE to reestablish a connection with the master node rather than handover to a target master node (e.g., as described with reference to FIG. 10) or rather than select and reconfigure for an updated MCG and SCG for a dual-connectivity configuration (e.g., perform conventional RRC reestablishment procedure). For instance, it may be appropriate for the UE to perform an RRC reestablishment procedure without performing cell selection and, in some cases, without performing random-access channel (RACH) procedures (e.g., without transmitting a first RACH message and receiving a second RACH message). As described herein, a UE may support efficient techniques for selecting an appropriate recovery procedure or reestablishment procedure after detecting RLF with a master node.

Figure 11:
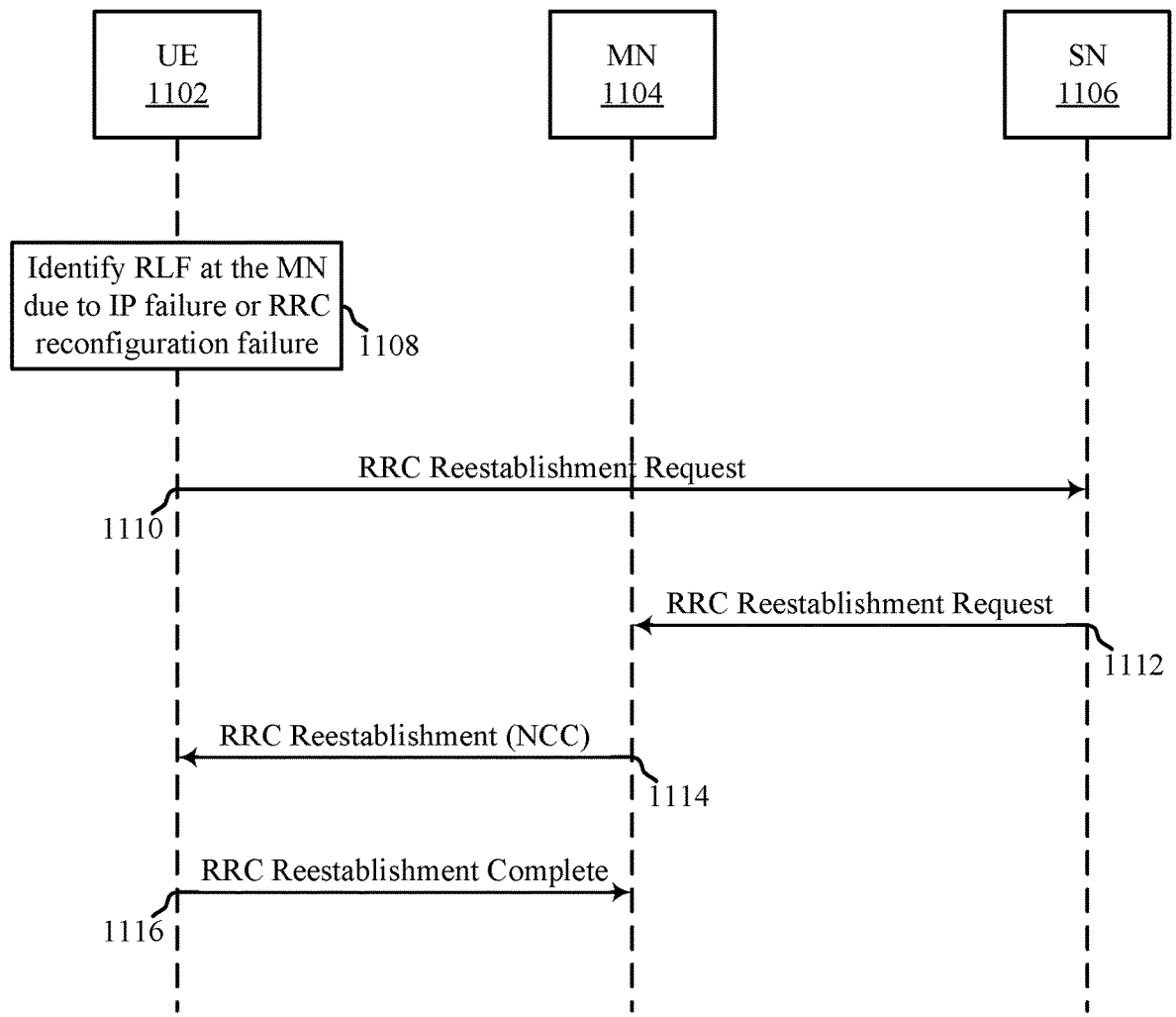
FIG. 11 illustrates an example of a process flow that supports fast recovery from link failure in dual-connectivity systems in accordance with aspects of the present disclosure.

In particular, once a UE detects RLF with a master node, the UE may identify a recovery procedure or reestablishment procedure based on a type of RLF or based on a layer at which the RLF is detected. For instance, if the UE determines that the RLF has occurred at a PHY layer, MAC layer, or RLC layer, or the UE determines that the RLF is a handover failure for a handover from a master node to a target master node, the UE may perform a fast recovery procedure (e.g., as described with reference to FIG. 10). Alternatively, if the UE determines that the RLF has occurred at an RRC layer (e.g., based on failing to comply with a provided RRC configuration in an RRC message), or the UE determines that the RLF is an integrity check failure (e.g., based on receiving an integrity check failure indication from a packet data convergence protocol (PDCP) layer), the UE may perform an RRC reestablishment procedure without performing cell selection and, in some cases, without performing RACH (e.g., as described with reference to FIGS. 11-13). Table 1 provides additional details on suitable recovery procedures for different causes of RLF (e.g., MCG failure).

mented or otherwise triggered when UE 1102 detects failure of the MCG link. In the example of FIG. 11, though UE 1102 may detect an RLF with an MN 1104, UE 1102 may still be connected to SN 1106 (e.g., the configuration and resources used for communicating with SN 1106 may be maintained), and an RRC reconfiguration received by the UE 1102 may include only an MCG configuration or both an MCG configuration and an SCG configuration.

At 1108, UE 1102 may identify RLF (e.g., MCG link failure) at the MN 1104 due to IP failure or RRC reconfiguration failure. At 1110, UE 1102 may transmit an RRC reestablishment request to SN 1106, and, at 1112, SN 1106 may forward the RRC reestablishment request to MN 1104. Once MN 1104 receives the RRC reestablishment request, MN 1104 may transmit an RRC reestablishment message to UE 1102, including a next hop chaining counter (NCC) parameter (e.g., the MN 1104 may reestablish the link by sending an RRC reestablishment message with an updated NCC via SRB1). UE 1102 may then perform an RRC reestablishment procedure, and, at 1116, UE 1102 may transmit an RRC reestablishment complete message to MN 1104 upon successful completion of the connection reestablishment.

TABLE 1

Additional details on suitable recovery procedures for different causes of RLF

| MCG link failure cause | Recovery procedure |
| --- | --- |
| MCG RLF detection<br>PHY layer: Expiry of timer associated with in-sync indications on PCell<br>MAC layer: Indication from MCG MAC that maximum number of RACH preamble retransmissions has been reached<br>RLC layer: Indication from MCG RLC, which is allowed to send on PCell, that the maximum number of retransmissions has been reached for an SRB or DRB | Fast recovery |
| Handover failure with kept SN<br>The following causes apply when MN is NR (NE-DC, NR-NR DC configurations):<br>MCG reconfiguration with sync failure<br>Mobility with NR failure<br>The following causes apply when MN is E-UTRA (EN-DC, NGEN-DC configurations):<br>MN (Intra-EUTRA) handover failure<br>Mobility from E-UTRA failure (covers handover failure in case of liandover from E-UTRA to E-UTRA connected to 5G core, or from E-UTRA connected to 5G core to E-UTRA) | Fast recovery |
| RRC reconfiguration failure for the case when both MCG and SCG configurations are provided in reconfiguration message sent over SRB1 and UE is unable to comply | RRC reestablishment procedure |
| Integrity check failure indication from PDCP concerning SRB1 and SRB2 | RRC reestablishment procedure where cell selection and RACH procedures may not be performed |
| RRC reconfiguration failure for the case when only MCG configuration is provided in reconfiguration message sent over SRB1 and UE is unable to comply | RRC reestablishment procedure where cell selection and RACH procedures may not be performed |

Figure 12:
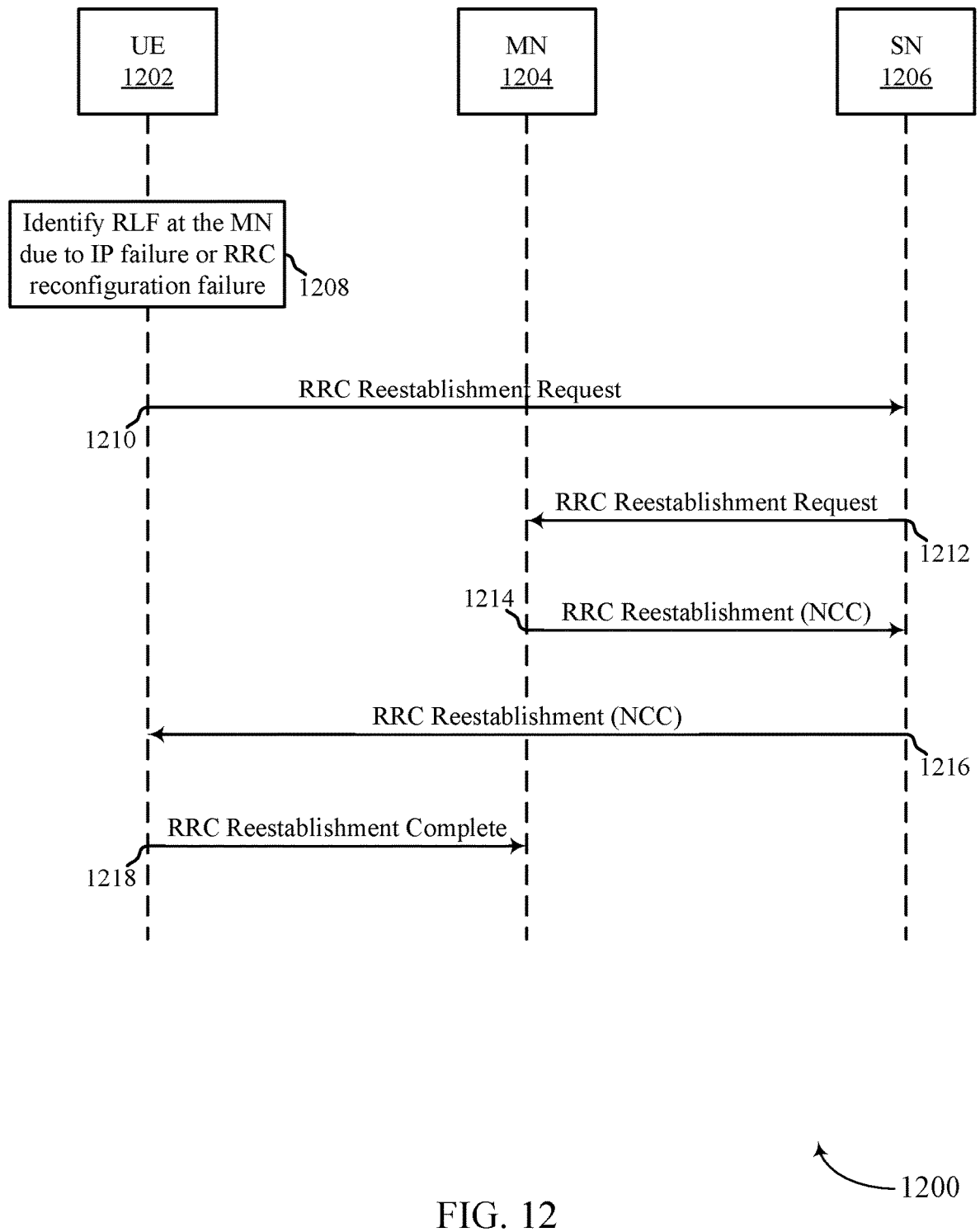
FIG. 12 illustrates an example of a process flow that supports fast recovery from link failure in dual-connectivity systems in accordance with aspects of the present disclosure.

FIG. 11 illustrates an example of a process flow 1100 that supports fast recovery from link failure in dual-connectivity systems in accordance with aspects of the present disclosure. In some examples, process flow 1100 may implement aspects of wireless communication systems 100 and/or 200. Aspects of process flow 1100 may be implemented by a UE 1102, an MN 1104, and an SN 1106, which may be examples of the corresponding devices described herein. Generally, the MN (e.g., source MN) and the SN may each be associated with a base station, such as a gNB (e.g., an MgNB or an SgNB). Aspects of process flow 1100 may be imple- FIG. 12 illustrates an example of a process flow 1200 that supports fast recovery from link failure in dual-connectivity systems in accordance with aspects of the present disclosure. In some examples, process flow 1200 may implement aspects of wireless communication systems 100 and/or 200. Aspects of process flow 1200 may be implemented by a UE 1202, an MN 1204, and an SN 1206, which may be examples of the corresponding devices described herein. Generally, the MN (e.g., source MN) and the SN may each be associated with a base station, such as a gNB (e.g., an MgNB or an SgNB). Aspects of process flow 1200 may be implemented or otherwise triggered when UE 1202 detects failure of the MCG link. In the example of FIG. 12, though UE 1202 may detect an RLF with an MN 1204, UE 1202 may still be connected to SN 1206 (e.g., the configuration and resources used for communicating with SN 1206 may be maintained), and an RRC reconfiguration received by the UE 1202 may include only an MCG configuration or both an MCG configuration and an SCG configuration.

At 1208, UE 1202 may identify RLF (e.g., MCG link failure) at the MN 1204 due to IP failure or RRC reconfiguration failure. At 1210, UE 1202 may then transmit an RRC reestablishment request to SN 1206, and, at 1212, SN 1206 may forward the RRC reestablishment request to MN 1204. Once MN 1204 receives the RRC reestablishment request, MN 1204 may transmit an RRC reestablishment message to SN 1206, including an NCC parameter, and, at 1216, SN 1206 may forward the RRC reestablishment message to UE 1202 (e.g., the MN 1204 may reestablish the link by sending an RRC reestablishment message with an updated NCC via SRB1). That is, the RRC reestablishment message may be tunneled to UE 1202 via the SN 1206. UE 1202 may then perform an RRC reestablishment procedure, and, at 1218, UE 1202 may transmit an RRC reestablishment complete message to MN 1204 upon successful completion of the connection reestablishment.

In the examples described above with reference to FIGS. 11 and 12, a UE may use a split SRB1 or an SRB established between the UE and the SN only (e.g., SRB3) to transmit the RRC reestablishment request. If the SRB3 is used to transmit the RRC reestablishment request, the SN may encapsulate the message (e.g., container) in an Xn/X2 message and transmit the Xn/X2 message to the MN (e.g., to avoid a radio issue in the MN). The RRC reestablishment request may include a physical cell identifier (PCI) of the MN, a cell radio network temporary identifier (C-RNTI) assigned by the MN, and an indication of a cause of the reestablishment procedure (e.g., IPFailureMCG, ReconfigWithMCGFailureInMCG, or ReconfigWithDCFailureInMCG). Further, the UE may not have to start a cell selection timer (e.g., T311) since cell selection may not be used to reestablish the connection with the MN.

Figure 13:
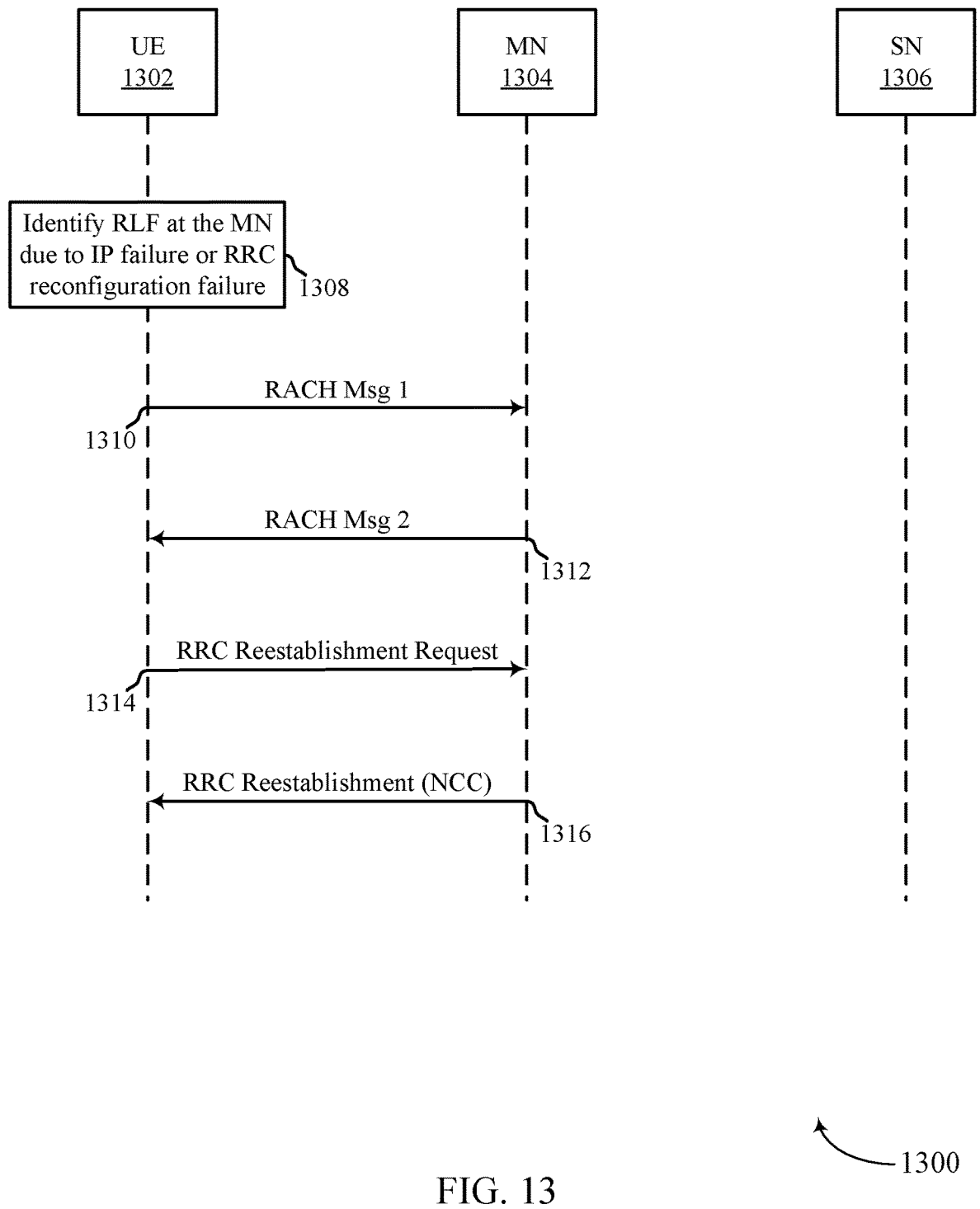
FIG. 13 illustrates an example of a process flow that supports fast recovery from link failure in dual-connectivity systems in accordance with aspects of the present disclosure.

FIG. 13 illustrates an example of a process flow 1300 that supports fast recovery from link failure in dual-connectivity systems in accordance with aspects of the present disclosure. In some examples, process flow 1300 may implement aspects of wireless communication systems 100 and/or 200. Aspects of process flow 1300 may be implemented by a UE 1302, an MN 1304, and an SN 1306, which may be examples of the corresponding devices described herein. Generally, the MN (e.g., source MN) and the SN may each be associated with a base station, such as a gNB (e.g., an MgNB or an SgNB). Aspects of process flow 1300 may be implemented or otherwise triggered when UE 1302 detects failure of the MCG link.

At 1308, UE 1302 may identify RLF (e.g., MCG link failure) at the MN 1304 due to IP failure or RRC reconfiguration failure. UE 1302 may then perform a RACH procedure to gain access to MN 1304 (e.g., since UE 1302 may not have access to uplink resources to transmit an RRC reestablishment request to the MN 1304). As part of the RACH procedure, at 1310, UE 1302 may transmit a first RACH message to MN 1304, and, at 1312, UE 1302 may receive a second RACH message from MN 1304. MN 1304 may provide a grant for uplink resources to UE 1302 in the second RACH message for the UE 1302 to use to transmit an RRC reestablishment request. Thus, at 1314, UE 1302 may transmit the RRC reestablishment request to MN 1304 on the uplink resources. For instance, UE 1302 may transmit the RRC reestablishment request directly to MN 1304 over an SRB (e.g., SRB1).

The RRC reestablishment request may include a PCI of the MN, a C-RNTI assigned by the MN, and an indication of a cause of the reestablishment procedure (e.g., IPFailureMCG, ReconfigWithMCGFailureInMCG, or ReconfigWithDCFailureInMCG). Further, the UE may not have to start a cell selection timer (e.g., T311) since cell selection may not be used to reestablish the connection with the MN. Once MN 1304 receives the RRC reestablishment request, at 1316, MN 1304 may transmit an RRC reestablishment message to UE 1302, including an NCC parameter (e.g., the MN 1304 may reestablish the link by sending an RRC reestablishment message with an updated NCC via SRB1). UE 1302 may then perform an RRC reestablishment procedure and may transmit an RRC reestablishment complete message to MN 1304 upon successful completion of the connection reestablishment.

In some aspects, if a UE detects an MCG RLF and an SCG RLF simultaneously, the UE may perform an RRC reestablishment procedure (e.g., a conventional RRC reestablishment procedure) by first releasing the MCG and SCG, performing cell selection, and transmitting an RRC reestablishment request to the selected cell in, for example, a message3 of a RACH procedure. Further, if a UE detects an SCG RLF after an MCG RLF and before receiving an RRC reestablishment message, the UE may also perform the conventional RRC reestablishment procedure. In addition to these error cases (e.g., where the UE may fall back to the conventional RRC reestablishment procedure), a UE may experience other error cases.

For instance, in some examples, a UE may detect an MCG RLF during a handover from one SN to another SN. Similarly, a UE may detect an MCG RLF during an addition procedure for adding an SN to a dual connectivity configuration. In such examples, it may be challenging for the UE to identify an SN to which the UE may transmit an indication of the MCG RLF. As described herein, a UE may support efficient techniques for identifying an SN to which the UE may transmit an indication of an MCG RLF when an SN change procedure or SN addition procedure is ongoing (e.g., as described with reference to FIGS. 14 and 15).

Figure 14:
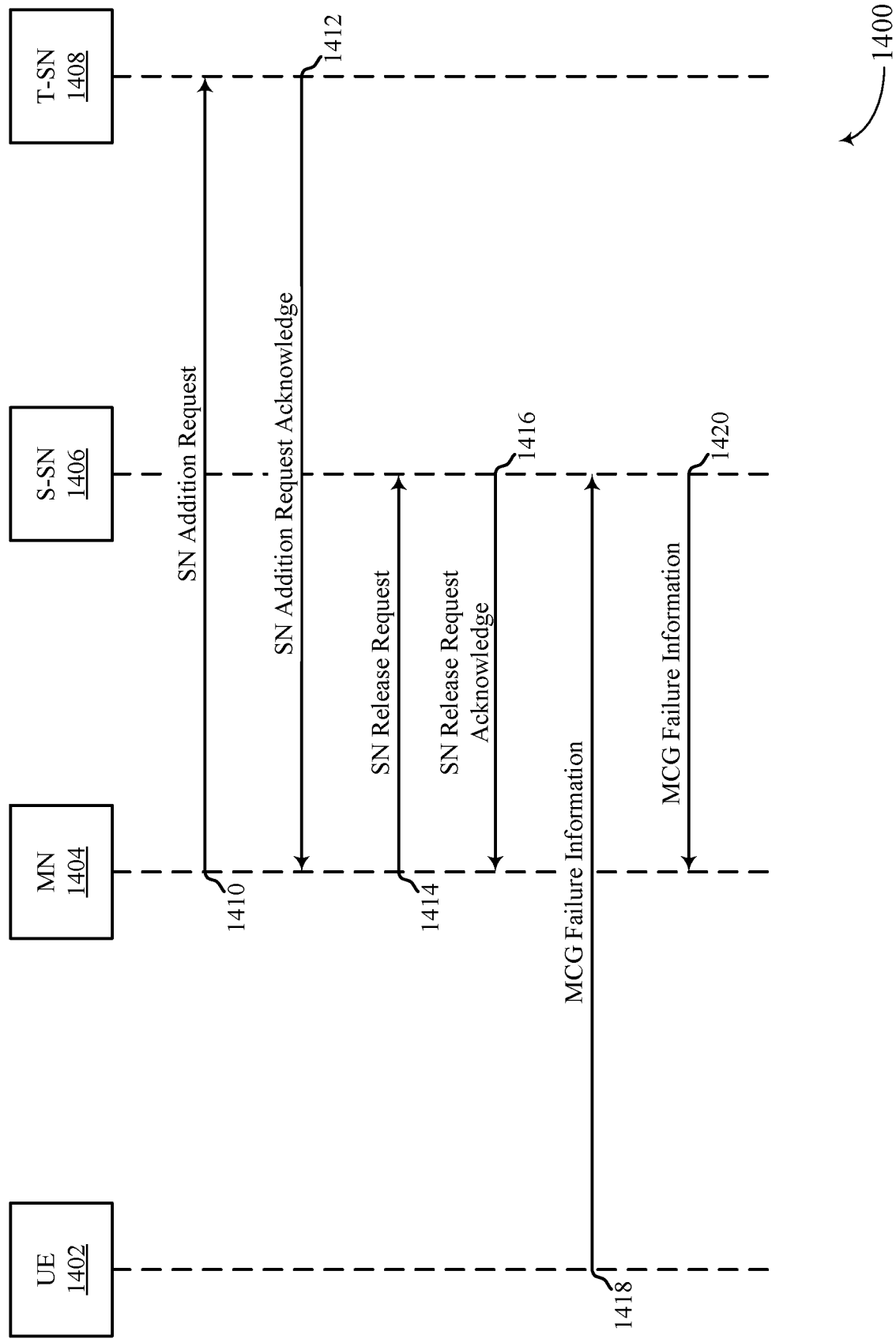
FIG. 14 illustrates an example of a process flow that supports fast recovery from link failure in dual-connectivity systems in accordance with aspects of the present disclosure.

FIG. 14 illustrates an example of a process flow 1400 that supports fast recovery from link failure in dual-connectivity systems in accordance with aspects of the present disclosure. In some examples, process flow 1400 may implement aspects of wireless communication systems 100 and/or 200. Aspects of process flow 1400 may be implemented by a UE 1402, an MN 1404, an SN 1406, and a target SN 1408, which may be examples of the corresponding devices described herein. Generally, the MN (e.g., source MN) and the SNs may each be associated with a base station, such as a gNB (e.g., an MgNB or an SgNB). Aspects of process flow 1400 may be implemented or otherwise triggered when UE 1402 detects failure of the MCG link.

At 1410, MN 1404 may transmit an SN addition request to target SN 1408 to add the target SN 1408 to a dual-connectivity configuration for UE 1402, and, at 1412, MN 1404 may receive an SN addition request acknowledge message from target SN 1408. At 1414, MN 1404 may then transmit an SN release request to SN 1406 to release SN 1406 from the dual-connectivity configuration, and, at 1416, MN 1404 may receive an SN release request acknowledge message from SN 1406. In the example of FIG. 14, although MN 1404 may have initiated a handover procedure or SN change procedure from SN 1406 to target SN 1408 (e.g., E-UTRAN NR dual connectivity (EN-DC)), UE 1402 may be unaware of the handover or the SN change procedure (e.g., since UE 1402 may have not yet received an RRC reconfiguration message from MN 1404 to inform UE 1402 of the handover).

Thus, at 1418, UE 1402 may detect an MCG failure, and UE 1402 may transmit MCG failure information to SN 1406 based on detecting the MCG failure. At 1420, SN 1406 may then forward the MCG failure information to MN 1404, and MN 1404 may determine how to proceed with the SN change and MCG failure recovery. Similarly, in another example where UE 1402 detects MCG failure during an ongoing SN addition procedure, if UE 1402 is unaware of the SN addition procedure (e.g., if the UE detects the MCG failure before receiving an RRC reconfiguration from MN 1404 to inform UE 1402 of the SN addition procedure), UE 1402 may transmit the MCG failure information to SN 1406 (e.g., even though the quality of a link with the SN to be added may be better than the quality of the link with SN 1406).

Figure 15:
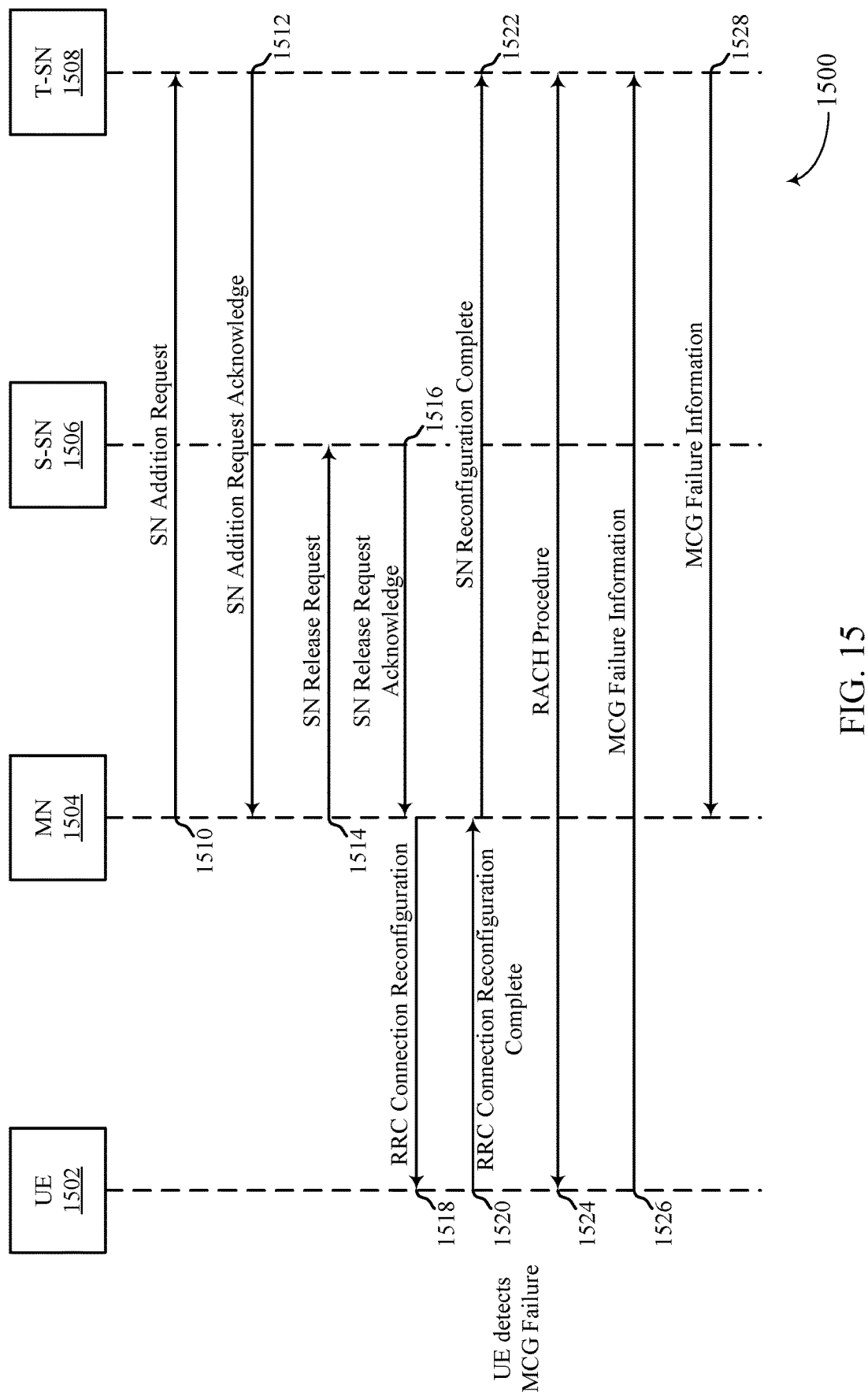
FIG. 15 illustrates an example of a process flow that supports fast recovery from link failure in dual-connectivity systems in accordance with aspects of the present disclosure.

FIG. 15 illustrates an example of a process flow 1500 that supports fast recovery from link failure in dual-connectivity systems in accordance with aspects of the present disclosure. In some examples, process flow 1500 may implement aspects of wireless communication systems 100 and/or 200. Aspects of process flow 1500 may be implemented by a UE 1502, an MN 1504, an SN 1506, and a target SN 1508, which may be examples of the corresponding devices described herein. Generally, the MN (e.g., source MN) and the SNs may each be associated with a base station, such as a gNB (e.g., an MgNB or an SgNB). Aspects of process flow 1500 may be implemented or otherwise triggered when UE 1502 detects failure of the MCG link.

At 1510, MN 1504 may transmit an SN addition request to target SN 1508 to add the target SN 1508 to a dual-connectivity configuration for UE 1502, and, at 1512, MN 1504 may receive an SN addition request acknowledge message from target SN 1508. At 1514, MN 1504 may then transmit an SN release request to SN 1506 to release SN 1506 from the dual-connectivity configuration, and, at 1516, MN 1504 may receive an SN release request acknowledge message from SN 1506. At 1518, UE 1502 may receive an RRC connection reconfiguration indicating that UE 1502 is to perform a handover from SN 1506 to target SN 1508, and, at 1520, UE 1502 may perform a handover procedure and transmit an RRC connection reconfiguration complete message to MN 1504. At 1522, MN 1504 may then transmit an SN reconfiguration complete message to target SN 1508. In the example of FIG. 15, UE 1502 may then detect an MCG failure. However, since UE 1502 detects the MCG failure after receiving the RRC connection reconfiguration message, UE 1502 may already be aware of the handover or the SN change procedure. Thus, at 1524, UE 1502 may perform a RACH procedure to gain access to target SN 1508, at 1526, UE 1502 may transmit MCG failure information to the target SN 1508, and, at 1528, target SN 1508 may forward the MCG failure information to MN 1504.

Accordingly, using these techniques, when UE 1502 identifies an MCG failure, and UE 1502 is aware of an ongoing handover or SN change procedure to a target SN 1508, UE 1502 may wait to transmit MCG failure information to the target SN 1508 until the handover or SN change procedure is successfully completed and the RACH procedure to gain access to the target SN 1508 is successfully completed. Similarly, when UE 1502 identifies an MCG failure, and UE 1502 is aware of an ongoing SN addition procedure (e.g., UE 1502 has already received an RRC connection reconfiguration indicating that an SN is being added to a dual-connectivity configuration), UE 1502 may wait to transmit MCG failure information to the newly added SN until the SN addition procedure is successfully completed and the RACH procedure to gain access to the newly added SN is successfully completed (e.g., if the quality of a link with the newly added SN is better than the quality of the link with SN 1506). In some aspects, if the RACH procedure fails (e.g., a RACH timer (T304) expires before completion of the RACH procedure), UE may perform a conventional RRC reestablishment procedure.

Figure 16:
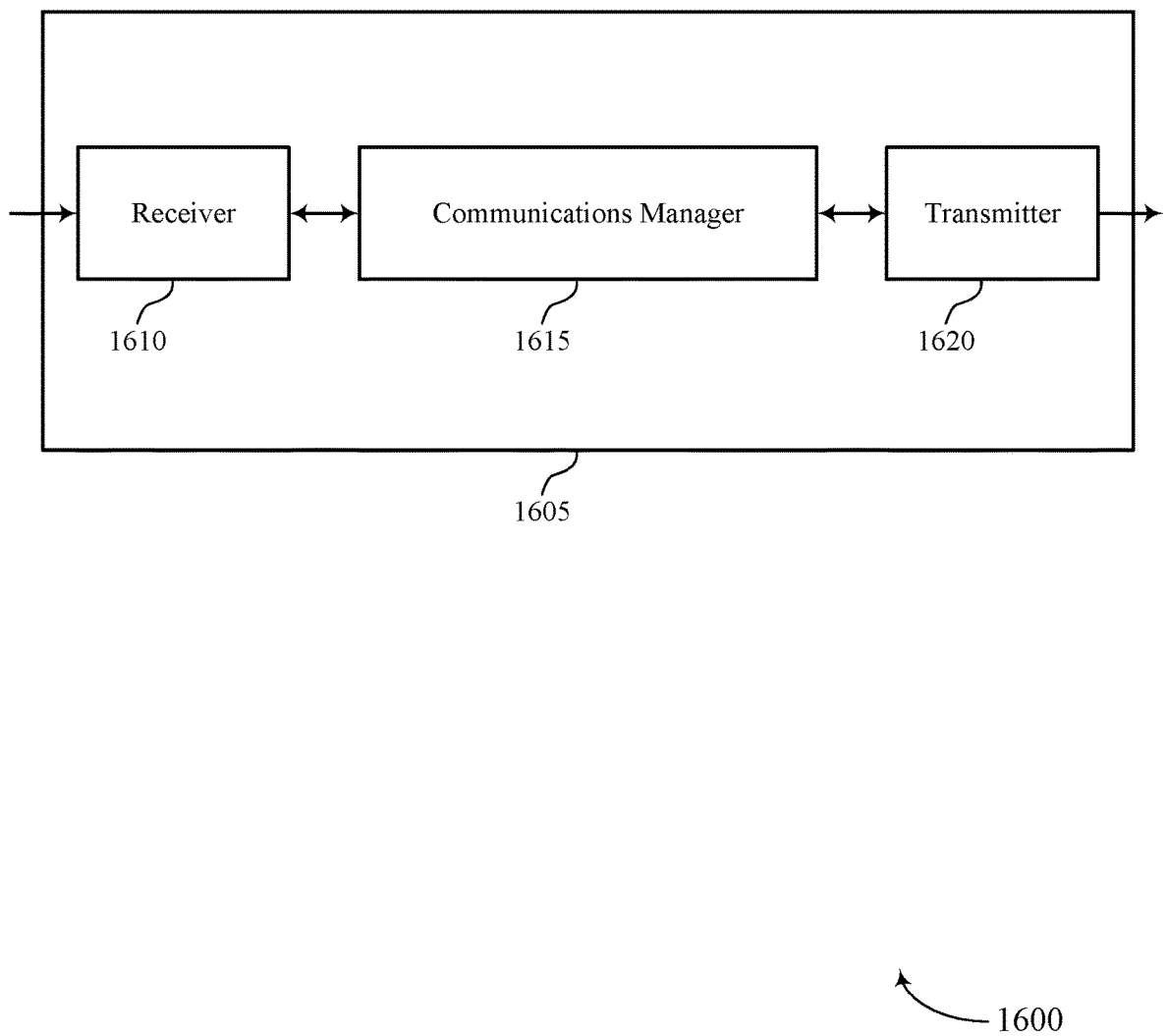
FIGS. 16 and 17 show block diagrams of devices that support fast recovery from link failure in dual-connectivity systems in accordance with aspects of the present disclosure.

FIG. 16 shows a block diagram 1600 of a device 1605 that supports fast recovery from link failure in dual-connectivity systems in accordance with aspects of the present disclosure. The device 1605 may be an example of aspects of a UE 115 as described herein. The device 1605 may include a receiver 1610, a communications manager 1615, and a transmitter 1620. The device 1605 may also include a processor. Each of these components may be in communication with one another (e.g., via one or more buses).

The receiver 1610 may receive information such as packets, user data, or control information associated with various information channels (e.g., control channels, data channels, and information related to fast recovery from link failure in dual-connectivity systems, etc.). Information may be passed on to other components of the device 1605. The receiver 1610 may be an example of aspects of the transceiver 1920 described with reference to FIG. 19. The receiver 1610 may utilize a single antenna or a set of antennas.

The communications manager 1615 may detect a radio link failure between the UE and a master node of a dual-connectivity configuration, determine a type of the radio link failure or a layer at which the radio link failure has occurred, select a recovery procedure for attempting to recover a link with the master node or a target node based on the type of the radio link failure or the layer at which the radio link failure has occurred, and perform the selected recovery procedure.

The communications manager 1615 may also detect a radio link failure between the UE and a master node of a dual-connectivity configuration, transmit, to a secondary node in the dual connectivity configuration, an indication that the radio link failure has occurred, start a recovery timer upon transmitting the indication that the radio link failure has occurred, and monitor for a response from the secondary node for at most a duration of the recovery timer.

The communications manager 1615 may also receive a radio resource control connection reconfiguration message from a master node of a dual-connectivity configuration, the radio resource control connection reconfiguration message indicating that the UE is to handover from a secondary node of the dual-connectivity configuration to a target secondary node, perform a handover from the secondary node of the dual-connectivity configuration to the target secondary node, detect a radio link failure between the UE and the master node of the dual-connectivity configuration, and delay transmission of an indication that the radio link failure has occurred to the target secondary node until after the handover to the target secondary node.

The communications manager 1615 may also receive a radio resource control connection configuration message from a master node of a dual-connectivity configuration, the radio resource control configuration message indicating that the UE is to add a secondary node to the dual-connectivity configuration according to a secondary node addition procedure, perform radio configuration of the secondary node according to the secondary node addition procedure, detect a radio link failure between the UE and the master node of the dual-connectivity configuration, and delay transmission of an indication that the radio link failure has occurred to the secondary node until after successfully completing a random-access procedure to gain access to the secondary node added according to the secondary node addition procedure. The communications manager 1615 may be an example of aspects of the communications manager 1910 described herein.

The communications manager 1615, or its sub-components, may be implemented in hardware, code (e.g., software or firmware) executed by a processor, or any combination thereof. If implemented in code executed by a processor, the functions of the communications manager 1615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1615, or its sub-components, may be physically located at various positions, including being distributed such that portions of functions are implemented at different physical locations by one or more physical components. In some examples, the communications manager 1615, or its sub-components, may be a separate and distinct component in accordance with various aspects of the present disclosure. In some examples, the communications manager 1615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1620 may transmit signals generated by other components of the device 1605. In some examples, the transmitter 1620 may be collocated with a receiver 1610 in a transceiver module. For example, the transmitter 1620 may be an example of aspects of the transceiver 1920 described with reference to FIG. 19. The transmitter 1620 may utilize a single antenna or a set of antennas.

Figure 17:
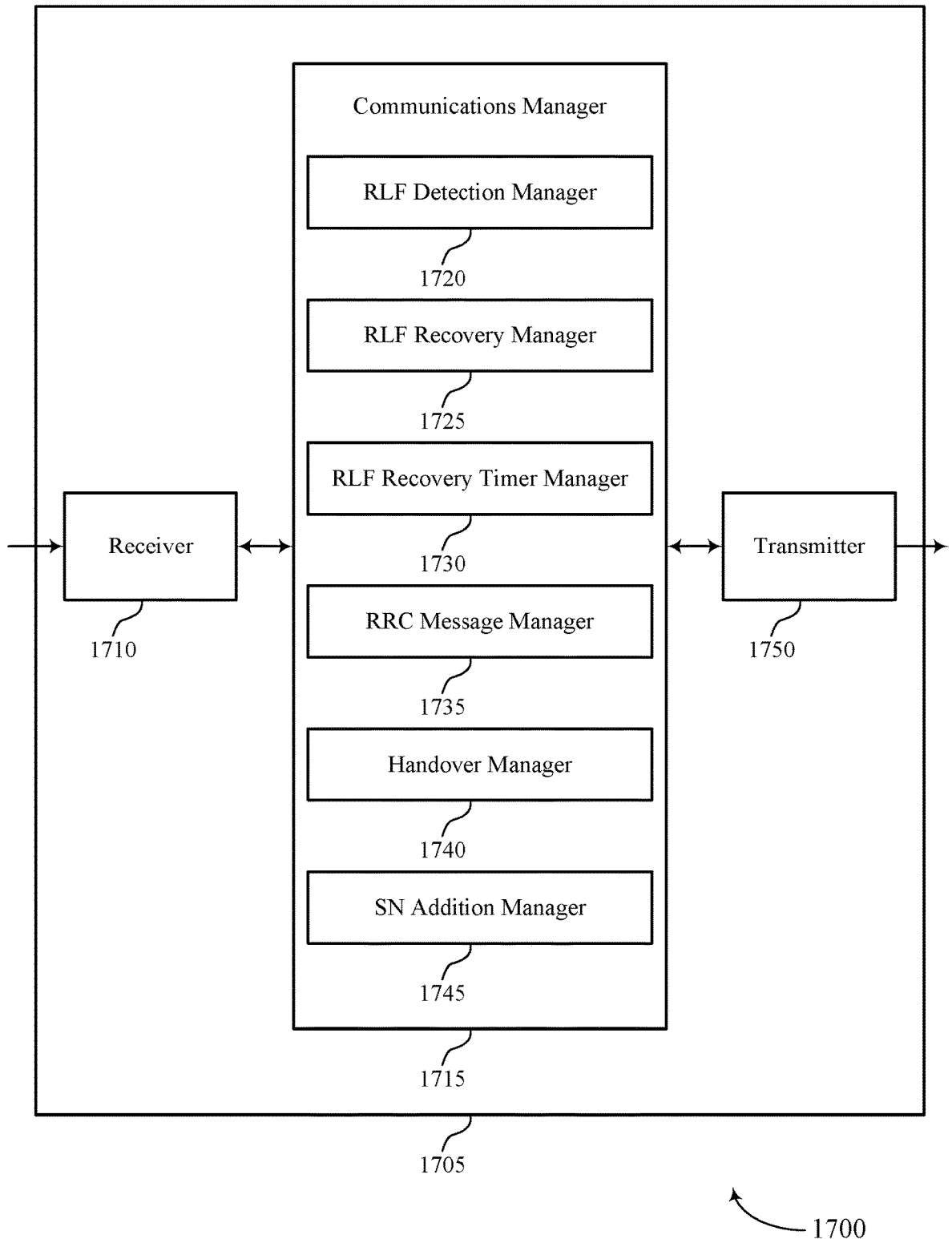

FIG. 17 shows a block diagram 1700 of a device 1705 that supports fast recovery from link failure in dual-connectivity systems in accordance with aspects of the present disclosure. The device 1705 may be an example of aspects of a device 1605, or a UE 115 as described herein. The device 1705 may include a receiver 1710, a communications manager 1715, and a transmitter 1750. The device 1705 may also include a processor. Each of these components may be in communication with one another (e.g., via one or more buses).

The receiver 1710 may receive information such as packets, user data, or control information associated with various information channels (e.g., control channels, data channels, and information related to fast recovery from link failure in dual-connectivity systems, etc.). Information may be passed on to other components of the device 1705. The receiver 1710 may be an example of aspects of the transceiver 1920 described with reference to FIG. 19. The receiver 1710 may utilize a single antenna or a set of antennas.

The communications manager 1715 may be an example of aspects of the communications manager 1615 as described herein. The communications manager 1715 may include a RLF detection manager 1720, a RLF recovery manager 1725, a RLF recovery timer manager 1730, a RRC message manager 1735, a handover manager 1740, and a SN addition manager 1745. The communications manager 1715 may be an example of aspects of the communications manager 1910 described herein.

The RLF detection manager 1720 may detect a radio link failure between the UE and a master node of a dual-connectivity configuration and determine a type of the radio link failure or a layer at which the radio link failure has occurred. The RLF recovery manager 1725 may select a recovery procedure for attempting to recover a link with the master node or a target node based on the type of the radio link failure or the layer at which the radio link failure has occurred and perform the selected recovery procedure.

The RLF detection manager 1720 may detect a radio link failure between the UE and a master node of a dual-connectivity configuration. The RLF recovery manager 1725 may transmit, to a secondary node in the dual connectivity configuration, an indication that the radio link failure has occurred. The RLF recovery timer manager 1730 may start a recovery timer upon transmitting the indication that the radio link failure has occurred. The RRC message manager 1735 may monitor for a response from the secondary node for at most a duration of the recovery timer.

The handover manager 1740 may receive a radio resource control connection reconfiguration message from a master node of a dual-connectivity configuration, the radio resource control connection reconfiguration message indicating that the UE is to handover from a secondary node of the dual-connectivity configuration to a target secondary node and perform a handover from the secondary node of the dual-connectivity configuration to the target secondary node. The RLF detection manager 1720 may detect a radio link failure between the UE and the master node of the dual-connectivity configuration. The RLF recovery manager 1725 may delay transmission of an indication that the radio link failure has occurred to the target secondary node until after the handover to the target secondary node.

The SN addition manager 1745 may receive a radio resource control connection configuration message from a master node of a dual-connectivity configuration, the radio resource control configuration message indicating that the UE is to add a secondary node to the dual-connectivity configuration according to a secondary node addition procedure and perform radio configuration of the secondary node according to the secondary node addition procedure. The RLF detection manager 1720 may detect a radio link failure between the UE and the master node of the dual-connectivity configuration. The RLF recovery manager 1725 may delay transmission of an indication that the radio link failure has occurred to the secondary node until after successfully completing a random-access procedure to gain access to the secondary node added according to the secondary node addition procedure.

The transmitter 1750 may transmit signals generated by other components of the device 1705. In some examples, the transmitter 1750 may be collocated with a receiver 1710 in a transceiver module. For example, the transmitter 1750 may be an example of aspects of the transceiver 1920 described with reference to FIG. 19. The transmitter 1750 may utilize a single antenna or a set of antennas.

Figure 18:
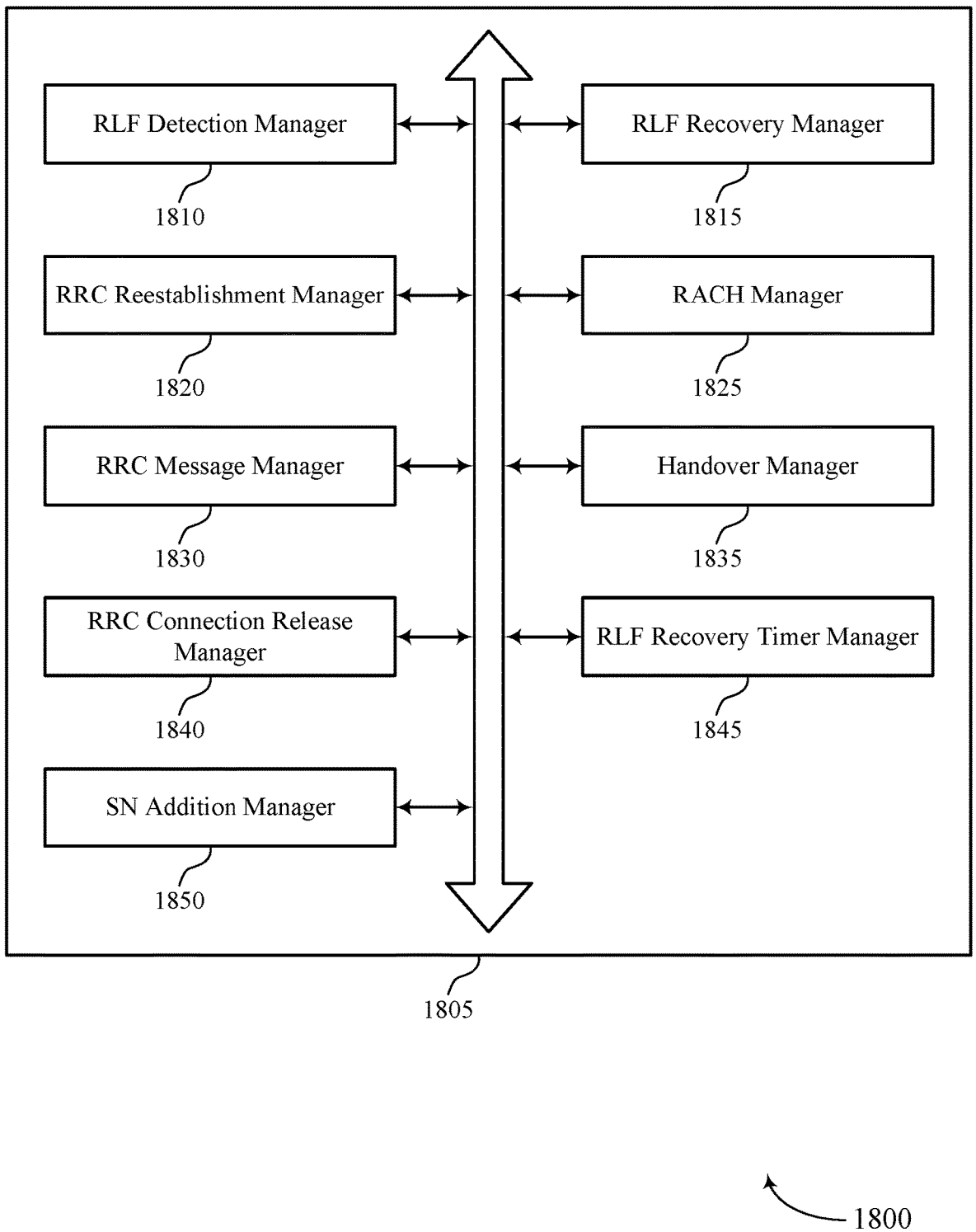
FIG. 18 shows a block diagram of a communications manager that supports fast recovery from link failure in dual-connectivity systems in accordance with aspects of the present disclosure.

FIG. 18 shows a block diagram 1800 of a communications manager 1805 that supports fast recovery from link failure in dual-connectivity systems in accordance with aspects of the present disclosure. The communications manager 1805 may be an example of aspects of a communications manager 1615, a communications manager 1715, or a communications manager 1910 described herein. The communications manager 1805 may include a RLF detection manager 1810, a RLF recovery manager 1815, a RRC reestablishment manager 1820, a RACH manager 1825, a RRC message manager 1830, a handover manager 1835, a RRC connection release manager 1840, a RLF recovery timer manager 1845, and a SN addition manager 1850. Each of these modules may communicate, directly or indirectly, with another one (e.g., via one or more buses).

The RLF detection manager 1810 may detect a radio link failure between the UE and a master node of a dual-connectivity configuration. In some examples, the RLF detection manager 1810 may determine a type of the radio link failure or a layer at which the radio link failure has occurred. In some examples, the RLF detection manager 1810 may detect a radio link failure between the UE and a master node of a dual-connectivity configuration. In some examples, the RLF detection manager 1810 may detect a radio link failure between the UE and the master node of the dual-connectivity configuration. In some examples, the RLF detection manager 1810 may detect a radio link failure between the UE and the master node of the dual-connectivity configuration.

In some examples, the RLF detection manager 1810 may determine that the radio link failure has occurred at a radio resource control layer based on failing to comply with a provided radio configuration in a radio resource control message; or determine that the radio link failure is an integrity check failure based on receiving an integrity check failure indication from a packet data convergence protocol layer. In some examples, the RLF detection manager 1810 may determine that the radio link failure has occurred at a physical layer, media access control layer, or radio link control layer; or determine that the radio link failure is a handover failure.

The RLF recovery manager 1815 may select a recovery procedure for attempting to recover a link with the master node or a target node based on the type of the radio link failure or the layer at which the radio link failure has occurred. In some examples, the RLF recovery manager 1815 may perform the selected recovery procedure. In some examples, the RLF recovery manager 1815 may transmit, to a secondary node in the dual connectivity configuration, an indication that the radio link failure has occurred. In some examples, the RLF recovery manager 1815 may delay transmission of an indication that the radio link failure has occurred to the target secondary node until after the handover to the target secondary node.

In some examples, the RLF recovery manager 1815 may delay transmission of an indication that the radio link failure has occurred to the secondary node until after successfully completing a random-access procedure to gain access to the secondary node added according to the secondary node addition procedure. In some examples, the RLF recovery manager 1815 may transmit, to a secondary node in a dual-connectivity configuration, an indication that the radio link failure has occurred. In some examples, the RLF recovery manager 1815 may transmit, to the target secondary node, the indication that the radio link failure has occurred after successfully completing the random-access procedure.

In some examples, the RLF recovery manager 1815 may delay triggering a recovery procedure until after the handover to the target secondary node. In some examples, the RLF recovery manager 1815 may transmit, to the secondary node, the indication that the radio link failure has occurred after successfully completing the random-access procedure. In some examples, the RLF recovery manager 1815 may delay triggering a recovery procedure until after successfully completing the random-access procedure to gain access to the secondary node. The RRC message manager 1830 may monitor for a response from the secondary node for at most a duration of the recovery timer.

In some examples, the RRC message manager 1830 may monitor for a response from the secondary node based on the transmitting. In some examples, the RRC message manager 1830 may receive a radio resource control reconfiguration message indicating that the UE is to perform a handover procedure from the master node to the target node. In some examples, the RRC message manager 1830 may receive a radio resource control release message indicating that the UE is to release a radio resource control connection with the master node. In some examples, the RRC message manager 1830 may fail to receive the response before a recovery timer expires.

In some examples, the RRC message manager 1830 may receive a radio resource control reconfiguration message indicating that the UE is to perform a handover procedure from the master node to a target node. In some examples, the RRC message manager 1830 may receive a radio resource control release message indicating that the UE is to release a radio resource control connection with the master node. In some examples, the RRC message manager 1830 may fail to receive the response before the recovery timer expires. The handover manager 1835 may receive a radio resource control connection reconfiguration message from a master node of a dual-connectivity configuration, the radio resource control connection reconfiguration message indicating that the UE is to handover from a secondary node of the dual-connectivity configuration to a target secondary node.

In some examples, the handover manager 1835 may perform a handover from the secondary node of the dual-connectivity configuration to the target secondary node. In some examples, the handover manager 1835 may initiate the handover procedure from the master node to the target node based on the radio resource control reconfiguration message. In some examples, the handover manager 1835 may initiate the handover procedure from the master node to the target node based on the radio resource control reconfiguration message. In some examples, the handover manager 1835 may start a handover timer upon receiving the radio resource control reconfiguration message. In some examples, the handover manager 1835 may fail to successfully complete the handover procedure before the handover timer expires.

The RLF recovery timer manager 1845 may start a recovery timer upon transmitting the indication that the radio link failure has occurred. The SN addition manager 1850 may receive a radio resource control connection configuration message from a master node of a dual-connectivity configuration, the radio resource control configuration message indicating that the UE is to add a secondary node to the dual-connectivity configuration according to a secondary node addition procedure. In some examples, the SN addition manager 1850 may perform radio configuration of the secondary node according to the secondary node addition procedure.

The RRC reestablishment manager 1820 may transmit, to a secondary node in a dual-connectivity configuration, a radio resource control reestablishment request for reestablishing a connection with the master node. In some examples, the RRC reestablishment manager 1820 may receive, from the secondary node or the master node, a radio resource control reestablishment message based on the transmitting. In some examples, the RRC reestablishment manager 1820 may perform a reestablishment procedure based on receiving the radio resource control reestablishment message. In some examples, the RRC reestablishment manager 1820 may transmit the radio resource control reestablishment request over a split signaling radio bearer or a signaling radio bearer established between the UE and the secondary node only.

In some examples, the RRC reestablishment manager 1820 may transmit the radio resource control reestablishment request on the uplink resources. In some examples, the RRC reestablishment manager 1820 may receive, from the master node, a radio resource control reestablishment message based on the transmitting. In some examples, the RRC reestablishment manager 1820 may transmit the radio resource control reestablishment request message over a signaling radio bearer. In some examples, the RRC reestablishment manager 1820 may perform a radio resource control reestablishment procedure based on the releasing. In some examples, the RRC reestablishment manager 1820 may perform a radio resource control reestablishment procedure based on the failing. In some examples, the RRC reestablishment manager 1820 may perform a radio resource control reestablishment procedure based on the failing.

In some examples, the RRC reestablishment manager 1820 may perform a radio resource control reestablishment procedure based on the releasing. In some examples, the RRC reestablishment manager 1820 may perform a radio resource control re-establishment procedure based on the failing. In some examples, the RRC reestablishment manager 1820 may perform a radio resource control reestablishment procedure based on the releasing. In some examples, the RRC reestablishment manager 1820 may perform a radio resource control reestablishment procedure based on the releasing. In some cases, the radio resource control reestablishment request includes a physical cell identifier of the master node, a cell radio network temporary identifier assigned by the master node, an indication of a cause of the reestablishment procedure, or a combination thereof. In some cases, the cause of the reestablishment procedure includes an IP failure with a master cell group or a reconfiguration failure with the master cell group.

The RACH manager 1825 may transmit a first random-access message to the master node. In some examples, the RACH manager 1825 may receive a second random-access message from the master node in response to the first random-access message, the second random-access message providing a grant for uplink resources for the UE to transmit a radio resource control reestablishment request. In some examples, the RACH manager 1825 may perform a random-access procedure to gain access to the target secondary node after the handover to the target secondary node. In some examples, the RACH manager 1825 may determine that the random-access procedure has failed based on a random-access timer expiring before completion of the random-access procedure.

In some examples, the RACH manager 1825 may perform the random-access procedure to gain access to the secondary node. In some examples, the RACH manager 1825 may determine that the random-access procedure has failed based on a random-access timer expiring before completion of the random-access procedure. The RRC connection release manager 1840 may release the radio resource control connection with the master node based on the radio resource control release message. In some examples, the RRC connection release manager 1840 may release the radio resource control connection with the master node based on the radio resource control release message. In some examples, the RRC connection release manager 1840 may release the master node and the target secondary node. In some examples, the RRC connection release manager 1840 may release the master node and the secondary node.

Figure 19:
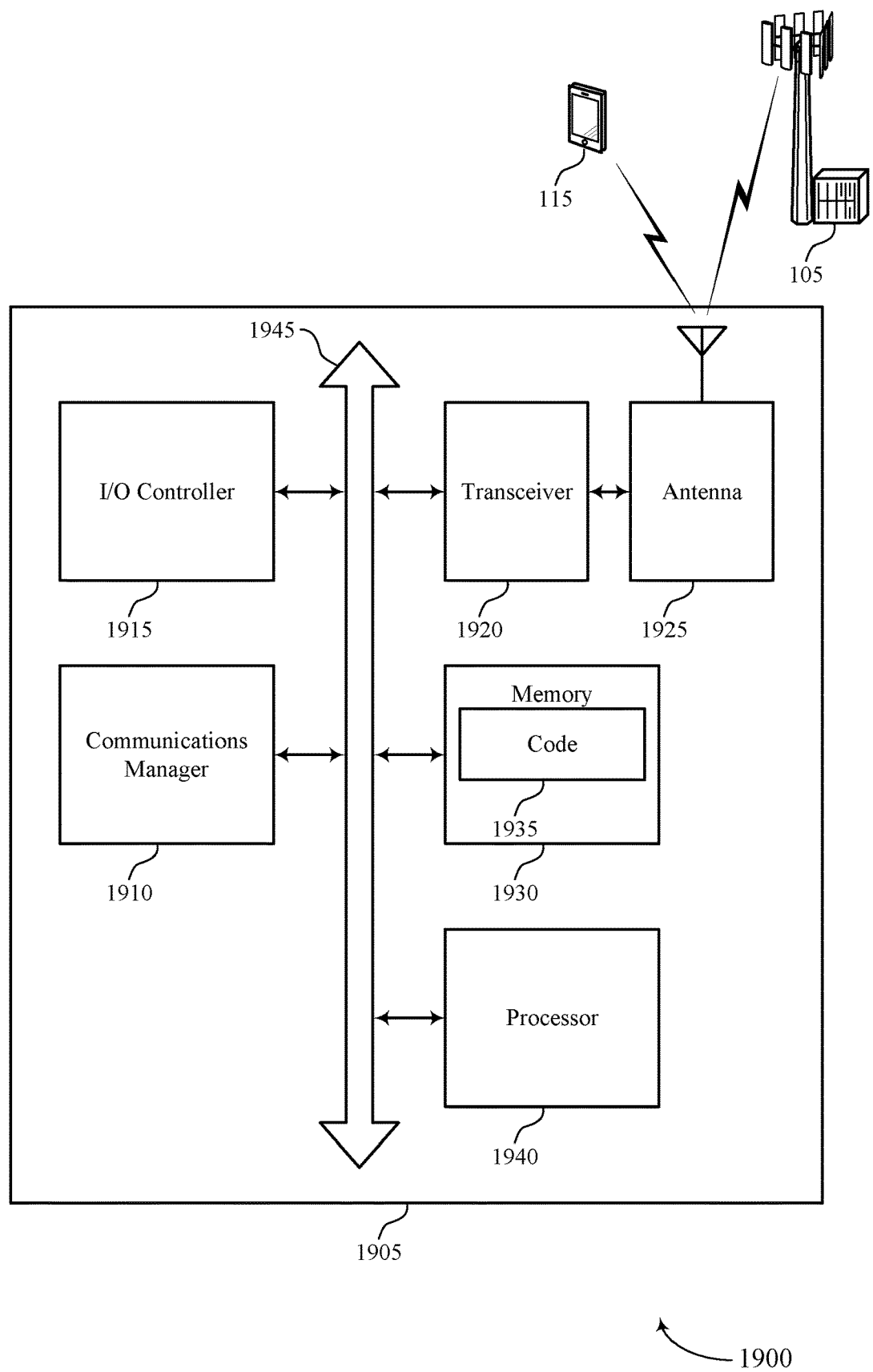
FIG. 19 shows a diagram of a system including a device that supports fast recovery from link failure in dual-connectivity systems in accordance with aspects of the present disclosure.

FIG. 19 shows a diagram of a system 1900 including a device 1905 that supports fast recovery from link failure in dual-connectivity systems in accordance with aspects of the present disclosure. The device 1905 may be an example of or include the components of device 1605, device 1705, or a UE 115 as described herein. The device 1905 may include components for bi-directional voice and data communications including components for transmitting and receiving communications, including a communications manager 1910, an I/O controller 1915, a transceiver 1920, an antenna 1925, memory 1930, and a processor 1940. These components may be in electronic communication via one or more buses (e.g., bus 1945).

The communications manager 1910 may detect a radio link failure between the UE and a master node of a dual-connectivity configuration, determine a type of the radio link failure or a layer at which the radio link failure has occurred, select a recovery procedure for attempting to recover a link with the master node or a target node based on the type of the radio link failure or the layer at which the radio link failure has occurred, and perform the selected recovery procedure.

The communications manager 1910 may also detect a radio link failure between the UE and a master node of a dual-connectivity configuration, transmit, to a secondary node in the dual connectivity configuration, an indication that the radio link failure has occurred, start a recovery timer upon transmitting the indication that the radio link failure has occurred, and monitor for a response from the secondary node for at most a duration of the recovery timer.

The communications manager 1910 may also receive a radio resource control connection reconfiguration message from a master node of a dual-connectivity configuration, the radio resource control connection reconfiguration message indicating that the UE is to handover from a secondary node of the dual-connectivity configuration to a target secondary node, perform a handover from the secondary node of the dual-connectivity configuration to the target secondary node, detect a radio link failure between the UE and the master node of the dual-connectivity configuration, and delay transmission of an indication that the radio link failure has occurred to the target secondary node until after the handover to the target secondary node.

The communications manager 1910 may also receive a radio resource control connection configuration message from a master node of a dual-connectivity configuration, the radio resource control configuration message indicating that the UE is to add a secondary node to the dual-connectivity configuration according to a secondary node addition procedure, perform radio configuration of the secondary node according to the secondary node addition procedure, detect a radio link failure between the UE and the master node of the dual-connectivity configuration, and delay transmission of an indication that the radio link failure has occurred to the secondary node until after successfully completing a random-access procedure to gain access to the secondary node added according to the secondary node addition procedure.

The I/O controller 1915 may manage input and output signals for the device 1905. The I/O controller 1915 may also manage peripherals not integrated into the device 1905. In some cases, the I/O controller 1915 may represent a physical connection or port to an external peripheral. In some cases, the I/O controller 1915 may utilize an operating system such as iOS®, ANDROID®, MS-DOS®, MS-WINDOWS®, OS/2®, UNIX®, LINUX®, or another known operating system. In other cases, the I/O controller 1915 may represent or interact with a modem, a keyboard, a mouse, a touchscreen, or a similar device. In some cases, the I/O controller 1915 may be implemented as part of a processor. In some cases, a user may interact with the device 1905 via the I/O controller 1915 or via hardware components controlled by the I/O controller 1915.

The transceiver 1920 may communicate bi-directionally, via one or more antennas, wired, or wireless links as described above. For example, the transceiver 1920 may represent a wireless transceiver and may communicate bi-directionally with another wireless transceiver. The transceiver 1920 may also include a modem to modulate the packets and provide the modulated packets to the antennas for transmission, and to demodulate packets received from the antennas.

In some cases, the wireless device may include a single antenna 1925. However, in some cases the device may have more than one antenna 1925, which may be capable of concurrently transmitting or receiving multiple wireless transmissions.

The memory 1930 may include RAM and ROM. The memory 1930 may store computer-readable, computer-executable code 1935 including instructions that, when executed, cause the processor to perform various functions described herein. In some cases, the memory 1930 may contain, among other things, a BIOS which may control basic hardware or software operation such as the interaction with peripheral components or devices.

The processor 1940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1940 may be configured to operate a memory array using a memory controller. In other cases, a memory controller may be integrated into the processor 1940. The processor 1940 may be configured to execute computer-readable instructions stored in a memory (e.g., the memory 1930) to cause the device 1905 to perform various functions (e.g., functions or tasks supporting fast recovery from link failure in dual-connectivity systems).

The code 1935 may include instructions to implement aspects of the present disclosure, including instructions to support wireless communications. The code 1935 may be stored in a non-transitory computer-readable medium such as system memory or other type of memory. In some cases, the code 1935 may not be directly executable by the processor 1940 but may cause a computer (e.g., when compiled and executed) to perform functions described herein.

Figure 20:
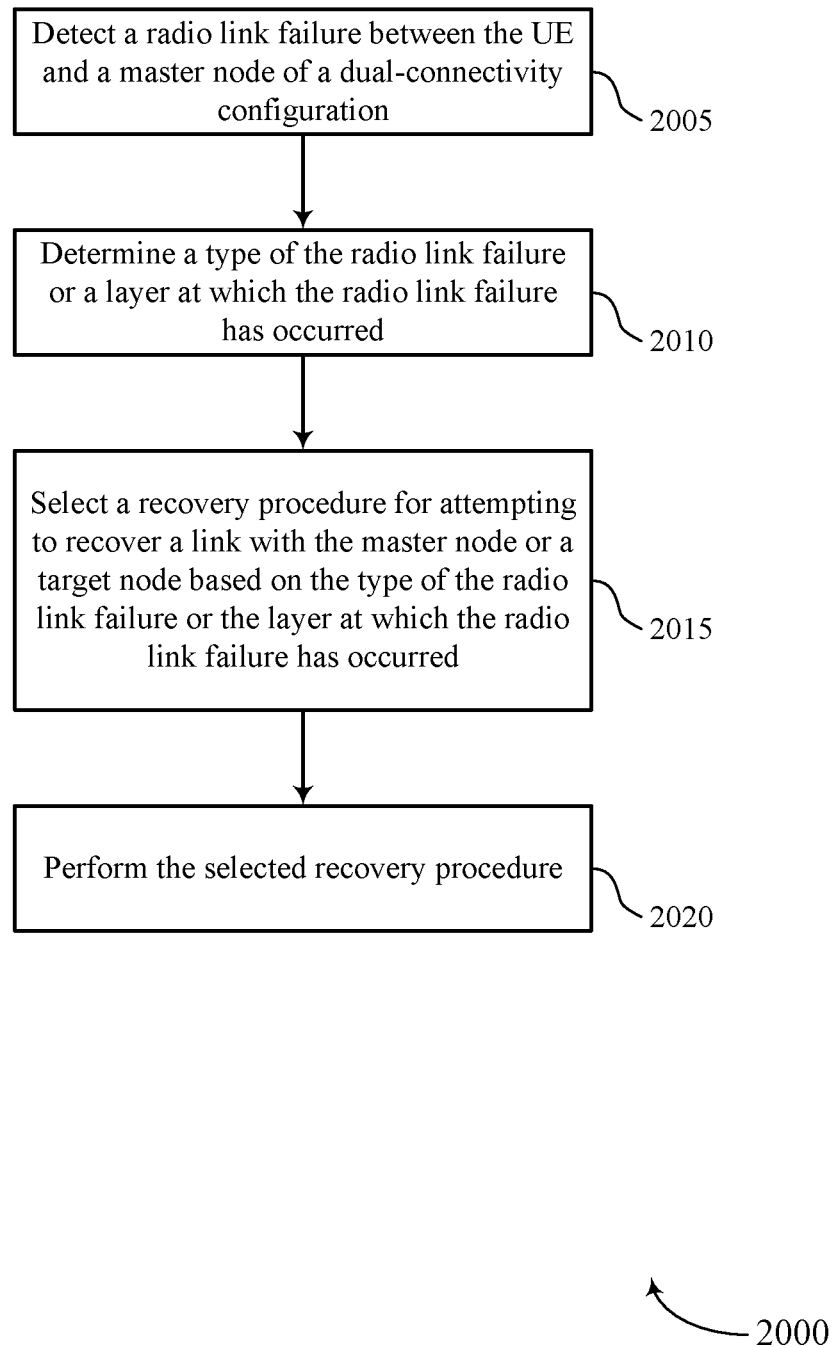
FIGS. 20 through 23 show flowcharts illustrating methods that support fast recovery from link failure in dual-connectivity systems in accordance with aspects of the present disclosure.

FIG. 20 shows a flowchart illustrating a method 2000 that supports fast recovery from link failure in dual-connectivity systems in accordance with aspects of the present disclosure. The operations of method 2000 may be implemented by a UE 115 or its components as described herein. For example, the operations of method 2000 may be performed by a communications manager as described with reference to FIGS. 16 through 19. In some examples, a UE may execute a set of instructions to control the functional elements of the UE to perform the functions described below. Additionally, or alternatively, a UE may perform aspects of the functions described below using special-purpose hardware.

At 2005, the UE may detect a radio link failure between the UE and a master node of a dual-connectivity configuration. The operations of 2005 may be performed according to the methods described herein. In some examples, aspects of the operations of 2005 may be performed by a RLF detection manager as described with reference to FIGS. 16 through 19.

At 2010, the UE may determine a type of the radio link failure or a layer at which the radio link failure has occurred. The operations of 2010 may be performed according to the methods described herein. In some examples, aspects of the operations of 2010 may be performed by a RLF detection manager as described with reference to FIGS. 16 through 19.

At 2015, the UE may select a recovery procedure for attempting to recover a link with the master node or a target node based on the type of the radio link failure or the layer at which the radio link failure has occurred. The operations of 2015 may be performed according to the methods described herein. In some examples, aspects of the operations of 2015 may be performed by a RLF recovery manager as described with reference to FIGS. 16 through 19.

At 2020, the UE may perform the selected recovery procedure. The operations of 2020 may be performed according to the methods described herein. In some examples, aspects of the operations of 2020 may be performed by an RLF recovery manager as described with reference to FIGS. 16 through 19.

Figure 21:
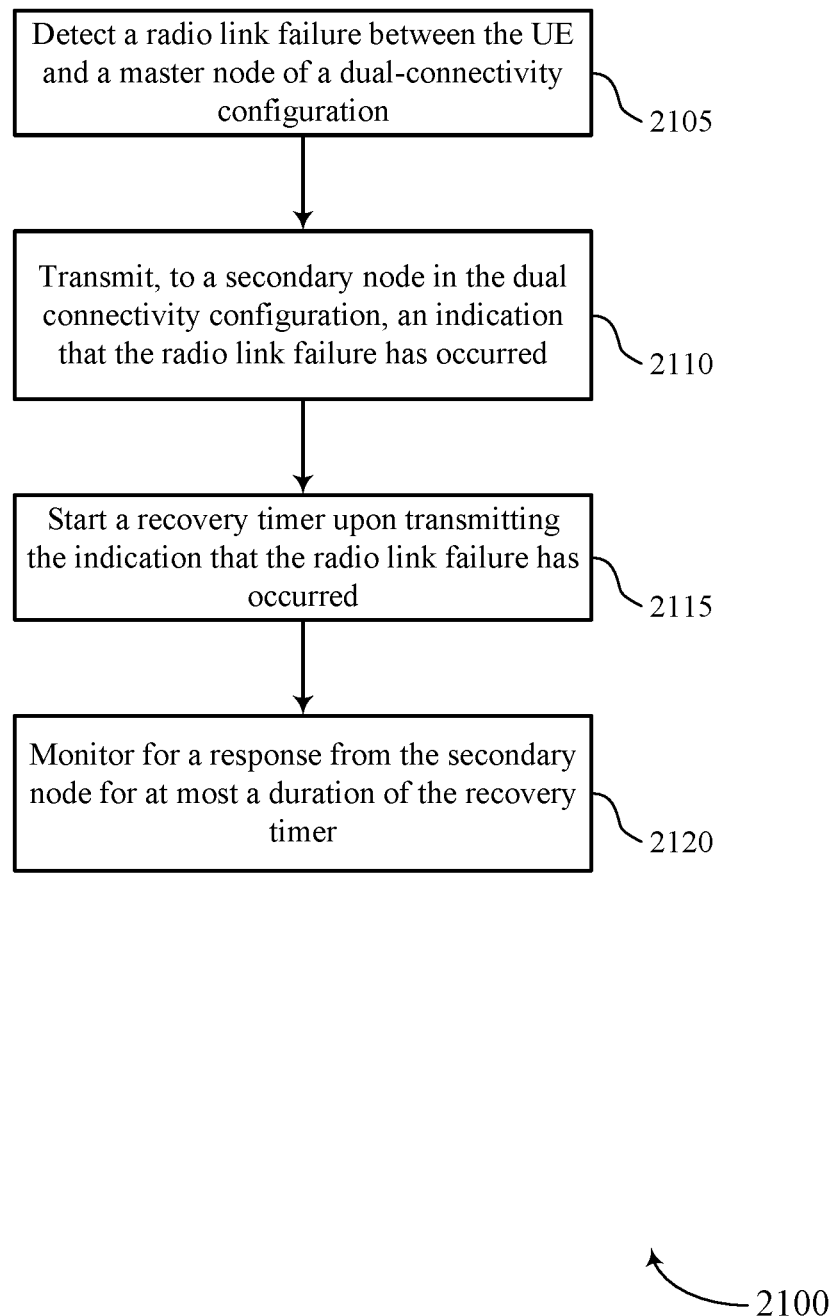

FIG. 21 shows a flowchart illustrating a method 2100 that supports fast recovery from link failure in dual-connectivity systems in accordance with aspects of the present disclosure. The operations of method 2100 may be implemented by a UE 115 or its components as described herein. For example, the operations of method 2100 may be performed by a communications manager as described with reference to FIGS. 16 through 19. In some examples, a UE may execute a set of instructions to control the functional elements of the UE to perform the functions described below. Additionally, or alternatively, a UE may perform aspects of the functions described below using special-purpose hardware.

At 2105, the UE may detect a radio link failure between the UE and a master node of a dual-connectivity configuration. The operations of 2105 may be performed according to the methods described herein. In some examples, aspects of the operations of 2105 may be performed by a RLF detection manager as described with reference to FIGS. 16 through 19.

At 2110, the UE may transmit, to a secondary node in the dual connectivity configuration, an indication that the radio link failure has occurred. The operations of 2110 may be performed according to the methods described herein. In some examples, aspects of the operations of 2110 may be performed by an RLF recovery manager as described with reference to FIGS. 16 through 19.

At 2115, the UE may start a recovery timer upon transmitting the indication that the radio link failure has occurred. The operations of 2115 may be performed according to the methods described herein. In some examples, aspects of the operations of 2115 may be performed by an RLF recovery timer manager as described with reference to FIGS. 16 through 19.

At 2120, the UE may monitor for a response from the secondary node for at most a duration of the recovery timer. The operations of 2120 may be performed according to the methods described herein. In some examples, aspects of the operations of 2120 may be performed by an RRC message manager as described with reference to FIGS. 16 through 19.

Figure 22:
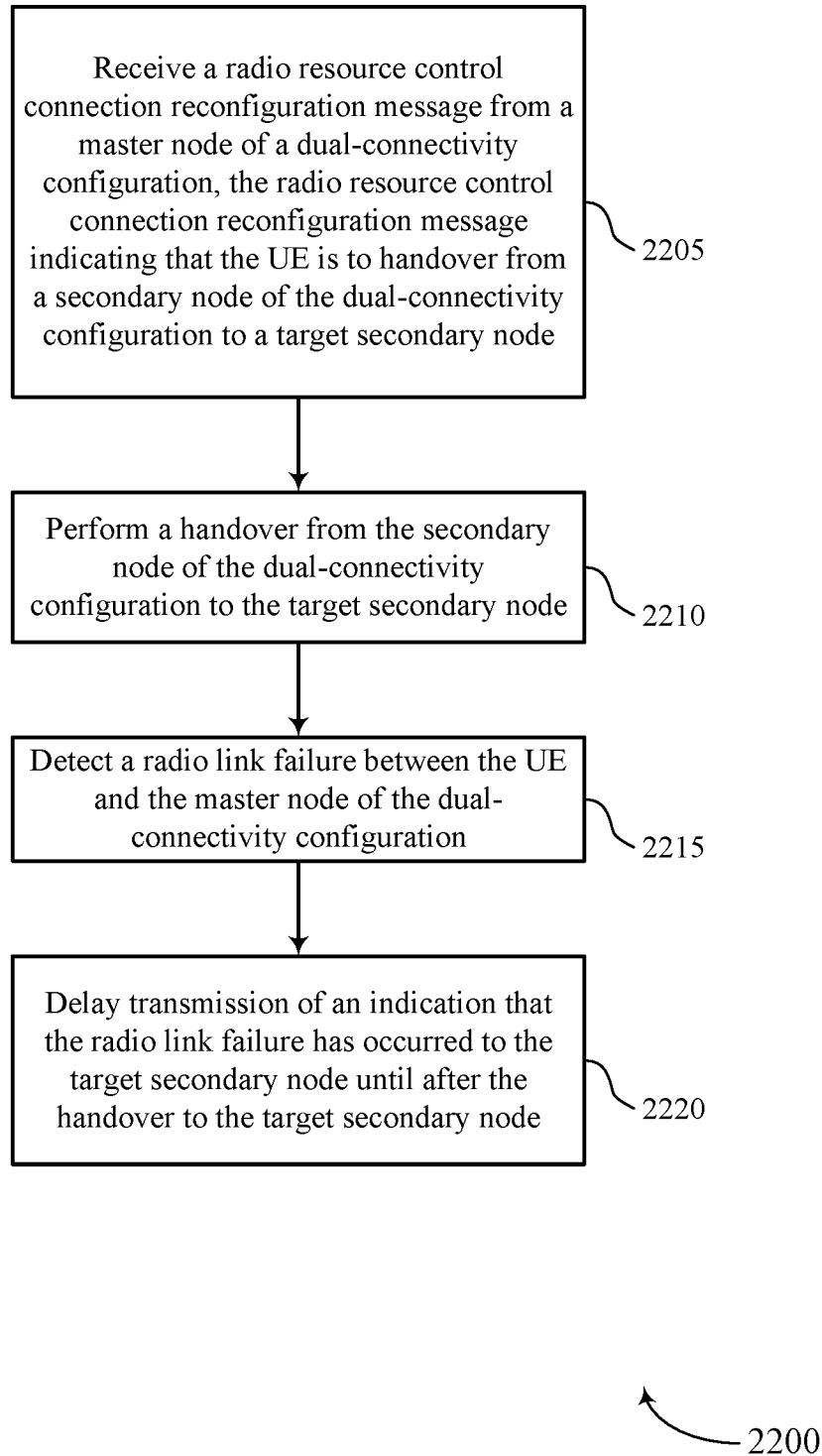

FIG. 22 shows a flowchart illustrating a method 2200 that supports fast recovery from link failure in dual-connectivity systems in accordance with aspects of the present disclosure. The operations of method 2200 may be implemented by a UE 115 or its components as described herein. For example, the operations of method 2200 may be performed by a communications manager as described with reference to FIGS. 16 through 19. In some examples, a UE may execute a set of instructions to control the functional elements of the UE to perform the functions described below. Additionally, or alternatively, a UE may perform aspects of the functions described below using special-purpose hardware.

At 2205, the UE may receive a radio resource control connection reconfiguration message from a master node of a dual-connectivity configuration, the radio resource control connection reconfiguration message indicating that the UE is to handover from a secondary node of the dual-connectivity configuration to a target secondary node. The operations of 2205 may be performed according to the methods described herein. In some examples, aspects of the operations of 2205 may be performed by a handover manager as described with reference to FIGS. 16 through 19.

At 2210, the UE may perform a handover from the secondary node of the dual-connectivity configuration to the target secondary node. The operations of 2210 may be performed according to the methods described herein. In some examples, aspects of the operations of 2210 may be performed by a handover manager as described with reference to FIGS. 16 through 19.

At 2215, the UE may detect a radio link failure between the UE and the master node of the dual-connectivity configuration. The operations of 2215 may be performed according to the methods described herein. In some examples, aspects of the operations of 2215 may be performed by an RLF detection manager as described with reference to FIGS. 16 through 19.

At 2220, the UE may delay transmission of an indication that the radio link failure has occurred to the target secondary node until after the handover to the target secondary node. The operations of 2220 may be performed according to the methods described herein. In some examples, aspects of the operations of 2220 may be performed by an RLF recovery manager as described with reference to FIGS. 16 through 19.

Figure 23:
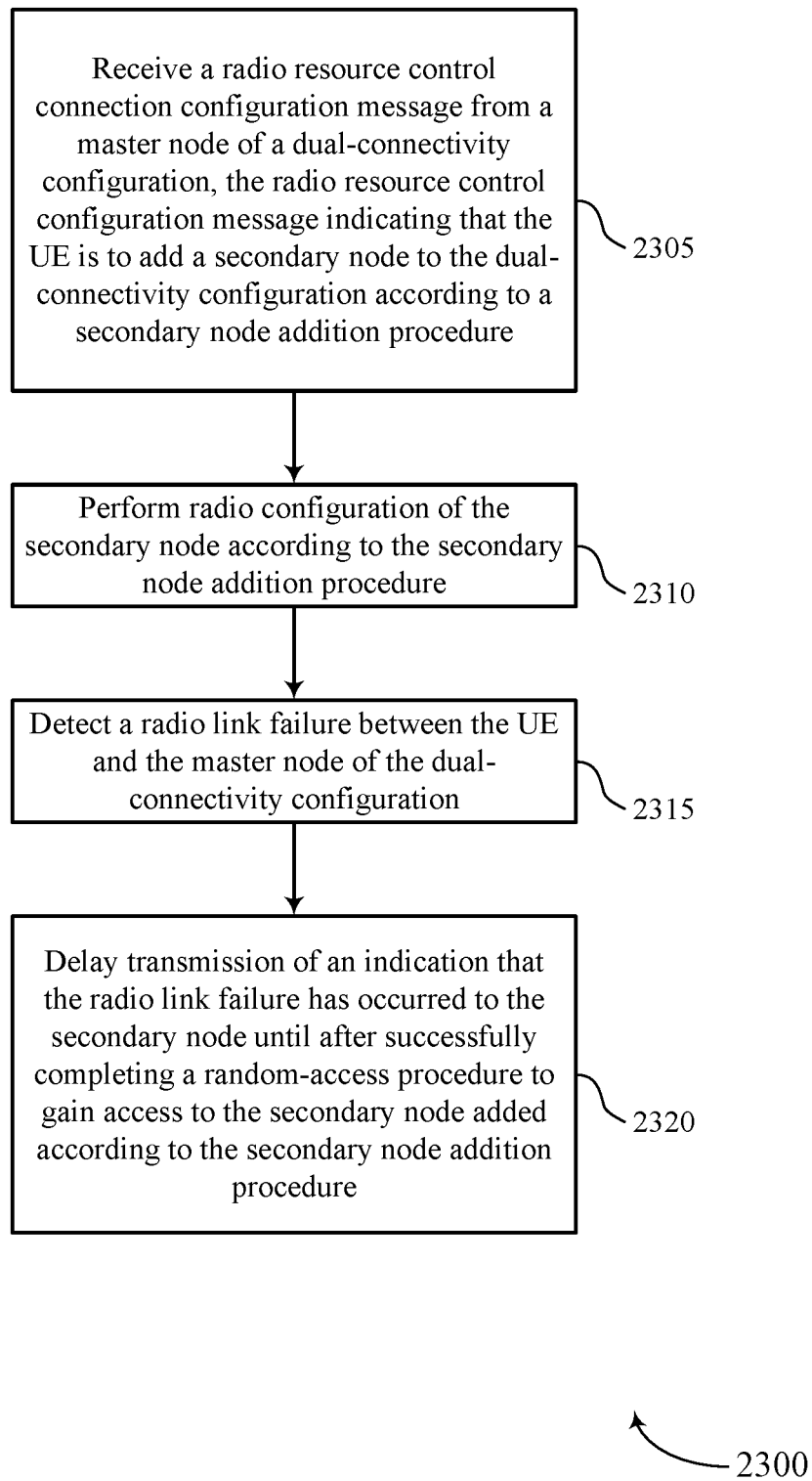

FIG. 23 shows a flowchart illustrating a method 2300 that supports fast recovery from link failure in dual-connectivity systems in accordance with aspects of the present disclosure. The operations of method 2300 may be implemented by a UE 115 or its components as described herein. For example, the operations of method 2300 may be performed by a communications manager as described with reference to FIGS. 16 through 19. In some examples, a UE may execute a set of instructions to control the functional elements of the UE to perform the functions described below. Additionally, or alternatively, a UE may perform aspects of the functions described below using special-purpose hardware.

At 2305, the UE may receive a radio resource control connection configuration message from a master node of a dual-connectivity configuration, the radio resource control configuration message indicating that the UE is to add a secondary node to the dual-connectivity configuration according to a secondary node addition procedure. The operations of 2305 may be performed according to the methods described herein. In some examples, aspects of the operations of 2305 may be performed by a SN addition manager as described with reference to FIGS. 16 through 19.

At 2310, the UE may perform radio configuration of the secondary node according to the secondary node addition procedure. The operations of 2310 may be performed according to the methods described herein. In some examples, aspects of the operations of 2310 may be performed by a SN addition manager as described with reference to FIGS. 16 through 19.

At 2315, the UE may detect a radio link failure between the UE and the master node of the dual-connectivity configuration. The operations of 2315 may be performed according to the methods described herein. In some examples, aspects of the operations of 2315 may be performed by an RLF detection manager as described with reference to FIGS. 16 through 19.

At 2320, the UE may delay transmission of an indication that the radio link failure has occurred to the secondary node until after successfully completing a random-access procedure to gain access to the secondary node added according to the secondary node addition procedure. The operations of 2320 may be performed according to the methods described herein. In some examples, aspects of the operations of 2320 may be performed by a RLF recovery manager as described with reference to FIGS. 16 through 19.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A user equipment (UE), comprising:
at least one processor;
a transceiver; and
memory comprising instructions executable by the at least one processor to cause the UE to:
detect a radio link failure between the UE and a master node, the UE and the master node being associated with a dual-connectivity configuration;
select a recovery procedure based at least in part on a layer at which the radio link failure had occurred; and
perform the selected recovery procedure, wherein instructions to perform the selected recovery procedure are executable by the at least one processor to cause the UE to:
transmit, via the transceiver and to the master node via a secondary node also being associated with the dual-connectivity configuration, a radio resource control master cell-group failure information message or a radio resource control reestablishment request for reestablishing a connection with the master node, wherein:
the selected recovery procedure is a fast recovery procedure based at least in part on the layer at which the radio link failure had occurred being a physical layer, media access control layer, or a radio link control layer; or
the selected recovery procedure is a radio resource control reestablishment procedure based at least in part on the layer at which the radio link failure had occurred being a packet data convergence protocol layer.

2. The UE of claim 1, wherein:
the radio link failure occurred at a radio resource control layer based at least in part on a failure to comply with a provided radio configuration in a radio resource control message, or
the radio link failure is an integrity check failure based at least in part on reception of an integrity check failure indication from the packet data convergence protocol layer.

3. The UE of claim 2, wherein the instructions to perform the selected recovery procedure are executable by the at least one processor to cause the UE to:
receive, via the transceiver, a radio resource control reestablishment message after transmission of the radio resource control master cell-group failure information message or the radio resource control reestablishment request; and
perform a reestablishment procedure after receiving the radio resource control reestablishment message.

4. The UE of claim 3, wherein the instructions are further executable by the at least one processor to cause the UE to:
detect, after transmitting the radio resource control master cell-group failure information message and before receiving a response message from a network, a second radio link failure between the UE and the secondary node associated with the dual-connectivity configuration; and
perform the reestablishment procedure after detection of the second radio link failure between the UE and the secondary node.

5. The UE of claim 3, wherein the instructions are further executable by the at least one processor to cause the UE to:
transmit, via the transceiver, the radio resource control master cell-group failure information message over a split signaling radio bearer or a signaling radio bearer established between the UE and the secondary node only, or
transmit, via the transceiver, the radio resource control reestablishment request over the split signaling radio bearer or the signaling radio bearer established between the UE and the secondary node only.

6. The UE of claim 5, wherein the split signaling radio bearer (SRB) comprises a SRB1 and the SRB established between the UE and the secondary node comprises a SRB3.

7. The UE of claim 3, wherein the radio resource control reestablishment request comprises a physical cell identifier of the master node, a cell radio network temporary identifier assigned by the master node, an indication of a cause of the reestablishment procedure, a measurement report, or a combination thereof.

8. The UE of claim 5, wherein the radio resource control reestablishment request comprises the radio resource control master cell-group failure information message.

9. The UE of claim 2, wherein the instructions to perform the selected recovery procedure are executable by the at least one processor to cause the UE to:
transmit, via the transceiver, a first random-access message to the master node;
receive, via the transceiver, a second random-access message from the master node in response to the first random-access message, the second random-access message providing a grant for uplink resources for the UE to transmit the radio resource control reestablishment request;
transmit, via the transceiver, the radio resource control reestablishment request on the uplink resources;
receive, from the master node via the transceiver, a radio resource control reestablishment message after transmission of the radio resource control reestablishment request; and
perform a reestablishment procedure after receiving the radio resource control reestablishment message.

10. The UE of claim 9, wherein the instructions to transmit the radio resource control reestablishment request are executable by the at least one processor to cause the UE to:
transmit the radio resource control reestablishment request over a signaling radio bearer.

11. The UE of claim 9, wherein the radio resource control reestablishment request comprises a physical cell identifier of the master node, a cell radio network temporary identifier assigned by the master node, an indication of a cause of the reestablishment procedure, or a combination thereof.

12. The UE of claim 11, wherein the cause of the reestablishment procedure comprises an integrity protection (IP) failure with a master cell group or a reconfiguration failure with the master cell group.

13. The UE of claim 1, wherein the instructions to perform the selected recovery procedure are executable by the at least one processor to cause the UE to:
transmit, to the secondary node via the transceiver, an indication that the radio link failure had occurred, wherein the indication comprises the radio resource control master cell-group failure information message that contains a master cell-group link failure cause and an available measurement report; and
monitor for a response from the secondary node after transmission of the indication that the radio link failure had occurred.

14. The UE of claim 13, wherein the instructions are further executable by the at least one processor to cause the UE to:
receive, via the transceiver, a radio resource control reconfiguration message indicating that the UE is to perform a handover procedure from the master node to a target node; and
initiate the handover procedure from the master node to the target node after reception of the radio resource control reconfiguration message.

15. The UE of claim 13, wherein the instructions are further executable by the at least one processor to cause the UE to:
receive, via the transceiver, a radio resource control release message indicating that the UE is to release a radio resource control connection with the master node and the secondary node;
release the radio resource control connection with the master node and the secondary node after reception of the radio resource control release message; and
perform a cell selection procedure followed by a radio resource control establishment procedure after releasing the radio resource control connection with the master node and the secondary node.

16. A user equipment (UE), comprising:
at least one processor;
a transceiver; and
memory comprising instructions executable by the at least one processor to cause the UE to:
detect a radio link failure between the UE and a master node, the UE and the master node being associated with a dual-connectivity configuration;
transmit, via the transceiver to a secondary node also being associated with the dual-connectivity configuration, an indication that the radio link failure between the UE and the master node had occurred;
start a recovery timer upon or after transmitting the indication that the radio link failure between the UE and the master node had occurred; and
monitor, for at most a duration of the recovery timer, for a response from the secondary node, the monitoring being responsive to the radio link failure having occurred between the UE and the master node.

17. The UE of claim 16, wherein the instructions are further executable by the at least one processor to cause the UE to:
receive, via the transceiver, a radio resource control reconfiguration message indicating that the UE is to perform a handover procedure from the master node to a target node; and
initiate the handover procedure from the master node to the target node after reception of the radio resource control reconfiguration message.

18. The UE of claim 16, wherein the instructions are further executable by the at least one processor to cause the UE to:
receive, via the transceiver, a radio resource control release message indicating that the UE is to release a radio resource control connection with the master node and the secondary node;
release the radio resource control connection with the master node and the secondary node after reception of the radio resource control release message; and
perform a cell selection procedure followed by a radio resource control establishment procedure after releasing the radio resource control connection with the master node and the secondary node.

19. The UE of claim 16, wherein the instructions are further executable by the at least one processor to cause the UE to:
receive, via the transceiver, the response before the recovery timer expires; and
stop the recovery timer after the response.

20. A user equipment (UE), comprising:
at least one processor;
a transceiver; and
memory comprising instructions executable by the at least one processor to cause the UE to:
receive, via the transceiver, a radio resource control connection reconfiguration message from a master node associated with a dual-connectivity configuration, the radio resource control connection reconfiguration message indicating that the UE is to handover from a secondary node associated with the dual-connectivity configuration to a target secondary node associated with the dual-connectivity configuration;
perform a handover from the secondary node associated with the dual-connectivity configuration to the target secondary node;
detect, after receiving the radio resource control connection reconfiguration message, a radio link failure between the UE and the master node associated with the dual-connectivity configuration; and
transmit, to the target secondary node associated with the dual-connectivity configuration and after the handover to the target secondary node, an indication that the radio link failure had occurred between the UE and the master node associated with the dual-connectivity configuration.

21. The UE of claim 20, wherein the instructions are further executable by the at least one processor to cause the UE to:
perform a random-access procedure to gain access to the target secondary node after the handover to the target secondary node.

22. The UE of claim 21, wherein the instructions are further executable by the at least one processor to cause the UE to:
transmit, to the target secondary node via the transceiver, the indication that the radio link failure had occurred after completing the random-access procedure.

23. The UE of claim 21, wherein the instructions are further executable by the at least one processor to cause the UE to:
release the master node and the target secondary node based at least in part on a random-access timer expiring before completion of the random-access procedure indicating that the random-access procedure has failed; and
perform a radio resource control reestablishment procedure after releasing the master node and the target secondary node.

24. The UE of claim 20, wherein the instructions to transmit the indication are further executable by the at least one processor to cause the UE to:
delay triggering a recovery procedure until after the handover to the target secondary node.

25. A user equipment (UE), comprising:
at least one processor;
a transceiver; and
memory comprising instructions executable by the at least one processor to cause the UE to:
receive, via the transceiver, a radio resource control connection configuration message from a master node associated with a dual-connectivity configuration, the radio resource control connection configuration message indicating that the UE is to add a secondary node associated with the dual-connectivity configuration according to a secondary node addition procedure;
perform radio configuration of the secondary node according to the secondary node addition procedure;
detect, after receiving the radio resource control connection configuration message, a radio link failure between the UE and the master node associated with the dual-connectivity configuration; and
transmit, to the secondary node associated with the dual-connectivity configuration and after the performing the secondary node addition procedure, an indication that the radio link failure had occurred between the UE and the master node associated with the dual-connectivity configuration.

26. The UE of claim 25, wherein the instructions are further executable by the at least one processor to cause the UE to:
perform a random-access procedure to gain access to the secondary node.

27. The UE of claim 26, wherein the instructions are further executable by the at least one processor to cause the UE to:
transmit, to the secondary node via the transceiver, the indication that the radio link failure had occurred, transmission of the indication that the radio link failure had occurred occurring after performing the random-access procedure.

28. The UE of claim 26, wherein the instructions are further executable by the at least one processor to cause the UE to:
release the master node and the secondary node based at least in part on a random-access timer expiring before completion of the random-access procedure indicating that the random-access procedure has failed; and
perform a radio resource control reestablishment procedure after releasing the master node and the secondary node.

29. The UE of claim 26, wherein the instructions to transmit the indication are further executable by the at least one processor to cause the UE to:
delay triggering a recovery procedure until after completing the random-access procedure to gain access to the secondary node.

* * * * *